US012719728B2

(12) United States Patent
Zhang et al.

(10) Patent No.: US 12,719,728 B2
(45) Date of Patent: Aug. 25, 2026

(54) SYSTEMS AND METHODS FOR REFERENCE SIGNALING FOR WIRELESS COMMUNICATION

(71) Applicant: ZTE CORPORATION, Shenzhen (CN)

(72) Inventors: Shujuan Zhang, Shenzhen (CN); Bo Gao, Shenzhen (CN); Meng Mei, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 329 days.

(21) Appl. No.: 18/522,083

(22) Filed: Nov. 28, 2023

(65) Prior Publication Data

US 2024/0275653 A1 Aug. 15, 2024

Related U.S. Application Data

(63) Continuation of application No. PCT/CN2022/074841, filed on Jan. 28, 2022.

(51) Int. Cl.
*H04L 5/00* (2006.01)
*H04L 27/26* (2006.01)

(52) U.S. Cl.
CPC ........ *H04L 27/2613* (2013.01); *H04L 5/0051* (2013.01)

(58) Field of Classification Search
CPC ....... H04W 76/16; H04W 76/34; H04W 8/14; H04W 8/20; H04W 24/02; H04W 24/04;
(Continued)

(56) References Cited

U.S. PATENT DOCUMENTS 12,207,256 B2 * 1/2025 Frenne .................. H04W 72/20
12,593,333 B2 * 3/2026 Zhang ............... H04W 72/1268
(Continued)

FOREIGN PATENT DOCUMENTS

CN 110418411 A 11/2019
CN 110546912 A 12/2019
(Continued)

OTHER PUBLICATIONS

Extended European Search Report for EP Appl. No. 22922847.3, dated Oct. 18, 2024 (9 pages).
(Continued)

*Primary Examiner* — Nathan S Taylor
(74) *Attorney, Agent, or Firm* — Foley & Lardner LLP

(57) ABSTRACT

Presented are systems and methods for wireless communication. In one aspect, a wireless communication device determines a first demodulation reference signal (DMRS) table. In one aspect, the wireless communication device receives a value of a field in a signaling from the wireless communication node. In one aspect, the wireless communication device determines a first DMRS parameter according to the first DMRS table and the value of the field. In some embodiments, the first DMRS table includes a mapping between values of the field of the signaling and values of the first DMRS parameter. In some embodiments, the first DMRS table includes the first DMRS parameter, that has values associated with a plurality of categories of DMRS ports. In some embodiments, each category of the plurality of categories of DMRS ports corresponding to a respective one of a plurality of second parameters.

20 Claims, 15 Drawing Sheets

(58) Field of Classification Search
CPC ..... H04W 76/15; H04W 76/25; H04W 8/205; H04W 88/06; H04W 16/32; H04W 72/0457; H04W 76/20; H04W 72/231; H04W 72/232; H04W 72/04; H04W 72/044; H04W 72/23; H04L 27/2613; H04L 5/0016; H04L 5/0023; H04L 5/0051; H04L 5/0053; H04L 5/0094; H04L 5/0035; H04L 27/26; H04L 5/00; H04J 13/12; H04J 13/18
See application file for complete search history.

(56) References Cited

U.S. PATENT DOCUMENTS

| | | | | |
|---|---|---|---|---|
| 2014/0153533 | A1* | 6/2014 | Chen | H04W 52/04 370/329 |
| 2015/0006742 | A1* | 1/2015 | Beals | H04N 21/43615 709/227 |
| 2017/0201360 | A1* | 7/2017 | Shin | H04J 13/004 |
| 2017/0294945 | A1* | 10/2017 | Liu | H04B 7/0452 |
| 2018/0026684 | A1* | 1/2018 | Wei | H04L 5/0021 370/329 |
| 2018/0167195 | A1* | 6/2018 | Ly | H04W 48/16 |
| 2019/0068308 | A1* | 2/2019 | Shin | H04L 5/0023 |
| 2019/0182009 | A1* | 6/2019 | Mondal | H04L 5/005 |
| 2020/0137745 | A1* | 4/2020 | Bachu | H04L 69/321 |
| 2020/0178281 | A1* | 6/2020 | Bhamri | H04W 72/0446 |
| 2020/0228225 | A1* | 7/2020 | Bhamri | H04J 13/12 |
| 2020/0245348 | A1* | 7/2020 | Chen | H04W 72/0446 |
| 2021/0084664 | A1* | 3/2021 | Bhamri | H04L 5/0048 |
| 2022/0029762 | A1* | 1/2022 | Ren | H04J 13/0062 |
| 2022/0201654 | A1* | 6/2022 | Lee | H04L 5/0053 |
| 2022/0210681 | A1* | 6/2022 | Thangarasa | H04W 56/001 |
| 2022/0232530 | A1* | 7/2022 | Chae | H04W 72/02 |
| 2022/0368468 | A1* | 11/2022 | Xiong | H04W 74/0833 |
| 2023/0198808 | A1* | 6/2023 | Yu | H04L 5/0098 375/262 |
| 2023/0209555 | A1* | 6/2023 | Sosnin | H04W 72/1268 370/329 |
| 2023/0345467 | A1* | 10/2023 | Zhang | H04W 72/1268 |
| 2024/0072969 | A1* | 2/2024 | Kwak | H04L 27/26025 |
| 2024/0204948 | A1* | 6/2024 | Zhang | H04L 5/005 |
| 2024/0243878 | A1* | 7/2024 | Xiao | H04L 5/0016 |
| 2025/0240142 | A1* | 7/2025 | Abdelghaffar | H04L 5/0094 |

FOREIGN PATENT DOCUMENTS

| | | | | |
|---|---|---|---|---|
| CN | 111052662 | A | 4/2020 | |
| EP | 4009688 | A1 * | 6/2022 | H04L 27/2613 |
| EP | 3639462 | B1 * | 10/2023 | H04J 13/00 |
| JP | 2018-510547 | A | 4/2018 | |
| JP | 2021-510284 | A | 4/2021 | |
| JP | 2021-103887 | A | 7/2021 | |
| WO | WO-2016/127939 | A1 | 8/2016 | |
| WO | WO-2021/024330 | A1 | 2/2021 | |
| WO | WO-2021/214920 | A1 | 10/2021 | |

OTHER PUBLICATIONS

International Search Report and Written Opinion for PCT Appl. No. PCT/CN2022/074841, mailed on Oct. 10, 202 (8 pages).

Spreadtrum Communications, “Considerations on DMRS for CP-OFDM”, 3GPP TSG RAN WG1 meeting #89, R1-1707784, May 19, 2017, Hangzhou, China (6 pages).

Huawei et al., “PDSCH/PUSCH enhancements for 52-71GHz spectrum”, 3GPP TSG RAN WG1 Meeting #106bis-e, R1-2108771, Oct. 19, 2021, e-Meeting (31 pages).

Notice of Reasons for Rejection for JP Appl. No. 2023-573371, dated Jun. 2, 2025 (with English translation, 13 pages).

Zte et al., “Discussion on the PDSCH/PUSCH enhancements for 52.6 to 71GHz”, 3GPP TSG RAN WG1 #106-e, R1-2107004, Aug. 27, 2021, e-Meeting (22 pages).

Zte, “Email discussion to collect description of the NOMA schemes”, 3GPP TSG RAN WG1 Meeting #94, R1-1809844, Aug. 24, 2018, Gothenburg, Sweden (53 pages).

Apple Inc., “Discussion on PDSCH and PUSCH Enhancements for NR above 52.6 GHz”, 3GPP TSG RAN WG1 #106b-e, R1-2107730, Aug. 27, 2021, e-Meeting (39 pages).

Intel Corporation, “Discussion on PDSCH/PUSCH enhancements for extending NR up to 71 GHz”, 3GPP TSG RAN WG1 #104b-e, R1-2103025, Apr. 20, 2021, e-Meeting (17 pages).

Lenovo, et al., “PDSCH/PUSCH scheduling enhancements for NR from 52.6 GHz to 71GHz”, 3GPP TSG RAN WG1 #106bis-e, R1-2109901, Oct. 19, 2021, e-meeting (8 pages).

OPPO, “Discussion on PDSCH/PUSCH enhancements”, 3GPP TSG RAN WG1 #104b-e, R1-2102389, Apr. 20, 2021, e-Meeting (6 pages).

Qualcomm Incorporated, “PDSCH and PUSCH enhancements for 52.6-71 GHz band”, 3GPP TSG-RAN WG1 #106bis-e, R1-2110176, Oct. 19, 2021, e-Meeting (16 pages).

Vivo, “Discussions on PDSCH PUSCH enhancements for NR operation from 52.6GHz to 71GHz”, 3GPP TSG RAN WG1 #106bis, R1-2108963, Oct. 20, 2021, e-Meeting (44 pages).

Notice of Final Rejection for JP App. No. 2023-573371 dated Oct. 2, 2025 (with English translation, 12 pages).

* cited by examiner

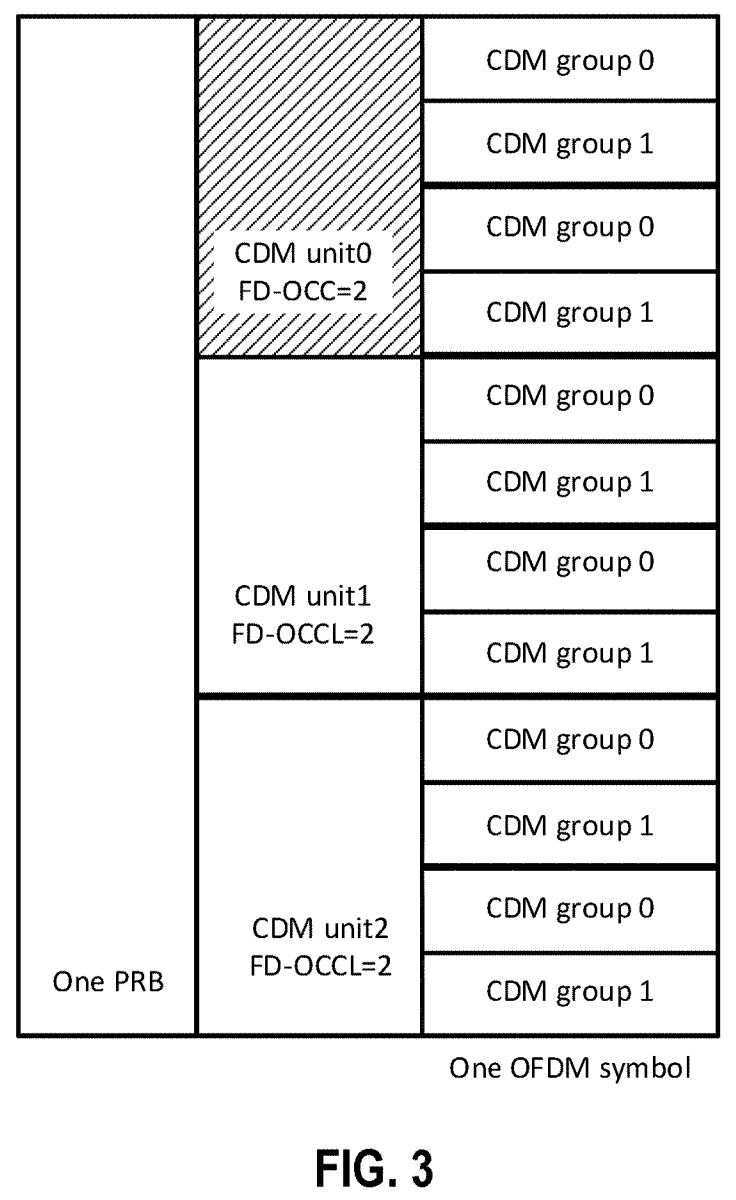

CDM group 0
CDM group 1
CDM group 0
CDM group 1
CDM group 0
CDM group 1
CDM group 0
CDM group 1
CDM group 0
CDM group 1
CDM group 0
CDM group 1
One OFDM symbol CDM unit0
FD-OCC=2

CDM unit1
FD-OCCL=2

CDM unit2
FD-OCCL=2

One PRB

FIG. 3

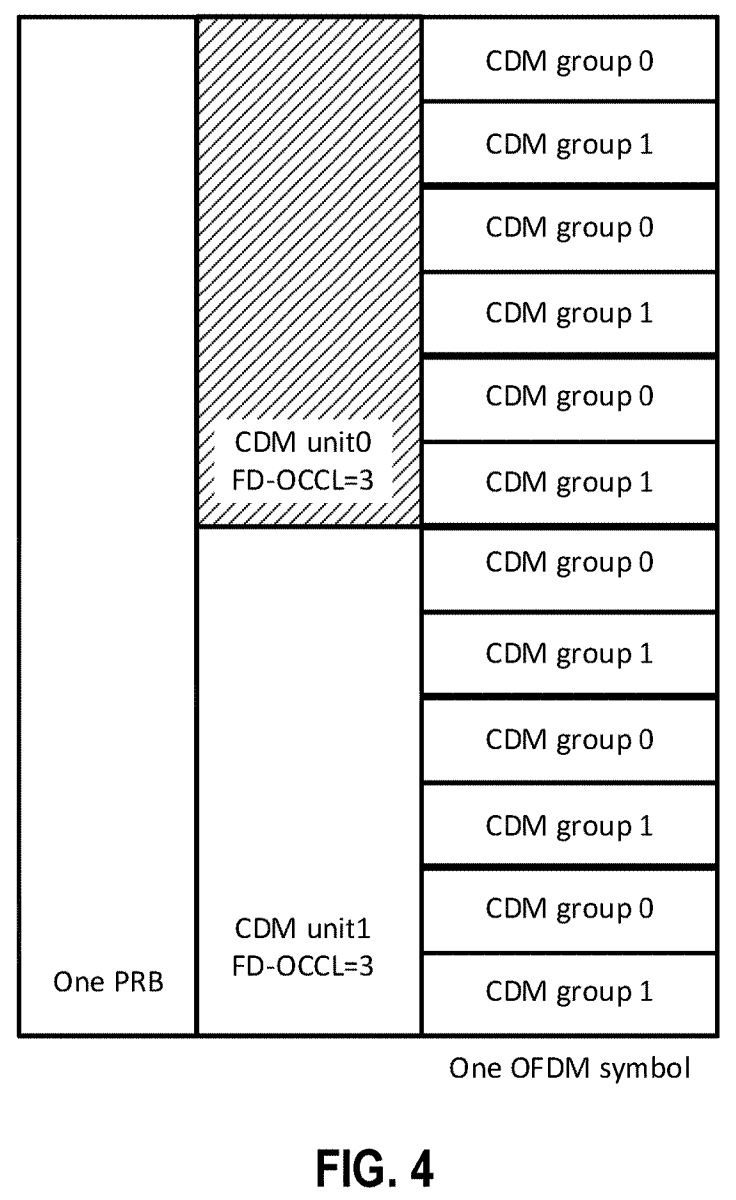

CDM group 0
CDM group 1
CDM group 0
CDM group 1
CDM group 0
CDM group 1
CDM group 0
CDM group 1
CDM group 0
CDM group 1
CDM group 0
CDM group 1
One OFDM symbol CDM unit0
FD-OCCL=3

CDM unit1
FD-OCCL=3

One PRB

FIG. 4

| | | TD-OCCL=2, one TD-OCC unit | |
|---|---|---|---|
| One PRB | CDM unit0 FD-OCC=2 | CDM group 0 | CDM group 0 |
| | | CDM group 1 | CDM group 1 |
| | | CDM group 0 | CDM group 0 |
| | | CDM group 1 | CDM group 1 |
| | CDM unit1 FD-OCCL=2 | CDM group 0 | CDM group 0 |
| | | CDM group 1 | CDM group 1 |
| | | CDM group 0 | CDM group 0 |
| | | CDM group 1 | CDM group 1 |
| | CDM unit2 FD-OCCL=2 | CDM group 0 | CDM group 0 |
| | | CDM group 1 | CDM group 1 |
| | | CDM group 0 | CDM group 0 |
| | | CDM group 1 | CDM group 1 |
| | | OFDM symbol n | OFDM symbol n+1 |

FIG. 5

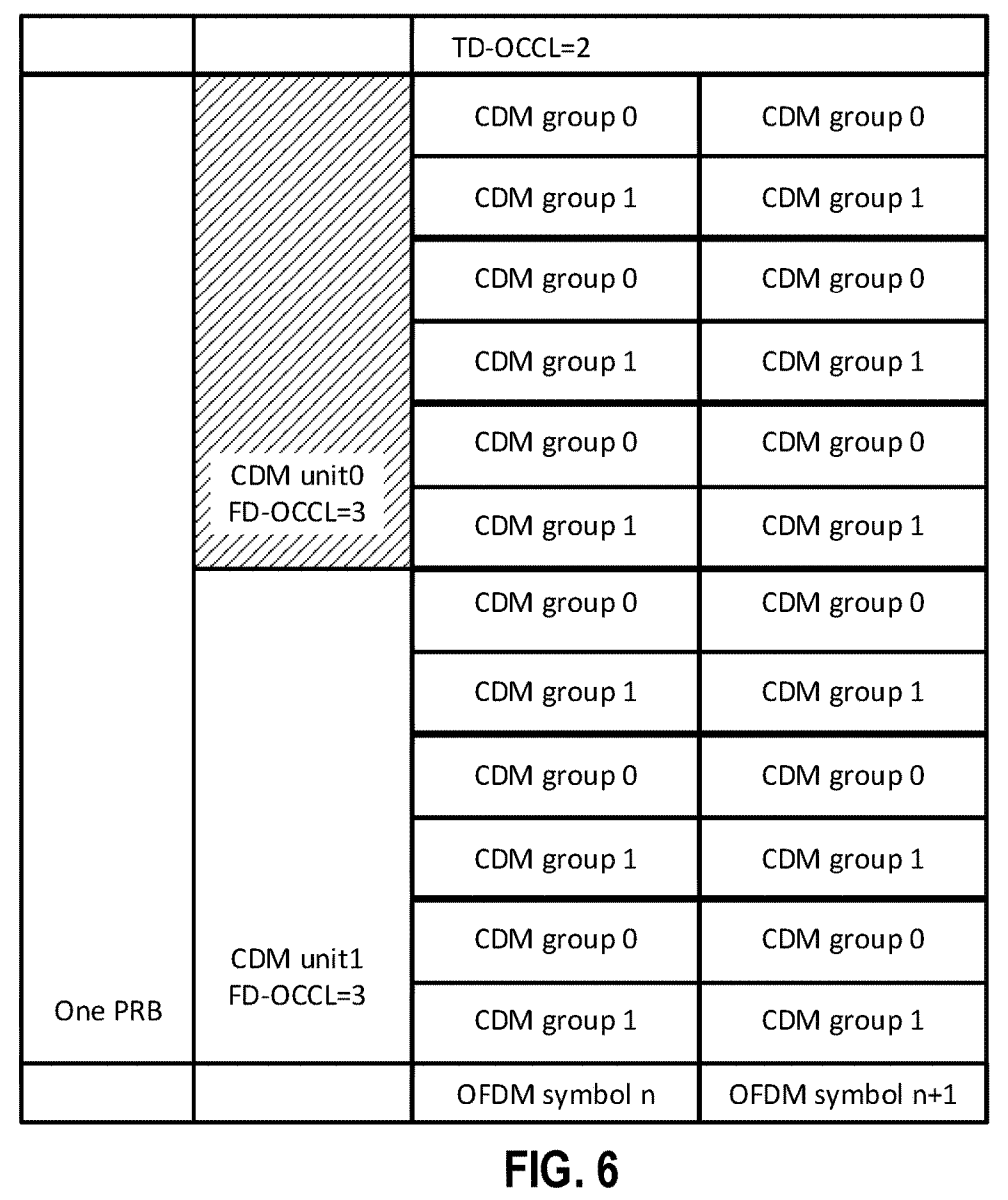

| | | TD-OCCL=2 | |
|---|---|---|---|
| One PRB | CDM unit0 FD-OCCL=3 | CDM group 0 | CDM group 0 |
| | | CDM group 1 | CDM group 1 |
| | | CDM group 0 | CDM group 0 |
| | | CDM group 1 | CDM group 1 |
| | | CDM group 0 | CDM group 0 |
| | | CDM group 1 | CDM group 1 |
| | CDM unit1 FD-OCCL=3 | CDM group 0 | CDM group 0 |
| | | CDM group 1 | CDM group 1 |
| | | CDM group 0 | CDM group 0 |
| | | CDM group 1 | CDM group 1 |
| | | CDM group 0 | CDM group 0 |
| | | CDM group 1 | CDM group 1 |
| | | OFDM symbol n | OFDM symbol n+1 |

FIG. 6

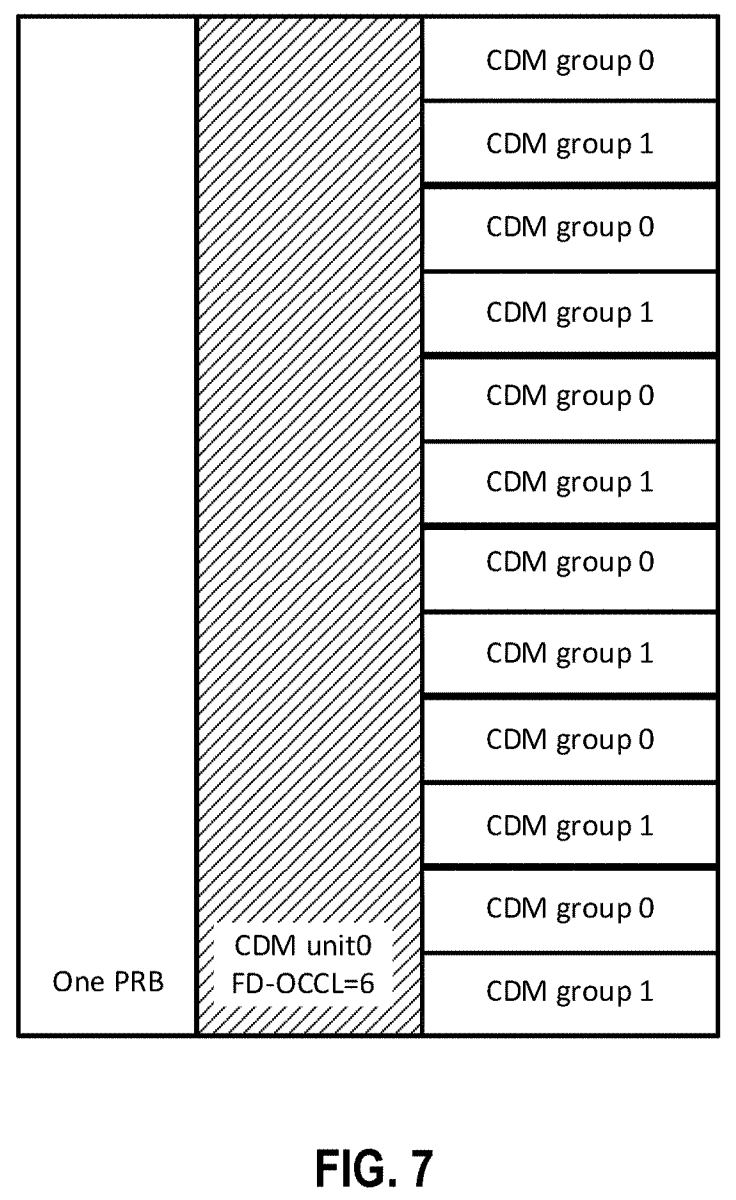

CDM group 0
CDM group 1
CDM group 0
CDM group 1
CDM group 0
CDM group 1
CDM group 0
CDM group 1
CDM group 0
CDM group 1
CDM group 0
CDM group 1

CDM unit0
FD-OCCL=6

One PRB

FIG. 7

TD-OCCL=2, one TD-OCC unit

| OFDM symbol n | OFDM symbol n+1 |
| --- | --- |
| CDM group 0 | CDM group 0 |
| CDM group 1 | CDM group 1 |
| CDM group 0 | CDM group 0 |
| CDM group 1 | CDM group 1 |
| CDM group 0 | CDM group 0 |
| CDM group 1 | CDM group 1 |
| CDM group 0 | CDM group 0 |
| CDM group 1 | CDM group 1 |
| CDM group 0 | CDM group 0 |
| CDM group 1 | CDM group 1 |
| CDM group 0 | CDM group 0 |
| CDM group 1 | CDM group 1 |

CDM unit0
FD-OCCL=6

One PRB

FIG. 8

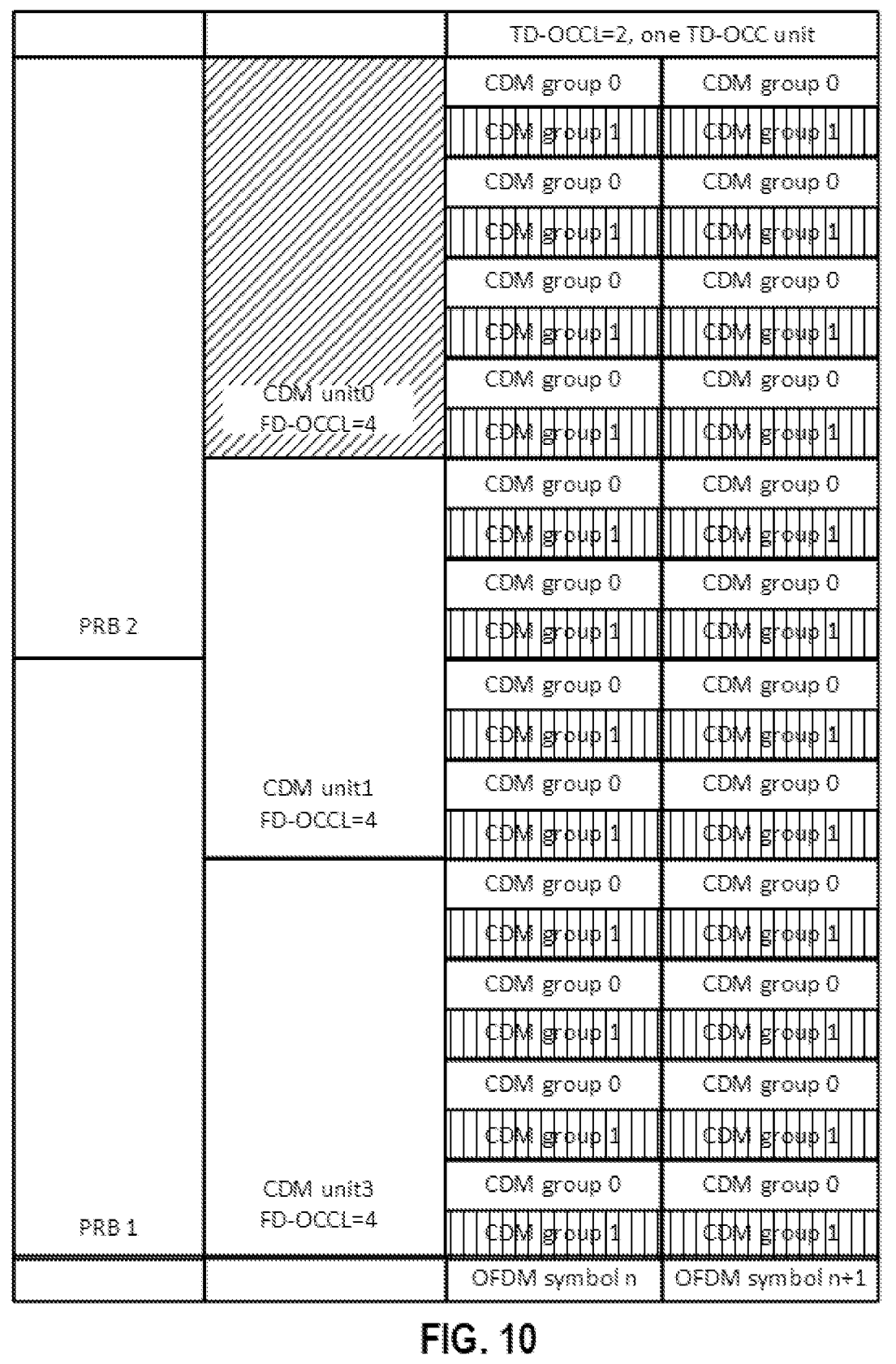

| | | TD-OCCL=2, one TD-OCC unit | |
|---|---|---|---|
| | | CDM group 0 | CDM group 0 |
| | | CDM group 1 | CDM group 1 |
| | | CDM group 0 | CDM group 0 |
| | | CDM group 1 | CDM group 1 |
| | | CDM group 0 | CDM group 0 |
| | | CDM group 1 | CDM group 1 |
| | CDM unit0 FD-OCCL=4 | CDM group 0 | CDM group 0 |
| | | CDM group 1 | CDM group 1 |
| | | CDM group 0 | CDM group 0 |
| | | CDM group 1 | CDM group 1 |
| | | CDM group 0 | CDM group 0 |
| PRB 2 | | CDM group 1 | CDM group 1 |
| | | CDM group 0 | CDM group 0 |
| | | CDM group 1 | CDM group 1 |
| | CDM unit1 FD-OCCL=4 | CDM group 0 | CDM group 0 |
| | | CDM group 1 | CDM group 1 |
| | | CDM group 0 | CDM group 0 |
| | | CDM group 1 | CDM group 1 |
| | | CDM group 0 | CDM group 0 |
| | | CDM group 1 | CDM group 1 |
| | | CDM group 0 | CDM group 0 |
| | | CDM group 1 | CDM group 1 |
| | CDM unit3 FD-OCCL=4 | CDM group 0 | CDM group 0 |
| PRB 1 | | CDM group 1 | CDM group 1 |
| | | OFDM symbol n | OFDM symbol n+1 |

FIG. 10

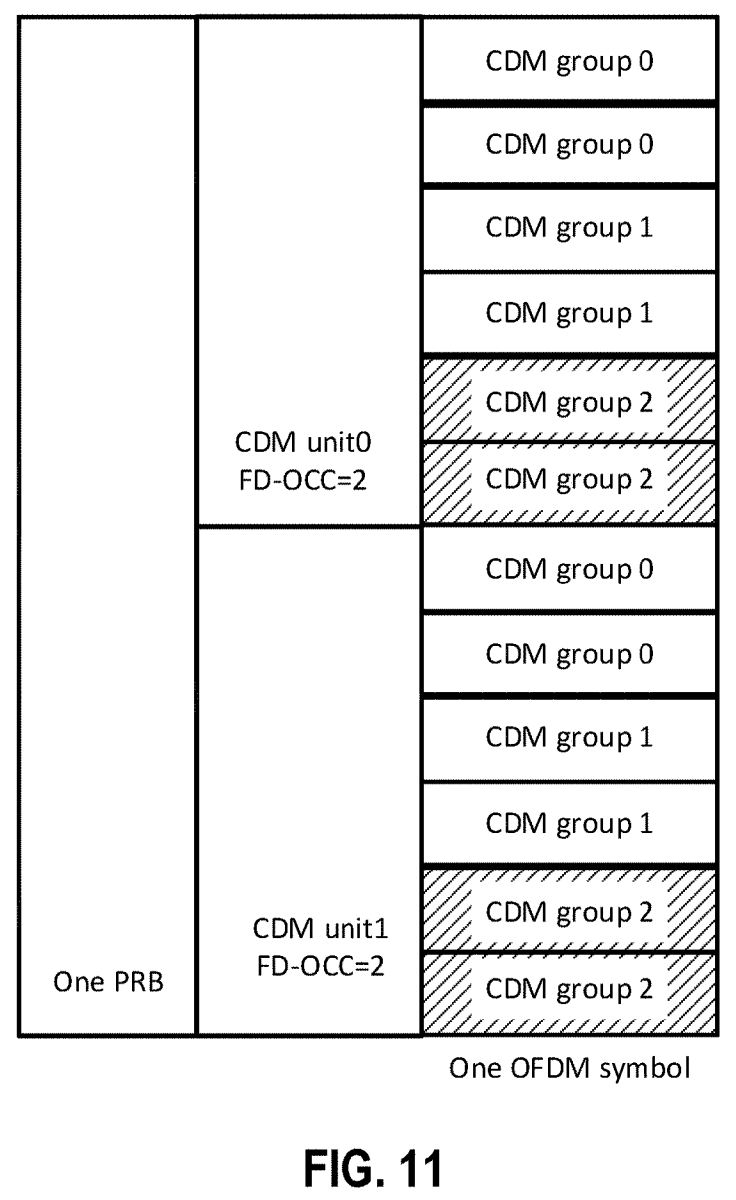

CDM group 0
CDM group 0
CDM group 1
CDM group 1
CDM group 2
CDM group 2
CDM group 0
CDM group 0
CDM group 1
CDM group 1
CDM group 2
CDM group 2
One OFDM symbol CDM unit0
FD-OCC=2

CDM unit1
FD-OCC=2

One PRB

FIG. 11

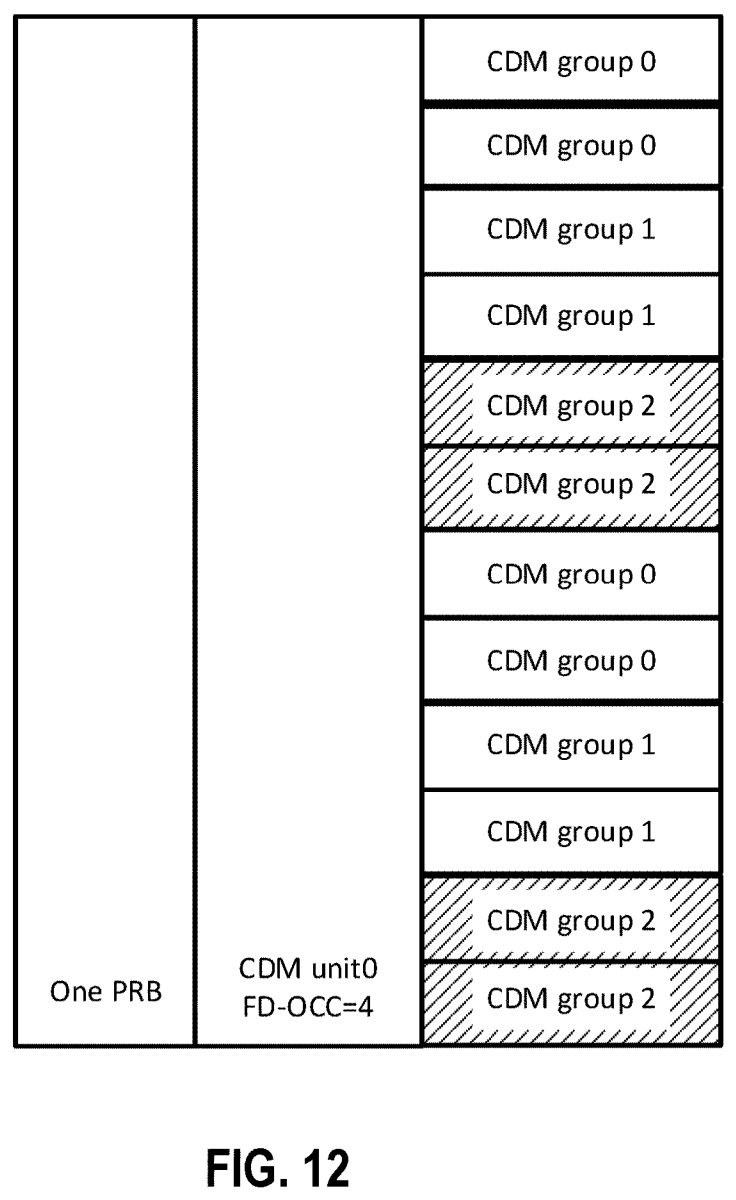

CDM group 0
CDM group 0
CDM group 1
CDM group 1
CDM group 2
CDM group 2
CDM group 0
CDM group 0
CDM group 1
CDM group 1
CDM group 2
CDM group 2

CDM unit0
FD-OCC=4

One PRB

FIG. 12

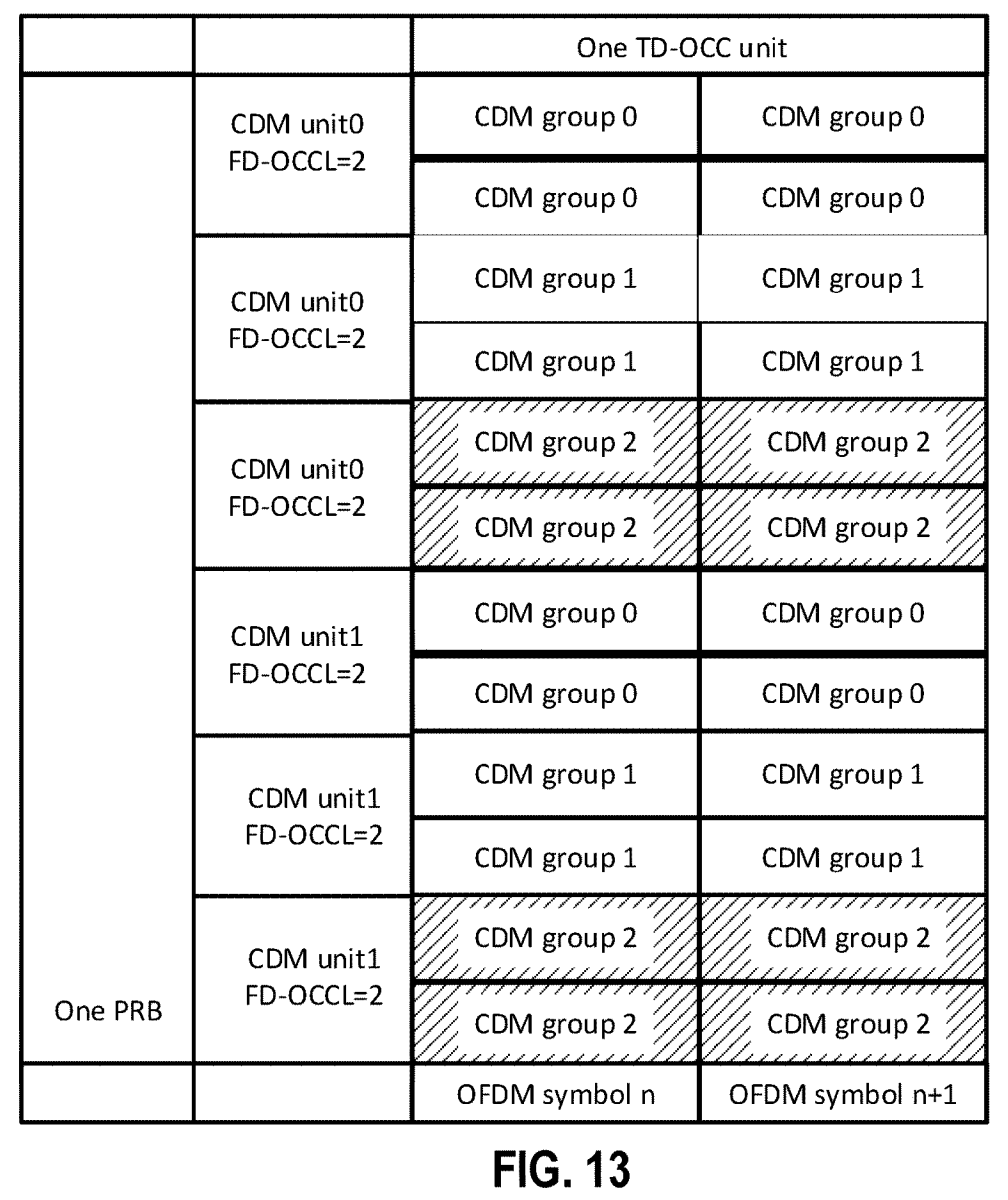

| | | One TD-OCC unit | |
|---|---|---|---|
| One PRB | CDM unit0 FD-OCCL=2 | CDM group 0 | CDM group 0 |
| | | CDM group 0 | CDM group 0 |
| | CDM unit0 FD-OCCL=2 | CDM group 1 | CDM group 1 |
| | | CDM group 1 | CDM group 1 |
| | CDM unit0 FD-OCCL=2 | CDM group 2 | CDM group 2 |
| | | CDM group 2 | CDM group 2 |
| | CDM unit1 FD-OCCL=2 | CDM group 0 | CDM group 0 |
| | | CDM group 0 | CDM group 0 |
| | CDM unit1 FD-OCCL=2 | CDM group 1 | CDM group 1 |
| | | CDM group 1 | CDM group 1 |
| | CDM unit1 FD-OCCL=2 | CDM group 2 | CDM group 2 |
| | | CDM group 2 | CDM group 2 |
| | | OFDM symbol n | OFDM symbol n+1 |

FIG. 13

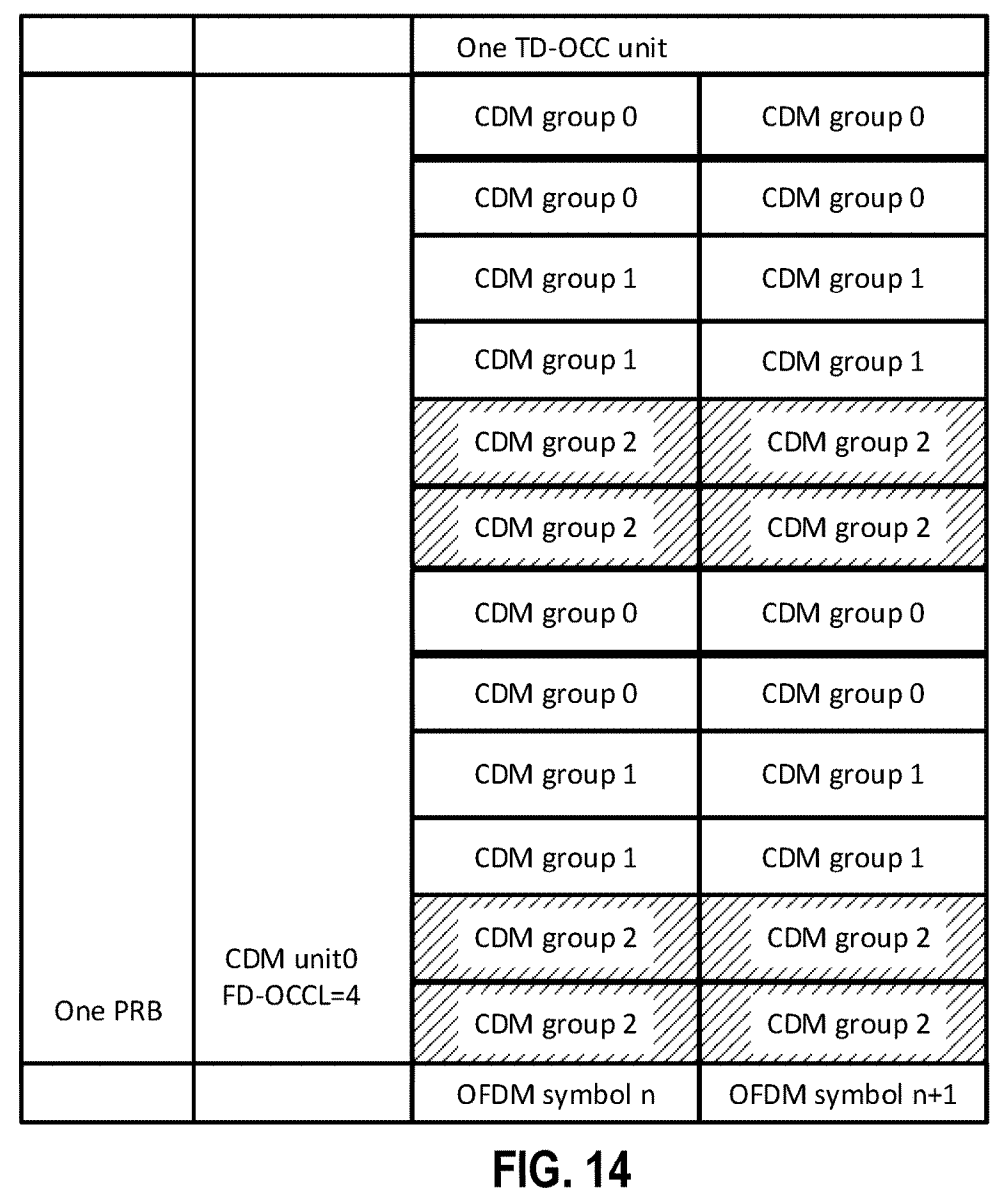

| | | One TD-OCC unit | |
|---|---|---|---|
| One PRB | CDM unit0 FD-OCCL=4 | CDM group 0 | CDM group 0 |
| | | CDM group 0 | CDM group 0 |
| | | CDM group 1 | CDM group 1 |
| | | CDM group 1 | CDM group 1 |
| | | CDM group 2 | CDM group 2 |
| | | CDM group 2 | CDM group 2 |
| | | CDM group 0 | CDM group 0 |
| | | CDM group 0 | CDM group 0 |
| | | CDM group 1 | CDM group 1 |
| | | CDM group 1 | CDM group 1 |
| | | CDM group 2 | CDM group 2 |
| | | CDM group 2 | CDM group 2 |
| | | OFDM symbol n | OFDM symbol n+1 |

FIG. 14

SYSTEMS AND METHODS FOR REFERENCE SIGNALING FOR WIRELESS COMMUNICATION

CROSS-REFERENCE TO RELATED PATENT APPLICATIONS

This application claims the benefit of priority under 35 U.S.C. § 120 as a continuation of PCT Patent Application No. PCT/CN/2022/074841, filed on Jan. 28, 2022, the disclosure of which is incorporated herein by reference in its entirety.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY OF THE INVENTION

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium for wireless communication between a wireless communication node and a wireless communication device. In some embodiments, the wireless communication node is a base station or a transmit receive point (TRP). In some embodiments, the wireless communication device is user equipment (UE).

In some embodiments, a wireless communication device determines a first demodulation reference signal (DMRS) table In some embodiments, the wireless communication device receives a value of a field in a signaling from the wireless communication node. In some embodiments, the wireless communication device determines a first DMRS parameter according to the first DMRS table and the value of the field. In some embodiments, the first DMRS table includes a mapping between values of the field of the signaling and values of the first DMRS parameter. In some embodiments, the first DMRS table includes the first DMRS parameter of a plurality of categories of DMRS ports, each category of the plurality of categories of DMRS ports corresponding to a respective second parameter.

In some embodiments, a first category of the plurality of categories of DMRS ports, corresponds to a FD-OCC of length 2. In some embodiments, if the first DMRS table is for DMRS type I, the first DMRS table includes a first value of the field with Y DMRS ports being DMRS ports {0,1,4,5} and a number of CDM groups without data being 1, and a second value of the field with the Y DMRS ports being DMRS ports {0,1,4,5} and the number of CDM groups without data being 2.

In some embodiments, a second category of the plurality of categories of DMRS ports, corresponds to a FD-OCC of length more than 2.

In some embodiments, the length of the FD-OCC is one of 3, 4 or 6, or the length of the FD-OCC is one of 3 or 6.

In some embodiments, the length of the FD-OCC depends on a DMRS type.

In some embodiments, if the DMRS type is of type I, the length of the FD-OCC is one of 3, 4 or 6, or is one of 3 or 6. In some embodiments, if the DMRS type is of type II, the length of the FD-OCC is 4.

In some embodiments, the length of the FD-OCC is a factor of a number of REs of one code division multiplexing (CDM) group in one physical resource block (PRB) of one OFDM symbol; or a factor of a number of REs of one CDM group in two PRBs of one OFDM symbol.

In some embodiments, the plurality of categories of DMRS ports includes three categories of DMRS ports. In some embodiments, lengths of FD-OCCs of the three categories of DMRS ports are 2, 3 and 6 respectively, or the lengths of the FD-OCCs of the three categories of DMRS ports are 2, 4 and 6 respectively.

In some embodiments, the plurality of categories of DMRS ports includes four categories of DMRS ports. In some embodiments, lengths of FD-OCCs of the four categories of DMRS ports are 2, 3, 4 and 6 respectively.

In some embodiments, when the plurality of categories of DMRS ports includes more than two categories of DMRS ports, the first DMRS table corresponds to DMRS type I.

In some embodiments, when the plurality of categories of DMRS ports includes up to two categories of DMRS ports, the first DMRS table corresponds to DMRS type II.

In some embodiments, the code division multiplexing (CDM) group of the plurality categories of DMRS ports is same. In some embodiments, each CDM group corresponds to the plurality of categories of DMRS ports.

In some embodiments, for one CDM group, resource elements (REs) occupied by DMRS ports of the plurality of categories of DMRS ports are same. In some embodiments, the plurality of categories of DMRS ports is on a same OFDM symbol, or on different OFDM symbols.

In some embodiments, the plurality of categories of DMRS ports includes second category DMRS ports with a FD-OCC of length 3 for DMRS type I, and satisfies at least one of: if a number of continuous DMRS OFDM symbols is 1, the plurality of categories of DMRS ports include DMRS ports {0,8,9,2,10,11}; if the number of continuous DMRS OFDM symbols is 1, CDM group 0 includes DMRS ports {0,8,9}, and CDM group 1 includes DMRS ports {2,10,11}; if the number of continuous DMRS OFDM symbols is 2, the plurality of categories of DMRS ports include DMRS ports {0,8,9,2,10,11,4,12,13,6,14,15}; if the number of continuous DMRS OFDM symbols is 2, CDM group 0 includes DMRS ports {0,4,8,9,12,13}, and CDM group 1 includes DMRS ports {2,6,10,11,14,15}.

In some embodiments, the first DMRS parameter includes Y DMRS ports where Y is an integer value, and a number of CDM groups without data, and satisfies at least one of: if the Y DMRS ports include at least one of DMRS ports{8-15}, the number of CDM groups without data is 2; if the Y DMRS ports only include one or more from DMRS ports {0,8,9,4,12,13}, the number of CDM groups without data is: 1 and associated with a first value of the field, or 2 and associated with a second value of the field, for the Y MRS ports; if Y is 2 and the number of continuous DMRS OFDM symbols is 1, the Y DMRS ports include one of DMRS ports {8,9} or DMRS ports {10,11}; if Y is 3 and the number of continuous DMRS OFDM symbols is 1, the Y DMRS ports include one of DMRS ports {0,8,9}, DMRS ports {2,10,11}, or DMRS ports {8,10,11}; if Y is 4 and the number of continuous DMRS OFDM symbols is 1, the Y DMRS ports include DMRS ports {8,9,10,11}; if Y is 2 and the number of continuous DMRS OFDM symbols is 2, the Y DMRS ports include one of DMRS ports {8,9}, DMRS ports {10,11}, DMRS ports {12,13}, or DMRS ports {14,15}; if Y is 3 and the number of continuous DMRS OFDM symbols is 2, the Y DMRS ports include one of DMRS ports {0,8,9}, DMRS ports {2,10,11}, DMRS ports {8,10,11}, DMRS ports {4,12,13}, DMRS ports {6,14,15}, DMRS ports {10, 11,15}, or DMRS ports {8,9,12}; or if Y is 4 and the number of continuous DMRS OFDM symbols is 2, the Y DMRS ports include one of DMRS ports {8,9,10,11}, DMRS ports {8,9,12,13}, DMRS ports {12,13,14,15}, or DMRS ports {10,11,14,15}.

In some embodiments, the plurality categories of DMRS ports further includes a first category DMRS port of FD-OCC length 2.

In some embodiments, if the first DMRS table is for a physical downlink shared channel (PDSCH), the first DMRS table satisfies at least one of: the first DMRS parameter includes a parameter about a length of a FD-OCC of a DMRS port from DMRS ports {0,2,4,6}; the first DMRS parameter includes Y DMRS ports and if the Y DMRS ports include one or more DMRS ports from DMRS ports {0,2, 4,6}, the length of a FD-OCC of the one or more DMRS ports from DMRS ports {0,2,4,6} depends on a relationship between the Y DMRS ports and DMRS ports {8-15}; or a length of a FD-OCC of DMRS ports {0,2,4,6} is 2 or 3.

In some embodiments, the length of a FD-OCC of one or more DMRS ports from DMRS ports {0,2,4,6} depends on a relationship between the Y DMRS port and DMRS ports {8-1} and satisfies at least one of: the length of a FD-OCC of one DMRS port from DMRS ports {0,2,4,6} is 3 if the Y DMRS ports includes at least one ports from DMRS ports {8-15}; or the length of a FD-OCC of one DMRS port from DMRS ports {0,2,4,6} is 3 if the Y DMRS ports includes at least one port from DMRS ports {8-15} in one CDM group, wherein the one CDM group includes the one DMRS port.

In some embodiments, the plurality of categories of DMRS ports includes a first category DMRS port with a first FD-OCC of length 2, and a second category DMRS port with a second FD-OCC of length L, where L is 3, 6 or 4. In some embodiments, for one CDM group, at least one of: the first category DMRS port with the first FD-OCC and the second category DMRS port with the second FD-OCC share a same DMRS port index; if the first DMRS table is for a physical uplink shared channel (PUSCH), the first category DMRS port with the first FD-OCC and the second category DMRS port with the second FD-OCC would share a same DMRS port index; if the first DMRS table is for a physical downlink shared channel (PDSCH), the first category DMRS port with the first FD-OCC and the second category DMRS port with the second FD-OCC would have different DMRS port indices; if the first category DMRS port with the first FD-OCC and the second category DMRS port with the second FD-OCC have a same DMRS port index, and the first DMRS table is for a PDSCH, the method further comprises determining, by the wireless communication device the FD-OCC of a DMRS port with the same DMRS port index; if the first category DMRS port with the first FD-OCC and the second category DMRS port with the second FD-OCC have the same DMRS port index, and the first DMRS table is for a PDSCH, the first DMRS parameter includes a second parameter about a length of a FD-OCC of a DMRS port with the same DMRS port index; or if the first category DMRS port with the first FD-OCC and the second category DMRS port with the second FD-OCC have the same DMRS port index, and the first DMRS table is for a PDSCH, the first DMRS parameter includes a parameter about a length of a FD-OCC of a DMRS port with the same DMRS port index if a condition is not satisfied and the length of a FD-OCC of a DMRS port with the same DMRS port index is L when the condition is satisfied.

In some embodiments, the condition includes the Y DMRS ports includes at least one DMRS port from a second DMRS port set; the Y DMRS ports includes at least one DMRS port in one CDM group from a second DMRS port set; or the Y DMRS ports includes more than N DMRS ports in one CDM group. In some embodiments, the condition includes the first DMRS parameter includes the Y DMRS ports, an index of a DMRS port in the second DMRS port set is not shared between different FD-OCC lengths, or a length of a FD-OCC of a DMRS port in the second DMRS port set is more than 2, or a D-OCC of DMRS port in the second DMRS port set doesn't belongs to a FD-OCC set which includes a FD-OCC with all L elements being 1 and a FD-OCC with L/2 repetition of [1,−1]. In some embodiments, the one CDM group includes a DMRS port with the same DMRS port index, and Y is an integer.

In some embodiments, the first FD-OCC includes a FD-OCC of [1,1] and the second FD-OCC includes a FD-OCC with L elements all being 1 if L is 3, 4, or 6. In some embodiments, the first FD-OCC includes a FD-OCC of [1,−1] and the second FD-OCC includes a FD-OCC with elements which includes L/2 repetitions of [1,−1] if L is 4 or 6.

In some embodiments, the first DMRS parameter includes Y DMRS ports and a number of CDM groups without data, and satisfies at least one of: the number of CDM groups without data is determined according to at least one of a category of the Y DMRS ports, a FD-OCC, a TD-OCC, or an index of a CDM group including the Y DMRS ports; or if the Y DMRS ports includes a second category DMRS port, the number of CDM groups without data is a maximum value. Y may be an integer value.

In some embodiments, the first DMRS parameter includes Y DMRS ports and a number of continuous DMRS OFDM symbols, and satisfies at least one of: the number of continuous DMRS OFDM symbols is determined by a category of the Y DMRS ports; or if the Y DMRS ports includes a second category DMRS port, the number of continuous DMRS OFDM symbols is a maximum value.

In some embodiments, the plurality categories of DMRS ports are indexed together. In some embodiments, indices of DMRS ports are determined by first indexing across DMRS ports of a first category, then indexing across DMRS ports of a second category. In some embodiments, first category DMRS ports and some second category DMRS ports share same DMRS port indices. In some embodiments, third category DMRS ports and fourth category DMRS ports share same DMRS port indices. In some embodiments, a length of a FD-OCC of the first category DMRS ports is 2, a length of a FD-OCC of the second category DMRS ports is larger than 2, a length of a FD-OCC of the third category DMRS ports is 4, and a length of a FD-OCC of the fourth category DMRS ports is 6.

In some embodiments, the first DMRS parameter includes Y DMRS ports in one CDM group, where the Y DMRS ports has a FD-OCC of length L where L is a positive integer value, and Y is an integer value that is less than or equal to a product of L and a number of continuous DMRS OFDM symbols.

In some embodiments, the plurality of categories of DMRS ports includes a category of DMRS ports with a FD-OCC of length L for DMRS type I, and satisfies at least one of: if a number of continuous DMRS OFDM symbols is 1, the plurality of categories of DMRS ports include 8 DMRS ports {0,1,8,9,2,3,10,11}; if the number of continuous DMRS OFDM symbols is 1, CDM group 0 includes DMRS ports {0,1,8,9}, and CDM group 1 includes DMRS ports {2,3,10,11}; if the number of continuous DMRS OFDM symbols is 2, the plurality of categories of DMRS port includes 16 DMRS ports {0,1,8,9,2,3,10,11,4,5,12,13, 6,7,14,15}; if the number of continuous DMRS OFDM symbols is 2, CDM group 0 includes DMRS ports {0,1,4, 5,8,9,12,13}, and CDM group 1 includes DMRS ports {2,3,6,7,10,11,14,15}. L may be 4.

In some embodiments, the first DMRS parameter includes Y DMRS ports and a number of CDM groups without data, and satisfies at least one of: if the Y DMRS ports include at least one of DMRS ports{8-15}, the number of CDM groups without data is 2; if the Y DMRS ports only include one or more from DMRS ports {0,1,8,9,4,5,12,13}, the number of CDM groups without data is: 1 and associated with a first value of the field, or 2 and associated with a second value of the field, for the Y MRS ports, wherein Y is an integer value; if Y is 2 and the number of continuous DMRS OFDM symbols is 1, the Y DMRS ports includes one of DMRS ports {8,9} or DMRS ports {10,11}; if Y is 3 and the number of continuous DMRS OFDM symbols is 1, the Y DMRS ports includes one of DMRS ports {0,8,9}, DMRS ports {2,10,11}, or DMRS ports {8,10,11}; if Y is 4 and the number of continuous DMRS OFDM symbols is 1, the Y DMRS ports includes one of DMRS ports {8,9,10,11}, DMRS ports {0,1,8,9}, or DMRS ports {2,3,10,11}; if Y is 2 and the number of continuous DMRS OFDM symbols is 2, the Y DMRS ports includes one of DMRS ports {8,9}, DMRS ports {10,11}, DMRS ports {12,13}, or DMRS ports {14,15}; if Y is 3 and the number of continuous DMRS OFDM symbols is 2, the Y DMRS ports includes one of DMRS ports {0,8,9}, DMRS ports {2,10,11}, DMRS ports {8,10,11}, DMRS ports {4,12,13}, DMRS ports {6,14,15}, or DMRS ports {8,9,12}; DMRS ports {10,11,14}; if Y is 4 and the number of continuous DMRS OFDM symbols is 2, the Y DMRS ports includes one of DMRS ports {8,9,10,11}, DMRS ports {12-15}, DMRS ports {8,9,12,13}, DMRS ports {0,1,8,9}, DMRS ports {2,3,10,11}, DMRS ports {6,7,10,11}, DMRS ports {4,5,12,13}, or DMRS ports {10, 11,14,15}; or if Y is 4 and the number of continuous DMRS OFDM symbols is 2, the first DMRS table includes a first value of the field with the Y DMRS ports being DMRS ports {0,1,4,5} and the number of CDM groups without data being 1, and a second value of the field with the Y DMRS ports being DMRS ports {0,1,4,5} and the number of CDM groups without data being 2.

In some embodiments, the plurality of categories of DMRS ports includes a category of DMRS ports with a FD-OCC of length L for DMRS type IL, and satisfies at least one of: if a number of continuous DMRS OFDM symbols is 1, the plurality of categories of DMRS ports includes DMRS ports {0-5,12-17}; if the number of continuous DMRS OFDM symbols is 1, CDM group 0 includes DMRS ports {0,1,12,13}, CDM group 1 includes DMRS ports {2,3,14, 15}, and CDM group 2 includes DMRS ports {4,5,16,17}; if the number of continuous DMRS OFDM symbols is 2, the plurality of categories of DMRS ports includes DMRS ports {0-23}; if the number of continuous DMRS OFDM symbols is 2, CDM group 0 includes DMRS ports {0,1,12,13,6,7,18, 19}, CDM group 1 includes DMRS ports {2,3,14,15,8,9,20, 21}, and CDM group 2 includes DMRS ports {4,5,16,17, 10,11,22,23}. L may be 4.

In some embodiments, the first DMRS parameter includes Y DMRS ports and a number of CDM groups without data, and satisfies at least one of: if the Y DMRS ports include at least one of DMRS ports{8-15}, the number of CDM groups without data is 2; if the Y DMRS ports only include one or more from DMRS ports {0,1,8,9,4,5,12,13}, the number of CDM groups without data is: 1 and associated with a first value of the field, or 2 and associated with a second value of the field, for the Y MRS ports. Y may be an integer value.

In some embodiments, the plurality categories of DMRS ports further includes a first category DMRS port of FD-OCC length 2, and if the first DMRS table is for a physical downlink shared channel (PDSCH), at least one of following would apply: the first DMRS parameter includes a parameter about a length of a FD-OCC of a DMRS port in a first DMRS port set; the wireless communication device determines a length of a FD-OCC of a DMRS port from a first DMRS port set; if the first DMRS parameter includes Y DMRS ports which includes one or more DMRS ports from a first DMRS port set, a length of a FD-OCC of one or more DMRS ports from the first DMRS port set depends on a relationship between the Y DMRS ports and a second DMRS port set; or a length of a FD-OCC of a DMRS port in a first DMRS port set is 2 or L.

In some embodiments, the length of a FD-OCC of one or more DMRS ports from the first DMRS port set depends on a relationship between the Y DMRS ports and a second DMRS port set, and satisfies at least one of: the length of a FD-OCC of one DMRS port from the first DMRS port set is L if the Y DMRS ports includes at least one ports from the second DMRS port set, or the length of a FD-OCC of one DMRS port from the first DMRS port set is L if the Y DMRS ports includes at least one port from the second DMRS port set and in one CDM group, wherein the one CDM group includes the one DMRS port.

In some embodiments, for DMRS type I, the first DMRS port set includes DMRS ports {0-7} and the second DMRS port set includes DMRS ports {8-15}. In some embodiments, for DMRS type II, the first DMRS port set includes DMRS ports {0-11} and the second DMRS port set includes DMRS ports {12-23}.

In some embodiments, the wireless communication device determines a sequence of a DMRS port p with a FD-OCC of length L, and mapped to resource elements (k, $l)_{p,\mu}$, according to:

$$a_{k,l}^{(p,u)} = w_f(k')w_t(l')r(L*n+k')$$

wherein: k=2*L*n+2*k'+Δ, or k=(2*L*n+2*k'+Δ)mod 12, where k is an index of a subcarrier, k'=0, 1, . . . , L−1, where k' is an intermediate parameter to determine an index of a sub-carrier k of a DMRS; l=l̄+l', where l is an OFDM symbol of the DMRS port, l' is an index of the OFDM symbol in one OFDM symbol group; l'=0, 1, . . . X−1, where X is a number of DMRS OFDM symbols in one DMRS OFDM symbol group, and/or is a number of continuous DMRS OFDM symbols; n comprises non-negative integer values; $w_f(k')$, $w_t(l')$, and Δ are provided by a defined table which includes a mapping between DMRS ports and the $w_f(k')$, $w_t(l')$, and Δ; where $w_f(k')$ is a FD-OCC, $w_t(l')$ is a TD-OCC, and Δ is a RE offset associated with a CDM group; μ is a parameter related to subcarrier spacing; p is an index of the DMRS port; the DMRS port p is a DMRS port of type I; and r(L*n+k') is a symbol with index L*n+k' in a symbol sequence of r(•).

In some embodiments, the wireless communication device determines a sequence of a DMRS port p of a category of the plurality of categories of DMRS ports, and mapped to resource elements $(k,l)_{p,\mu}$, according to:

$$a_{k,l}^{(p,\mu)} = w_f(k')w_t(l')r(L*n+k'),$$

wherein:

$$k = 3*L*n + k' \bmod 2 + 6*\left\lfloor \frac{k'}{2} \right\rfloor + \Delta,$$

where k is an index of a subcarrier; k'=0, 1, . . . , L−1, where k' is an intermediate parameter to determine an index of a sub-carrier k of a DMRS, and L is a length of one FD-OCC; $l=\bar{l}+l'$, where l is an OFDM symbol of the DMRS port, l' is index of an OFDM symbol in one OFDM symbol group; l'=0, 1, . . . X−1, where X is a number of DMRS OFDM symbols in one DMRS OFDM symbol group, and/or is a number of continuous DMRS OFDM symbols; n comprises non-negative integer values; $w_f(k')$, $w_t(l')$, and Δ are provided by a defined table which includes a mapping between DMRS ports and the $w_f(k')$, $w_t(l')$, and Δ; and $w_f(k')$ is a FD-OCC, $w_t(l')$ is a TD-OCC, and Δ is a RE offset associated with a CDM group; ρ is a parameter related to subcarrier spacing; p is an index of the DMRS port, and the DMRS port is a DMRS port of type I; and r(L*n+k') is a symbol with index L*n+k' in a symbol sequence of r(•).

In some embodiments, L includes one or more values from {2,3,4,6}.

In some embodiments, L includes one or more values from {1,2,3,4,6}.

In some embodiments, L includes more than one values, and each of the more than one values corresponds to one category of the plurality of categories of DMRS ports.

In some embodiments, X is 1 or 2.

In some embodiments, the first DMRS table is enabled by the first information. In some embodiments, a number of bits in the field is determined by the first information.

In some embodiments, the first information includes at least one of: a DMRS type of type I or type II, a maximum number of continuous DMRS OFDM symbols, a second DMRS parameter, or a number of the DMRS ports. In some embodiments, different DMRS types correspond to different frequency domain patterns of a DMRS port.

In some embodiments, if the first table includes DMRS ports of a physical uplink shared channel (PUSCH) and the first information is used to select the first table, the first information further includes the number of the DMRS ports.

In some embodiments, the first DMRS table that includes the first DMRS parameter of a plurality of categories of DMRS ports, satisfies at least one of: the first DMRS parameter is associated with one or more values of the field; or the first DMRS parameter is associated with one value of the field and one number of codewords, and includes one or more categories of DMRS ports.

In some embodiments, the first DMRS parameter, which is associated with the one value of the field and the one number of codewords, includes more than one categories of DMRS ports, and satisfies at least one of: the more than one categories of DMRS ports are in more than one CDM groups, and each of the more than one CDM groups includes one category of DMRS ports; the more than one categories of DMRS ports are for different channels; if the one value of the field and the one number of codewords are for one channel, DMRS ports of the one channel belong to one of the more than one categories; or if the one value of the field and the one number of codewords are for one channel, DMRS ports of the one channel belong to one category of the more than one categories, the one category depending on at least one of: a second parameter included in the first parameter, or a second parameter included in a second signaling.

In some embodiments, the second signaling includes at least one of downlink control information (DCI), radio resource control (RRC) or medium access control control element (MAC-CE) signaling.

In some embodiments, the signaling includes at least one of: DCI, RRC or MAC-CE signaling.

In some embodiments, the first DMRS parameter includes at least one of: a second parameter; a second parameter for each CDM group without data; a relationship between second parameters for different CDM groups without data; or a relationship between a second parameter of a DMRS port of the wireless communication device and a second parameter of a DMRS port of one or more potential co-scheduled wireless communication devices.

In some embodiments, the wireless communication device determines DMRS ports of the one or more potential co-scheduled wireless communication devices of the wireless communication device, according to the first parameter.

In some embodiments, the first parameter includes Y DMRS ports and satisfies at least one of: the Y DMRS ports include up to N DMRS ports in one CDM group, where N is a product of a length of a FD-OCC of a DMRS port in the one CDM group and a number of continuous DMRS OFDM symbols. In some embodiments, DMRS ports in different CDM groups of the Y DMRS ports correspond to different values of a second parameter.

In some embodiments, the second parameter comprises at least one of: a length of a frequency domain orthogonal cover code (FD-OCC), a length of a time domain orthogonal cover code (TD-OCC), a number of resource elements (REs) of one DMRS port in one OFM symbol of one physical resource block (PRB), or a number of DMRS OFDM symbol groups of one TD-OCC, wherein one DMRS OFDM symbol group includes one or more consecutive DMRS OFDM symbols.

In some embodiments, a wireless communication node determines a first demodulation reference signal (DMRS) table. In some embodiments, the wireless communication node send a value of a field in a signaling to a wireless communication device. In some embodiments, the wireless communication node causes the wireless communication device to determine a first DMRS parameter according to the first DMRS table and the value of the field. In some embodiments, the first DMRS table includes a mapping between values of the field of the signaling and values of the first DMRS parameter. In some embodiments, the first DMRS table includes the first DMRS parameter, that has values associated with a plurality of categories of DMRS ports, each category of the plurality of categories of DMRS ports corresponding to a respective one of a plurality of second parameters.

In some embodiments, a wireless communication device receives first information from a wireless communication node. In some embodiments, the wireless communication device determines that a category of DMRS ports is enabled according to the first information, wherein the category of DMRS ports has a frequency domain orthogonal cover code (FD-OCC) of length L where L is a positive integer value.

In some embodiments, the wireless communication device determines a sequence of a DMRS port p with a FD-OCC of length L, and mapped to resource elements $(k,l)_{p,\mu}$, according to:

$$a_{k,l}^{(p,n)} = w_f(k')w_t(l')r(L*n+k')$$

wherein: k=*L*n+2*k'+Δ, or k=(2*L*n+2*k'+Δ)mod 12, where k is an index of a subcarrier; k'=0,1, . . . , L−1, where k' is an intermediate parameter to determine an index of a sub-carrier k of a DMRS; $l=\bar{l}+l'$, where l is an OFDM symbol of the DMRS port, l' is an index of the OFDM symbol in one OFDM symbol group; l'=0,1, . . . X−1, where X is a number of DMRS OFDM symbols in one DMRS OFDM symbol group, and/or is a number of continuous DMRS OFDM symbols; n comprises non-negative integer values; $w_f(k')$, $w_t(l')$, and Δ are provided by a defined table which includes a mapping between DMRS ports and the $w_f(k')$, $w_t(l')$, and Δ; where $w_f(k')$ is a FD-OCC, $w_t(l')$ is a TD-OCC, and Δ is a RE offset associated with a CDM group; μ is a parameter related to subcarrier spacing; p is an index of the DMRS port; the DMRS port p is a DMRS port of type I; and r(L*n+k') is a symbol with index L*n+k' in a symbol sequence of r(•).

In some embodiments, L is 2, 3, 4, or 6. In some embodiments, L is 1, 2, 3, 4, or 6. In some embodiments, k=(2*L*n+2*k'+Δ)mod 12 is applies when L is 4.

In some embodiments, if L is 4, and the DMRS port p is of DMRS type I, at least one of following applies: the DMRS port occupies REs on two continuous DMRS PRBs; a number of PRBs of a bandwidth part (BWP) is an integer multiple of 2; a number of PRBs of the DMRS ports ise an integer multiple of 2; if a BWP does not include an integer multiple of 2 PRBs, a channel of the DMRS port is not allocated in a starting PRB or an ending PRB of the BWP; if a BWP does not include an integer multiple of 2 PRBs and a channel of the DMRS port with FD-OCC length 4 is allocated in a starting PRB or an ending PRB of the BWP, the channel is associated with a second DMRS port with a FD-OCC length not equal to 4, and corresponds to the DMRS port with FD-OCC length of 2 in the starting PRB or the ending PRB of the BWP; if n BWP does not include an integer multiple of 2 PRBs and a channel of the DMRS port with FD-OCC length 4 is allocated in a starting PRB or an ending PRB of the BWP, the channel is associated with a second DMRS port with FD-OCC length not equal to 4; the length of a FD-OCC of a DMRS port of a channel depends on PRBs of the channel.

In some embodiments, if L is 4, and the DMRS port p is of DMRS type I, the wireless communication device determines PRB groups of a BWP according to a number of PRBs of the BWP, and an index of the starting PRB of the BWP, wherein each of the PRB groups includes two continuous PRBs; or the wireless communication device determines PRB groups of PRBs allocated to a channel of the DMRS port with a FD-OCC of length 4.

In some embodiments, the channel of the DMRS port is allocated with all PRBs of one PRB group. In some embodiments, the channel of the DMRS port is not allocated with only a subset of PRBs of one PRB group. In some embodiments, if a PRB group includes only one PRB, the channel of the DMRS port is allocated with any PRB in the PRB group. In some embodiments, if the channel of the DMRS port is allocated with only one PRB in one PRB group, the channel is associated with a DMRS port with a length that is not 4. In some embodiments, if the channel of the DMRS port is allocated with only one PRB in one PRB group, the channel is associated with a DMRS port with a length that is not 4 in the one PRB group. In some embodiments, one PRB is in one precoding resource block group (PRG).

In some embodiments, the wireless communication device determines a sequence of a DMRS port p of a category of the plurality of categories of DMRS ports, that is mapped to resource elements $(k,l)_{p,\mu}$, according to:

$$a_{k,l}^{(p,\mu)} = w_f(k')w_t(l')r(L*n+k'),$$

wherein:

$$k = 3*L*n + k' \bmod 2 + 6*\left\lfloor \frac{k'}{2} \right\rfloor + \Delta,$$

where k is an index of a subcarrier; k'=0,1, . . . , L−1, where k' is an intermediate parameter to determine an index of a sub-carrier k of a DMRS, and L is a length of one FD-OCC; $l=\bar{l}+l'$, where l is an OFDM symbol of the DMRS port, l' is index of an OFDM symbol in one OFDM symbol group; l'=0,1, . . . X−1, where X is a number of DMRS OFDM symbols in one DMRS OFDM symbol group, and/or is a number of continuous DMRS OFDM symbols; n comprises non-negative integer values; $w_f(k')$, $w_t(l')$, and Δ are provided by a defined table which includes a mapping between DMRS ports and the $w_f(k')$, $w_t(l')$, and Δ; and $w_f(k')$ is a FD-OCC, $w_t(l')$ is a TD-OCC, and Δ is a RE offset associated with a CDM group; μ is a parameter related to subcarrier spacing; p is an index of the DMRS port, and the DMRS port is a DMRS port of type II; and r(L*n+k') is a symbol with index L*n+k' in a symbol sequence of r(•).

In some embodiments, L is 2 or 4.

In some embodiments, the wireless communication device determines according to a signaling or a rule, a corresponding relationship between PRBs and L.

In some embodiments, a first PRB set corresponds to L being equal to 2. In some embodiments, a second PRB set corresponds to L being larger than 2. In some embodiments, a first PRB set corresponds to L being one of 2, 3 or 6. In some embodiments, a second PRB set corresponds to L being equal to 4.

In some embodiments, the first PRB set is determined or obtained via the signaling. In some embodiments, the first PRB set includes an odd PRG. In some embodiments, the first PRB set includes an odd PRB. In some embodiments, the first PRB set includes an even PRG. In some embodiments, the first PRB set includes an even PRB.

In some embodiments, if a number of continuous DMRS OFDM symbols is 1, the plurality of categories of DMRS ports includes DMRS ports {0-5,12-17}. In some embodiments, if the number of continuous DMRS OFDM symbols is 1, CDM group 0 includes DMRS ports {0,1,12,13}, CDM group 1 includes DMRS ports {2,3,14,15}, and CDM group 2 includes DMRS ports {4,5,16,17}. In some embodiments, if the number of continuous DMRS OFDM symbols is 2, the plurality of categories of DMRS ports include DMRS ports {0-23}. In some embodiments, if the number of continuous DMRS OFDM symbols is 2, CDM group 0 includes DMRS ports {0,1,12,13,6,7,18,19}, CDM group 1 includes DMRS ports {2,3,14,15,8,9,20,21}, and CDM group 2 includes DMRS ports {4,5,16,17,10,11,22,23}. L may be 4 or 6.

In some embodiments, the category of DMRS port is included in a DMRS table, the DMRS table including a mapping between values of a field of a signaling and values of a first DMRS parameter.

In some embodiments, the first DMRS parameter includes Y DMRS ports and a number of CDM groups without data, and satisfies at least one of: if the Y DMRS ports include at least one of DMRS ports{12-23}, the number of CDM groups without data is 2; if the Y DMRS ports only include one or more DRMS ports from DMRS ports {0,1,6,7,12,13,18,19}, the number of CDM groups without data is: 1 and associated with a first value of the field, 2 and associated with a second value of the field, or 3 and associated with a third value of the field, wherein Y is an integer value.

In some embodiments, a non-transitory computer readable medium stores instructions, which when executed by at least one processor, cause the at least one processor to perform any method disclosed herein.

In some embodiments, an apparatus includes at least one processor to implement any method disclosed herein.

In some embodiments, a wireless communication device determines a first demodulation reference signal (DMRS) table. In some embodiments, the wireless communication device receives a value of a field in a signaling from the wireless communication node. The signaling can be downlink control information (DCI) signaling, radio access control (RRC) signaling, or medium access control control element (MAC-CE) signaling. In some embodiments, the wireless communication device determines a first DMRS parameter according to the first DMRS table and the value of the field. The first DMRS table may include a mapping between values of the field of the signaling and values of the first DMRS parameter. The first DMRS table may include the first DMRS parameter, that has values associated with a plurality of categories of DMRS ports. Each category of the plurality of categories of DMRS ports may correspond to a respective one of a plurality of second parameters.

In one aspect, indicating DMRS ports based on DMRS table as disclosed herein can support a larger number of DMRS ports. In one aspect, the DMRS table includes DMRS parameters of more than one categories of DMRS ports. Each of more than one categories of DMRS ports corresponds to a respective second parameter. In addition, one DMRS table may include more than one categories of DMRS ports to increase the flexibility of scheduling. The gNB can dynamically switch between different categories of DMRS ports and schedule old UE and new UE on demand. Index of DMRS port can be shared with different categories of DMRS port, to reduce overhead of signaling while supporting or allowing the flexibility of scheduling. Some parameter may be considered to get DMRS port of co-scheduled UEs. Accordingly, UE may get more accurate estimate of interference from co-scheduled UEs while allowing more DMRS ports. By allowing a larger number of DMRS ports, the wireless communication node may communicate with a larger number of wireless communication devices and may allow more layers of MIMO transmission, thereby increasing the spectral efficient of communication.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a DMRS pattern for FD-OCC length 2 in one OFDM and of DMRS type I, in accordance with some embodiments of the present disclosure;

FIG. 4 illustrates a DMRS pattern for FD-OCC length 3 in one OFDM and of DMRS type I, in accordance with some embodiments of the present disclosure;

FIG. 5 illustrates a DMRS pattern for FD-OCC length 2 in two continuous DMRS OFDM symbols and of DMRS type I, in accordance with some embodiments of the present disclosure;

FIG. 6 illustrates a DMRS pattern for FD-OCC length 3 in two continuous DMRS OFDM symbols and of DMRS type I, in accordance with some embodiments of the present disclosure;

FIG. 7 illustrates a DMRS pattern for FD-OCC length 6 in one DMRS OFDM symbol and of DMRS type I, in accordance with some embodiments of the present disclosure;

FIG. 8 illustrates a DMRS pattern for FD-OCC length 6 in two continuous DMRS OFDM symbols and of DMRS type I, in accordance with some embodiments of the present disclosure;

FIG. 10 illustrates a DMRS pattern for FD-OCC length 4 in two continuous DMRS OFDM symbols and of DMRS type I, in accordance with some embodiments of the present disclosure;

FIG. 11 illustrates a DMRS pattern for FD-OCC length 2 in one DMRS OFDM symbol and of DMRS type II, in accordance with some embodiments of the present disclosure;

FIG. 12 illustrates a DMRS pattern for FD-OCC length 4 in one DMRS OFDM symbol and of DMRS type II, in accordance with some embodiments of the present disclosure;

FIG. 13 illustrates a DMRS pattern for FD-OCC length 2 in two continuous DMRS OFDM symbols and of DMRS type II, in accordance with some embodiments of the present disclosure;

FIG. 14 illustrates a DMRS pattern for FD-OCC length 4 in two continuous DMRS OFDM symbols and of DMRS type II, in accordance with some embodiments of the present disclosure;

DETAILED DESCRIPTION

Mobile Communication Technology and Environment

Figure 1:
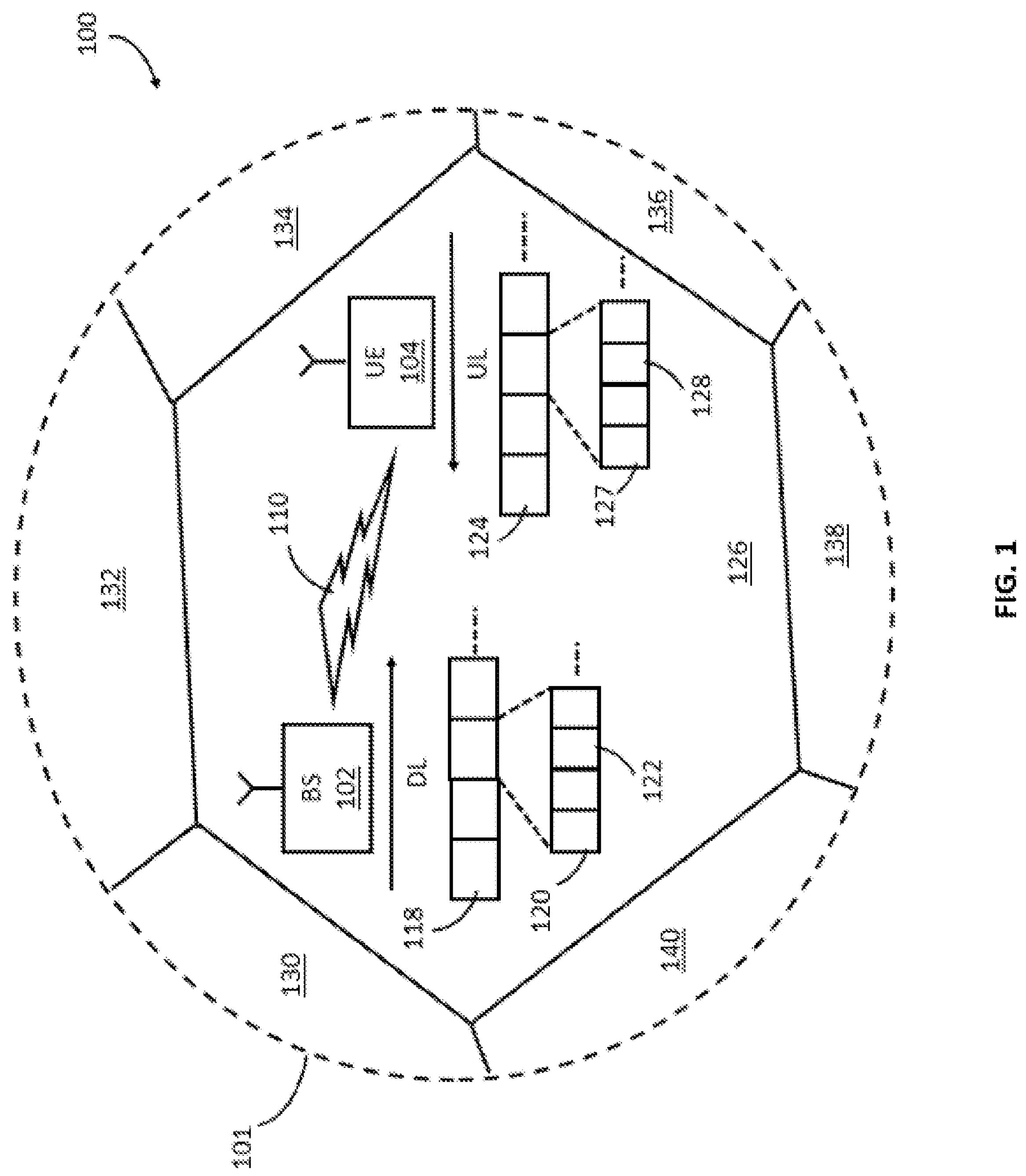
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
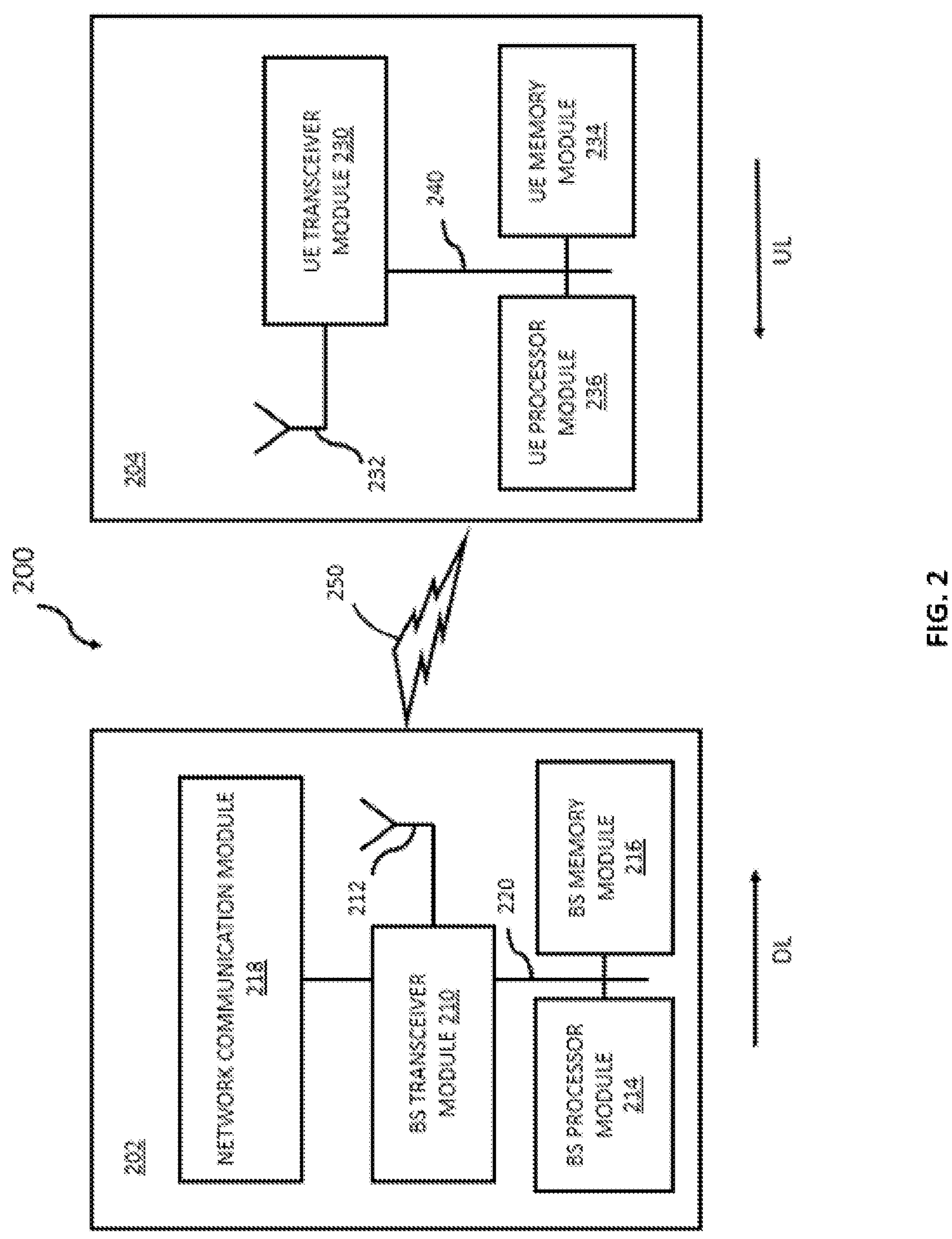
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication link 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 230 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Systems and Methods for Indicating and/or Determining DMRS Ports

More orthogonal DMRS ports can allow more layers of MIMO transmission. It is important to increase the spectral efficient of communication. How to increase more orthogonal DMRS ports is one problem that is addressed by the methods and systems described herein. In certain systems (e.g., 5G new radio (NR), Next Generation (NG) systems, 3GPP systems, and/or other systems), a wireless communication device (e.g., UE) and a wireless communication node (e.g., base station) may communicate with each other, according to DMRS parameters. In some embodiments, a wireless communication device determines a first demodulation reference signal (DMRS) table. In some embodiments, the wireless communication device receives a value of a field in a signaling from the wireless communication node. The signaling can be downlink control information (DCI) signaling, radio access control (RRC) signaling, or medium access control control element (MAC-CE) signaling. In some embodiments, the wireless communication device determines a first DMRS parameter according to the first DMRS table and the value of the field. The first DMRS table may include a mapping between values of the field of the signaling and values of the first DMRS parameter. The first DMRS table may include the first DMRS parameter of a plurality of categories of DMRS ports. Each category of the plurality of categories of DMRS ports may correspond to a respective one of a plurality of second parameters.

In one aspect, indicating DMRS ports based on DMRS table as disclosed herein can support a larger number of DMRS ports. In one aspect, the DMRS table includes DMRS parameters of more than one categories of DMRS ports. Each of more than one categories of DMRS ports corresponds to a respective second parameter. In addition, one DMRS table may include more than one categories of DMRS ports to increase the flexibility of scheduling. The gNB can dynamically switch between different categories of DMRS ports and schedule old UE and new UE on demand. Index of DMRS port can be shared with different categories of DMRS port, to reduce overhead of signaling while supporting or allowing the flexibility of scheduling. Some parameter may be considered to get DMRS port of co-scheduled UEs. Accordingly, UE may get more estimate of interference from co-scheduled UEs while allowing more DMRS port. By allowing a larger number of DMRS ports, the wireless communication node may communicate with a larger number of wireless communication devices and may allow more layers of MIMO transmission, thereby increasing the spectral efficient of communication.

Example 1: For UL DMRS Transmission, the Maximum Length of FD-OCC is 3

The UE may determine that the frequency domain OCC (FD-OCC) length of an uplink DMRS port belongs to {2, 3}. Which FD-OCC should be adopted for one uplink DMRS port may be informed/indicated by DCI. The UE may adopt the determined the FD-OCC length to transmit a DMRS of PUSCH, or to transmit a DMRS of PUCCH.

The frequency domain pattern of DMRS may be configured by DMRS type. The time domain pattern of DMRS may be configured by the maximum number of continuous OFDM symbols and additional DMRS position as shown in Table 2-1 to Table 2-3. Following examples of dynamically implementing switching between FD-OCC of length 2 and FD-OCC of length 3 are for different FD pattern configurations and time domain pattern configurations. The maximum number of continuous OFDM symbols is configured by parameter max-length. One DMRS Table includes DMRS port of FD-OCC of length 2 and FD-OCC of length 3. The DMRS table includes a mapping between values of a signaling and values of a first parameter.

Example 1-1: For DMRS Type I and a Maximum Number of Continuous OFDM Symbols of Value 1

The DMRS pattern for FD-OCC length 2 in one OFDM is shown in FIG. 3. The DMRS pattern for a FD-OCC of length 3 in one OFDM is shown in FIG. 4. One DMRS port may occupy each resource element (RE) of its corresponding CDM group. One FD-OCC may correspond to one CDM unit which can correspond to 1 set of CDM groups. One FD-OCC may correspond to REs of one CDM group in one CDM unit. Elements of one FD-OCC in order/sequence may correspond to REs of one CDM group in one CDM unit. The length of one FD-OCC may be equal to the number of REs of one CDM group in one CDM unit.

As shown in FIG. 3, one PRB may include three CDM units of FD-OCC of length 2 in one OFDM symbol for each CDM group. Each CDM unit of one CDM group may include two REs each of which may correspond to one element of one FD-OCC of length 2.

As shown in FIG. 4, one PRB can include two CDM units of FD-OCC of length 3 in one OFDM symbol for each CDM group. Each CDM unit of one CDM group may include three REs each of which may correspond to one element of one FD-OCC of length 3.

When the FD-OCC of length 2 is used, the UE may obtain the sequence of DMRS ports according to following equation (1):

$$a_{k,l}^{(p,\mu)} = w_f(k')w_t(l')r(2*n+k') \tag{1}$$

$$k = 4*n + 2*k' + \Delta$$

$$k' = 0, 1;$$

$$l = \bar{l} + l'$$

$$n = 0, 1 \ldots$$

$$l' = 0$$

where $w_f(k')$, $w_t(l')$, and $\Delta$ are given by Tables 1. The k is the index of sub-carrier. The reference point for k is sub-carrier 0 in common resource block 0. The l is the OFDM symbol of the DMRS. $\bar{l}$ is the first symbol of each continuous X OFDM symbol. $\bar{l}$ can be based on higher layer configuration of $l_0$, mapping type, PUSCH duration $l_d$, the X and whether intra-slot hopping is enabled, as shown in Table 2-1 to Table 2-3. The $l_0$ is the first DM-RS symbol of DMRS. r(m) is a symbol with index m in a symbol sequence generated by a function of Pseudo-random sequence generation or a function of low PAPR sequence generation. p is the DMRS ports indicated by a signaling and is based on the order indicated in the signaling, wherein the signaling includes one of DCI signaling, RRC signaling, or MAC-CE signaling. μ is a parameter related to subcarrier spacing, for example, the subcarrier spacing of the DMRS is $2^{\mu}*15$ kHz.

The reference point for l and the position $l_0$ of the first DM-RS symbol may depend on the mapping type. For PUSCH mapping type A, l may be set, defined, or determined relative to the start of the slot if frequency hopping is disabled and relative to the start of each hop in case frequency hopping is enabled, and $l_0$ may be set, given or determined by the higher-layer parameter dmrs-TypeA-Position. For PUSCH mapping type B, l is defined relative to the start of the scheduled PUSCH resources if frequency hopping is disabled and relative to the start of each hop in case frequency hopping is enabled, to $l_0=0$.

The position(s) of the DM-RS symbols may be set, given or determined by $\bar{l}$ and duration $l_d$ where $l_d$ may be the duration between the first OFDM symbol of the slot and the last OFDM symbol of the scheduled PUSCH resources in the slot for PUSCH mapping type A according to Table 3 and Table 4 if intra-slot frequency hopping is not used; $l_d$ may be the duration of scheduled PUSCH resources for PUSCH mapping type B according to Table 3 and Table 4 if intra-slot frequency hopping is not used; or $l_d$ may be the duration per hop according to Table 6 if intra-slot frequency hopping is used.

TABLE 1

| FD-OCC with length 2 | | | | | | |
|---|---|---|---|---|---|---|
| | CDM | | $w_f(k')$ | | $W_t(l')$ | |
| p | group λ | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 2-1

| | DM-RS positions $\bar{l}$ | | | | | | | |
|---|---|---|---|---|---|---|---|---|
| $l_d$ in | PUSCH mapping type A dmrs-AdditionalPosition | | | | PUSCH mapping type B dmrs-AdditionalPosition | | | |
| symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

TABLE 2-2

| | DM-RS positions $\bar{l}$ | | | | | | | |
|---|---|---|---|---|---|---|---|---|
| $l_d$ in | PUSCH mapping type A dmrs-AdditionalPosition | | | | PUSCH mapping type B dmrs-AdditionalPosition | | | |
| symbols | pos0 | pos1 | pos2 | pos3 | pos0 | pos1 | pos2 | pos3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0$, 5 | | |
| 9 | $l_0$ | $l_0$ | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | $l_0$ | $l_0$, 9 | | |

TABLE 2-3

| | DM-RS positions $\bar{l}$ | | | | | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| $l_d$ in symbols | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

Table 2-1 may be utilized in a case where the X is 1 and intra-slot hopping is disabled. Table 2-2 may be utilized in a case where the X is 2 and intra-slot hopping is disabled. Table 2-3 may be utilized to a case where the X is 1 and intra-slot hopping is enabled. The X may be the number of continuous DMRS OFDM symbols.

Table 2-1 to Table 2-3 may be applied to following example 1-1 through example 3-4, where the time domain OFDM position $\bar{l}$ may be based on Table 2-1 through Table 2-3 in the following example 1-1 through example 3-4.

When the FD-OCC of length 3 is utilized, the UE may assume the sequence of a DMRS port according to the following equation (2):

$$a_{k,l}^{(p,\mu)} = w_f(k')w_t(l')r(3*n+k') \tag{2}$$

$$k = 6*n + 2*k' + \Delta$$

$$k' = 0, 1, 2;$$

$$l = \bar{l} + l'$$

$$n = 0, 1 \ \ldots$$

$$l' = 0$$

where $w_f(k')$, $w_t(l')$, and $\Delta$ are given by Tables 3. $l$ is based on Table 2. The $w_t(l')$ for $l'=1$ in Table 3 can be ignored for this configuration of max number of continuous DMRS OFDM symbols with value 1. The max number of continuous DMRS OFDM symbols may be set, determined, or configured by the parameter of max-length. Then, for this configuration, it can include DMRS ports of {0,1,2,3,8,9, 10,11} because the $w_t(l')$ may only have one element corresponding to $l'=0$. The DMRS ports distinguished by TD-OCC may be enabled in case of the configuration of DMRS type 1 and max-length equaling 2.

TABLE 3

| FD-OCC with length 3 | | | | | | | |
|---|---|---|---|---|---|---|---|
| | CDM group | | $w_f$ (k') | | | $w_t$ (l') | |
| p | λ | Δ | k' = 0 | k' = 1 | k' = 2 | l' = 0 | l' = 1 |
| 8 | 0 | 0 | +1 | $e^{j2\pi\frac{1}{3}}$ | $e^{j2\pi\frac{2}{3}}$ | +1 | +1 |
| 9 | 0 | 0 | +1 | $e^{j2\pi\frac{2}{3}}$ | $e^{j2\pi\frac{1}{3}}$ | +1 | +1 |
| 10 | 1 | 1 | +1 | $e^{j2\pi\frac{1}{3}}$ | $e^{j2\pi\frac{2}{3}}$ | +1 | +1 |
| 11 | 1 | 1 | +1 | $e^{j2\pi\frac{2}{3}}$ | $e^{j2\pi\frac{1}{3}}$ | +1 | +1 |
| 12 | 0 | 0 | +1 | $e^{j2\pi\frac{1}{3}}$ | $e^{j2\pi\frac{2}{3}}$ | +1 | −1 |
| 13 | 0 | 0 | +1 | $e^{j2\pi\frac{2}{3}}$ | $e^{j2\pi\frac{1}{3}}$ | +1 | −1 |

TABLE 3-continued

| FD-OCC with length 3 | | | | | | | |
|---|---|---|---|---|---|---|---|
| | CDM group | | $w_f$(k') | | | $w_t$ (l') | |
| p | λ | Δ | k' = 0 | k' = 1 | k' = 2 | l' = 0 | l' = 1 |
| 14 | 1 | 1 | +1 | $e^{j2\pi\frac{1}{3}}$ | $e^{j2\pi\frac{2}{3}}$ | +1 | −1 |
| 15 | 1 | 1 | +1 | $e^{j2\pi\frac{2}{3}}$ | $e^{j2\pi\frac{1}{3}}$ | +1 | −1 |

Alternatively, the equations (1) and (2) can be unified to following equation:

a.

$$a_{k,l}^{(p,\mu)} = w_f(k')w_t(l')r(L*n+k') \quad (3)$$

$$k = 2*L*n+2*k'+\Delta$$

$$k' = 0, 1, \ldots, L-1;$$

$$l = \bar{l} + l'$$

$$n = 0, 1 \ldots$$

$$l' = 0$$

$$L \in \{2, 3\}$$

wherein L may be the length of FD-OCC. For example, if FD-OCC length is 2, then L may be 2. If FD-OCC length is 3, then L may be 3. In Table 3, there are two DMRS ports corresponding to one $w_t$(l'). Although there may be L DMRS ports corresponding to one $w_t$(l') for FD-OCC length L, but the DMRS port of FD-OCC length 2 with $w_f$(k')=[1,1] and the DMRS port of FD-OCC length 3 with $w_f$(k')=[1,1,1] may share the same DMRS port number to reduce the overhead of indication in DCI. The UE may not distinguish the two DMRS ports because their sequences are the same. The gNB can distinguish them based on DMRS ports of MU UE. For example, if the gNB schedules UE 1 with the DMRS port 0 and UE 2 with DMRS port {8,9} and UE 1 and UE 2 are MU UE, then gNB may get the channel of DMRS port 0 with FD-OCC length 3. If the gNB schedules UE 1 with the DMRS port 0 and UE 2 with DMRS port 1 and UE 1 and UE 2 are MU UE, then gNB should get the channel of DMRS port 0 with FD-OCC length 2. The FD-OCC length of DMRS port 0 may be determined by gNB and the UE may not need to know. Similarly, for DMRS ports 0, 2, 4, 6, FD-OCC length 2 and FD-OCC length 3 may share the same DMRS port number. The actual FD-OCC length of the DMRS port {0, 2, 4, 6} may be determined by gNB and the UE may not know the actual FD-OCC.

The gNB can inform the UE which FD-OCC length should be used to transmit the uplink DMRS using following Table 4-1 or Table 4-2 if the rank indicated in the DCI is 1. That is the gNB informs the DMRS ports corresponding to FD-OCC length 2 and FD-OCC length 3 by DCI according to Table 4-1 or Table 4-2 if the rank indicated in the DCI is 1. The DMRS ports corresponding to a FD-OCC of length 2 and DMRS ports corresponding to a FD-OCC of length 3 may be indexed together and are included in one Table, then the gNB can dynamically switch DMRS port of FD-OCC length 2 and FD-OCC length 3. It allows new UE can be scheduled as MU (multiple UE) UE with old UE or new UE.

A new UE may be with Rel-18 DMRS enhancement feature/capability. An old UE may be without Rel-18 DMRS enhancement feature/capability. For example, if the gNB attempts to or intends to schedule one old UE and one new UE in one CDM group as MU UE, then the gNB can schedule the new UE with DMRS ports corresponding to FD-OCC length 2. If the gNB attempts to or intends to schedule three new UEs in one CDM group as MU UE, then the gNB can schedule the three new UEs with DMRS ports corresponding to FD-OCC length 3.

In some implementation, the value of rank is determined according to the SRS resource indicator field if a non codebook scheme is configured, and determined according to the field of precoding information and number of layers if a codebook scheme is configured.

TABLE 4-1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 2 | 8 |
| 7 | 2 | 9 |
| 8 | 2 | 10 |
| 9 | 2 | 11 |
| 10~15 | Reserved | Reserved |

TABLE 4-2

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 1 | 8 |
| 7 | 1 | 9 |
| 8 | 2 | 8 |
| 9 | 2 | 9 |
| 10 | 2 | 10 |
| 11 | 2 | 11 |
| 12~15 | Reserved | Reserved |

The gNB can inform the UE which FD-OCC length should be used to transmit the uplink DMRS using following Table 5-1 or Table 5-2 if the rank indicated in the DCI is 2.

TABLE 5-1

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4 | 2 | 8, 9 |
| 5 | 2 | 10, 11 |
| 6-15(or 6-7) | Reserved | Reserved |

TABLE 5-2

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4 | 1 | 8, 9 |
| 5 | 2 | 8, 9 |
| 6 | 2 | 10, 11 |
| 7-15(or 7) | Reserved | Reserved |

The gNB can inform the UE which FD-OCC length should be used to transmit the uplink DMRS using following Table 6-1 or Table 6-2 if the rank indicated in the DCI is 3.

TABLE 6-1

| Value | Number of DMRS CDM group(s) without data | DMRS port(s) |
|---|---|---|
| 0 | 2 | 0-2 |
| 1 | 2 | 0, 8, 9 |
| 2 | 2 | 2, 10, 11 |
| 3 | 2 | 8, 10, 11 |
| 4-15(or 4-7) | Reserved | Reserved |

TABLE 6-2

| Value | Number of DMRS CDM group(s) without data | DMRS port(s) |
|---|---|---|
| 0 | 2 | 0-2 |
| 1 | 1 | 0, 8, 9 |
| 2 | 2 | 0, 8, 9 |
| 3 | 2 | 2, 10, 11 |
| 4 | 2 | 8, 10, 11 |
| 5-15(or 5-7) | Reserved | Reserved |

The gNB can inform the UE which FD-OCC length should be used to transmit the Uplink DMRS using following Table 7-1 or Table 7-2 if the rank indicated in the DCI is 4.

TABLE 7

| Value | Number of DMRS CDM group(s) without data | DMRS port(s) |
|---|---|---|
| 0 | 2 | 0-3 |
| 1 | 2 | 8, 9, 10, 11 |
| 2-15(or 2-7) | Reserved | Reserved |

The number of CDM groups without data of values 1 and 2 in Tables 4-1 to 7 may refer to CDM groups {0} and {0,1} respectively, wherein the CDM group 0,1 is shown in FIG. 3, FIG. 4, Table 1 and Table 3.

The Table 4-1 to Table 7 may be enabled by a second DMRS parameter is configured. For same rank, only one Table may be enabled, for example, only Table 4-1 or Table 4-2 can be enabled. The number of bits of the field may be determined by the second DMRS parameter, DMRS type and maximum number of continuous DMRS OFDM symbols. The number of bits of the field of the Table 4-1 to Table 7 may be same. They have 4 bits. Alternatively, Table 4-1 or Table 4-2 may be enabled by the second DMRS parameter. Table 5-1 to Table 7 can reuse old Table of Rel-15 to Rel-17. Some new entry may be added to old Table of old Rel such as Rel-15 to Rel-17. The number of bits of the field may be determined by the second DMRS parameter, rank, DMRS type and maximum number of continuous DMRS OFDM symbols. The number of bits of the field of the Table 4-1 or Table 4-2 may be 4. The number of bits of the field of the Table 5-1 or Table 5-2 may be 3.

The DMRS ports corresponding to FD-OCC length 3 may not be scheduled to an old UE who cannot recognize the DMRS ports corresponding to FD-OCC length 3.

Example 1-2: For DMRS Type I and Max Number of Continuous OFDM Symbols with Value 2

The DMRS pattern for FD-OCC length 2 in two continuous OFDM is shown in FIG. 5. The DMRS pattern for FD-OCC length 3 in two continuous OFDM is shown in FIG. 6. The two continuous OFDM may correspond to one TD-OCC unit. Each element of TD-OCC length 2 may correspond to one OFDM in the two continuous OFDM.

When the FD-OCC length 2 is used, the UE may assume the sequence of a DMRS port according to following equation (4):

$$a_{k,l}^{(p,\mu)} = w_f(k')w_t(l')r(2*n+k') \tag{4}$$

$$k = 4*n+2*k'+\Delta$$

$$k' = 0,1;$$

$$l = \bar{l}+l'$$

$$n = 0,\ 1\ \ldots$$

$$l' = 0,\ 1$$

When the FD-OCC length 3 is used, the UE may assume the sequence of a DMRS port according to the following equation (5):

$$a_{k,l}^{(p,\mu)} = w_f(k')w_t(l')r(3*n+k') \tag{5}$$

$$k = 6*n+2*k'+\Delta$$

$$k' = 0,\ 1,\ 2;$$

$$l = \bar{l}+l'$$

$$n = 0,\ 1\ \ldots$$

$$l' = 0,\ 1$$

The equations (1) to (5) can be combined to the following equation (6):

$$a_{k,l}^{(p,\mu)} = w_f(k')w_t(l')r(L*n+k') \tag{6}$$

$$k = 2*L*n+2*k'+\Delta$$

$$k' = 0,\ 1,\ \ldots\ ,\ L-1;$$

$$l = \bar{l}+l'$$

$$n = 0,\ 1\ \ldots$$

$$l' = 0,\ 1,\ \ldots\ X-1$$

$$L \in \{2,\ 3\}$$

wherein the X may be the number of continuous DMRS OFDM symbols. If max-length is determined/configured to 1, the X may be equal 1 and l'=0. When max-length is determined/configured to 2 and single symbol is indicated by DCI, the X may be equal 1 and l'=0. When max-length is determined/configured to 2 and double symbol is indicated by DCI, the X may be equal 2 and 1'=0,1.

The DCI may indicate that the number of continuous symbols is 1 or 2 by number of front-load symbols as shown in Tables 8 through 10. The DCI may indicate which FD-OCC length is used by the UE to transmit uplink DMRS.

The gNB can inform the UE which FD-OCC length may be used to transmit the Uplink DMRS according to following Table 8 if the rank indicated in the DCI is 1.

TABLE 8

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14 | 1 | 8 | 1 |
| 15 | 1 | 9 | 1 |
| 16 | 2 | 8 | 1 |
| 17 | 2 | 9 | 1 |
| 18 | 2 | 10 | 1 |
| 19 | 2 | 11 | 1 |
| 20 | 2 | 8 | 2 |
| 21 | 2 | 9 | 2 |
| 22 | 2 | 10 | 2 |
| 23 | 2 | 11 | 2 |
| 24 | 2 | 12 | 2 |
| 25 | 2 | 13 | 2 |
| 26 | 2 | 14 | 2 |
| 27 | 2 | 15 | 2 |
| 28-31 | Reserved | Reserved | Reserved |

The gNB may inform the UE which FD-OCC length should be used to transmit the Uplink DMRS using following Table 9 if the rank indicated in the DCI is 2.

TABLE 9

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 2 | 0, 2 | 1 |
| 4 | 2 | 0, 1 | 2 |
| 5 | 2 | 2, 3 | 2 |
| 6 | 2 | 4, 5 | 2 |
| 7 | 2 | 6, 7 | 2 |
| 8 | 2 | 0, 4 | 2 |
| 9 | 2 | 2, 6 | 2 |
| 10 | 1 | 8, 9 | 1 |
| 11 | 2 | 8, 9 | 1 |
| 12 | 2 | 10, 11 | 1 |
| 13 | 2 | 8, 9 | 2 |
| 14 | 2 | 10, 11 | 2 |
| 15 | 2 | 12, 13 | 2 |

TABLE 9-continued

| Value | Number of DMRS CDM group(s) without data | DMRS port(s) | Number of front-load symbols |
|---|---|---|---|
| 16 | 2 | 14, 15 | 2 |
| 17-31 | Reserved | Reserved | Reserved |

The gNB can inform the UE which FD-OCC length should be used to transmit the Uplink DMRS using following Table 10 if the rank indicated in the DCI is 3.

TABLE 10

| Value | Number of DMRS CDM group(s) without data | DMRS port(s) | Number of front-load symbols |
|---|---|---|---|
| 0 | 2 | 0-2 | 1 |
| 1 | 2 | 0, 1, 4 | 2 |
| 2 | 2 | 2, 3, 6 | 2 |
| 3 | 1 | 0, 8, 9 | 1 |
| 4 | 2 | 0, 8, 9 | 1 |
| 5 | 2 | 2, 10, 11 | 1 |
| 6 | 2 | 0, 8, 9 | 2 |
| 7 | 2 | 4, 12, 13 | 2 |
| 8 | 2 | 2, 10, 11 | 2 |
| 9 | 2 | 6, 14, 15 | 2 |
| 10 | 1 | 8, 9, 12 | 2 |
| 11-31(or 10-15) | Reserved | Reserved | Reserved |

The gNB can inform the UE which FD-OCC length should be used to transmit the Uplink DMRS using following Table 11 or Table 12 if the rank indicated in the DCI is 4.

TABLE 11

| Value | Number of DMRS CDM group(s) without data | DMRS port(s) | Number of front-load symbols |
|---|---|---|---|
| 0 | 2 | 0-3 | 1 |
| 1 | 2 | 0, 1, 4, 5 | 2 |
| 2 | 2 | 2, 3, 6, 7 | 2 |
| 3 | 2 | 0, 2, 4, 6 | 2 |
| 4 | 2 | 8, 9, 10, 11 | 1 |
| 5 | 2 | 8, 9, 12, 13 | 2 |
| 6 | 2 | 10, 11, 14, 15 | 2 |
| 7-31(7-15) | Reserved | Reserved | Reserved |

The Table 4 to Table 12 may be enabled by the second DMRS parameter. The number of bits of the field may be determined by the second DMRS parameter, DMRS type and maximum number of continuous DMRS OFDM symbols. The number of bits of values of Table 4 to Table 11 may be the same and may be 5 bits.

Alternatively, Table 8 and Table 9 may be new tables and are enabled by the second DMRS parameter. Table 10 and Table 11 may be old Tables with some new entries including DMRS ports corresponding to FD-OCC length 3. The number of bits of the field may be determined by the second DMRS parameter, DMRS type, maximum number of continuous DMRS OFDM symbols and rank. The number of bits of values of Table 4 to Table 11 may be the same and may be 5 bits.

Alternatively, Table 8 to 12 may be enabled, but the number of bits of these Tables can be different. The number of bits may depend on a rank.

In some embodiments, the DMRS ports corresponding to FD-OCC length 3 can only be indicated to new UE who has Rel-18 DMRS enhancement feature/capability.

TABLE 12

| Value | Number of DMRS CDM group(s) without data | DMRS port(s) | Number of front-load symbols |
|---|---|---|---|
| 0 | 2 | 0-3 | 1 |
| 1 | 2 | 0, 1, 4, 5 | 2 |
| 2 | 2 | 2, 3, 6, 7 | 2 |
| 3 | 2 | 0, 2, 4, 6 | 2 |
| 4 | 2 | 8, 9, 10, 11 | 1 |
| 5 | 1 | 8, 9, 12, 13 | 2 |
| 6 | 2 | 8, 9, 12, 13 | 2 |
| 7 | 2 | 10, 11, 14, 15 | 2 |
| 8 | 1 | 0, 1, 4, 5 | 2 |
| 9-31(or 9-15) | Reserved | Reserved | Reserved |

The value of first column in Table 4 to 12 may correspond to a value of a bit field of antenna indicated in the DCI.

The number of CDM groups without data of values 1, 2, and 3 in Tables 8 to 12 may refer to CDM groups {0}, {0,1}, respectively, wherein the CDM group 0,1 is shown in FIG. 5, FIG. 6, Table 1 and Table 3.

Example 2: For UL DMRS, the Maximal Length of FD-OCC is 6

The UE may determine that the frequency domain (FD)-OCC length of uplink DMRS port may belong to {2,6}. Which FD-OCC should be adopted for one uplink DMRS port may be informed by DCI. The UE may adopt the determined the FD-OCC length to transmit DMRS of PUSCH, or transmit DMRS of PUCCH.

The frequency pattern of DMRS may be configured by DMRS type. The time domain pattern of DMRS may be configured by max number of continuous OFDM symbols and additional DMRS position as shown in Table 2-1, Table 2-2, or Table 2-3. Following examples of dynamically switching between FD-OCC of length 2 and FD-OCC of length 6 may be for different FD pattern configuration and time domain pattern configuration. The max number of continuous OFDM symbols may be configured by parameter max-length.

Example 2-1: For DMRS Type I and Max Number of Continuous OFDM Symbols with Value 1

The DMRS pattern for FD-OCC length 2 in one OFDM may be shown in FIG. 3. The DMRS pattern for FD-OCC length 6 in one OFDM may be shown in FIG. 7. One DMRS port may occupy each resource element (RE) of its corresponding CDM group. One FD-OCC may correspond to one CDM unit. One FD-OCC may correspond to REs of one CDM group in one CDM unit. Elements of one FD-OCC in order corresponds to REs of one CDM group in one CDM unit, The length of one FD-OCC may be equal to the number of REs of one CDM group in one CDM unit. The number of REs in one CDM units may be equal to the length of FD-OCC multiple the number of CDM groups in one CDM unit. As shown in FIG. 7, the number of REs in one CDM units may be 6*2=12.

As shown in FIG. 7, one PRB may include one CDM units of FD-OCC of length 6 in one OFDM symbol for each CDM group. Each CDM unit of one CDM group may include 6 REs each of which may correspond to one element of one FD-OCC of length 3.

When the FD-OCC length 2 is used, the UE may assume the sequence of a DMRS port according to equation (1) and Table 1.

When the FD-OCC length 6 is used, the UE may assume the sequence of a DMRS port according to equation (7), $$a_{k,l}^{(p,\mu)} = w_f(k')w_t(l')r(6*n+k') \tag{7}$$

$$k = 12*n + 2*k' + \Delta$$

$$k' = 0, 1, 2, 3, 4, 5;$$

$$l = \bar{l} + l'$$

$$n = 0, 1 \ldots$$

$$l' = 0$$

where $w_f(k')$, $w_t(l')$, and $\Delta$ may be obtained by Tables 13. l may be based on one of Table 2-1, Table 2-2, Table 2-3. The $w_t(l')$ for l'=1 in Table 13 can be ignored for this configuration of max number of continuous OFDM symbols with value 1. Then for this configuration, it includes DMRS ports of {0,1,2,3,8,9,10,11}, because the $w_t(l')$ may only have one element corresponding to l'=0. The DMRS ports distinguished by TD-OCC may be enabled for the case of the configuration of DMRS type 1 and max-length equaling to 2.

TABLE 13

| FD-OCC with length 6 | | | | | | | | | | |
|---|---|---|---|---|---|---|---|---|---|---|
| | CDM group | | $w_f(k')$ | | | | | | $w_t(l')$ | |
| p | λ | Δ | k' = 0 | k' = 1 | k' = 2 | k' = 3 | k' = 4 | k' = 5 | l' = 0 | l' = 1 |
| 8 | 0 | 0 | +1 | $e^{j\pi\frac{2}{3}}$ | $e^{j\pi\frac{4}{3}}$ | 1 | $e^{j\pi\frac{2}{3}}$ | $e^{j\pi\frac{4}{3}}$ | +1 | +1 |
| 9 | 0 | 0 | +1 | $e^{j\pi\frac{4}{3}}$ | $e^{j\pi\frac{2}{3}}$ | 1 | $e^{j\pi\frac{4}{3}}$ | $e^{j\pi\frac{2}{3}}$ | +1 | +1 |
| 10 | 1 | 1 | +1 | $e^{j\pi\frac{2}{3}}$ | $e^{j\pi\frac{4}{3}}$ | 1 | $e^{j\pi\frac{2}{3}}$ | $e^{j\pi\frac{4}{3}}$ | +1 | +1 |
| 11 | 1 | 1 | +1 | $e^{j\pi\frac{4}{3}}$ | $e^{j\pi\frac{2}{3}}$ | 1 | $e^{j\pi\frac{4}{3}}$ | $e^{j\pi\frac{2}{3}}$ | +1 | +1 |
| 12 | 0 | 0 | +1 | $e^{j\pi\frac{2}{3}}$ | $e^{j\pi\frac{4}{3}}$ | 1 | $e^{j\pi\frac{2}{3}}$ | $e^{j\pi\frac{4}{3}}$ | +1 | −1 |
| 13 | 0 | 0 | +1 | $e^{j\pi\frac{4}{3}}$ | $e^{j\pi\frac{2}{3}}$ | 1 | $e^{j\pi\frac{4}{3}}$ | $e^{j\pi\frac{2}{3}}$ | +1 | −1 |
| 14 | 1 | 1 | +1 | $e^{j\pi\frac{2}{3}}$ | $e^{j\pi\frac{4}{3}}$ | 1 | $e^{j\pi\frac{2}{3}}$ | $e^{j\pi\frac{4}{3}}$ | +1 | −1 |
| 15 | 1 | 1 | +1 | $e^{j\pi\frac{4}{3}}$ | $e^{j\pi\frac{2}{3}}$ | 1 | $e^{j\pi\frac{4}{3}}$ | $e^{j\pi\frac{2}{3}}$ | +1 | −1 |

Alternatively, the equations (1) and (7) can be unified to following equation (8):

a.

$$a_{k,l}^{(p,\mu)} = w_f(k')w_t(l')r(L*n+k') \tag{8}$$

$$k = 2*L*n + 2*k' + \Delta$$

-continued $$k' = 0, 1, \ldots, L-1;$$

$$l = \bar{l} + l'$$

$$n = 0, 1 \ldots$$

$$j = 0, 1, \ldots, v-1$$

$$l' = 0$$

$$L \in \{2, 6\}$$

wherein L may be the length of FD-OCC. For example, if FD-OCC length is 2, then L may be 2, and if FD-OCC length is 6, then L may be 6. In Table 13, there are two DMRS ports corresponding to one $w_t$(l'). Although there are L DMRS ports corresponding to one $w_t$(l') for FD-OCC length L, to reduce the overhead of indication in DCI, the DMRS port of FD-OCC length 2 with $w_f$(k')=[1,1] and the DMRS port of FD-OCC length 6 with $w_f$(k')=[1,1,1,1,1,1] may share same DMRS port number, and the DMRS port of FD-OCC length 2 with $w_f$(k')=[1,−1] and the DMRS port of FD-OCC length 6 with w/(k')=[1,1,1,1,1,1] may share the same DMRS port number. In one example, 4 $w_f$(k') may be chosen or selected from 6 orthogonal FD-OCCs of length 6. The UE may not distinguish the two DMRS ports sharing the same DMRS port number because their sequences are the same. The gNB can distinguish them based on DMRS ports of MU UE. For example, if the gNB schedules UE 1 with the DMRS port {0,1} and UE 2 with DMRS port {8,9} and UE 1 and UE 2 are MU UE, then gNB may obtain the channel of DMRS port {0,1} with FD-OCC length 6. If the gNB schedules UE 1 with the DMRS port 0 and UE 2 with DMRS port 1 and UE 1 and UE 2 are MU UE, then gNB may obtain the channel of DMRS port 0 with FD-OCC length 2. The FD-OCC length of DMRS port 0 may be determined by gNB and the UE may not know. Similar aspects can be applied to DMRS port {1-7}. For example, for DMRS ports 0-7, FD-OCC length 2 and FD-OCC length 6 may share the same DMRS port number (number of DMRS ports). The actual FD-OCC length of the DMRS port {0,1,2,3,4,5,6,7} may be determined by gNB and may not be known by UE.

The gNB can inform the UE which FD-OCC length should be used to transmit the Uplink DMRS using following Table 14-1 or 14-2 if the rank indicated in the DCI is 1. The DMRS ports corresponding to FD-OCC length 2 and DMRS ports corresponding to FD-OCC length 6 may be indexed together and may be included in one Table, then the gNB can dynamical switch DMRS port of FD-OCC length 2 and FD-OCC length 6. It allows new UE to be scheduled as multiple UE (MU) with old UE or new UE. A new UE may have or may be compatible with Rel-18 DMRS enhancement feature. An old UE may not have or may not support Rel-18 DMRS enhancement feature. For example, if the gNB attempts to or intends to schedule one old UE and one new UE in one CDM group as MU, then the gNB can schedule the new UE with DMRS ports corresponding to FD-OCC length 2. If the gNB attempts to or intends to schedule four new UEs in one CDM group as MU, then the gNB can schedule the new UE with DMRS ports corresponding to FD-OCC length 6. For example, each of the four new UEs can be scheduled with one of DMRS ports of {10,1,8,9}.

In some implementation, the value of rank may be determined according to the SRS resource indicator field if non codebook scheme is configured and according to the field of precoding information and number of layers if codebook scheme is configured.

TABLE 14-1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 2 | 8 |
| 7 | 2 | 9 |
| 8 | 2 | 10 |
| 9 | 2 | 11 |
| 10~15 | Reserved | Reserved |

TABLE 14-2

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 1 | 8 |
| 7 | 1 | 9 |
| 8 | 2 | 8 |
| 9 | 2 | 9 |
| 10 | 2 | 10 |
| 11 | 2 | 11 |
| 12~15 | Reserved | Reserved |

The gNB can inform the UE which FD-OCC length should be used to transmit the Uplink DMRS using following Table 15 if the rank indicated in the DCI is 2.

TABLE 15

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4 | 1 | 8, 9 |
| 5 | 2 | 8, 9 |
| 6 | 2 | 10, 11 |
| 7-15(or 7) | Reserved | Reserved |

The gNB can inform the UE which FD-OCC length should be used to transmit the Uplink DMRS using following Table 16 if the rank indicated in the DCI is 3.

TABLE 16

| Value | Number of DMRS CDM group(s) without data | DMRS port(s) |
|---|---|---|
| 0 | 2 | 0-2 |
| 1 | 1 | 0, 8, 9 |
| 2 | 2 | 0, 8, 9 |
| 3 | 2 | 2, 10, 11 |
| 4 | 2 | 8, 10, 11 |
| 5-15(or 5-7) | Reserved | Reserved |

The gNB can inform the UE which FD-OCC length should be used to transmit the Uplink DMRS using following Table 17 if the rank indicated in the DCI is 4.

TABLE 17

| Value | Number of DMRS CDM group(s) without data | DMRS port(s) |
|---|---|---|
| 0 | 2 | 0-3 |
| 1 | 2 | 8, 9, 10, 11 |
| 2 | 1 | 0, 1, 8, 9 |
| 3 | 2 | 0, 1, 8, 9 |
| 4 | 2 | 2, 3, 10, 11 |
| 2-15(or 2-7) | Reserved | Reserved |

The number of CDM groups without data of values 1, 2, and 3 in Tables 14 to 17 may refer to CDM groups {0}, {0,1}, and {0, 1,2} respectively, wherein the CDM group 0,1 is shown in FIG. 3, FIG. 7, Table 1 and Table 13.

The Table 14-1 to Table 17 may be enabled by the second DMRS parameter Alternatively, Table 14-1 or Table 14-2 may be enabled by the second DMRS parameter. Table 15 to Table 17 can reuse old Table of Rel-15. Some new entry may be added to old Table of old Rel such as Rel-15 to Rel-17. The DMRS ports corresponding to FD-OCC length 6 may not be scheduled to an old UE who may not recognize the DMRS ports corresponding to FD-OCC length 6.

i.Example 2-2: For DMRS Type I and Max Number of Continuous OFDM Symbols with Value 2

The DMRS pattern for FD-OCC length 2 in two continuous OFDM is shown in FIG. 5. the DMRS pattern for FD-OCC length 6 in two continuous OFDM is shown in FIG. 8. The two continuous OFDM corresponds to one TD-OCC unit. Each element of TD-OCC length 2 corresponds one OFDM in the two continuous OFDM.

When the FD-OCC length 2 is used, the UE may assume the sequence of a DMRS port according to following equation (4) and Table 1.

When the FD-OCC length 6 is used, the UE may assume the sequence of a DMRS port corresponding to FD-OCC length according to following equation (9)

$$a_{k,l}^{(p,\mu)} = w_f(k')w_t(l')r(6*n+k') \quad (9)$$

$$k = 12*n + 2*k' + \Delta$$

$$k' = 0, 1, 2, 3, 4, 5;$$

$$l = \bar{l} + l'$$

$$n = 0, 1 \ldots$$

$$l' = 0, 1$$

The equations (1), (7), (8) and (9) can be combined to following equation (10)

$$a_{k,l}^{(p,\mu)} = w_f(k')w_t(l')r(L*n+k') \quad (10)$$

b.
$$k = 2*L*n + 2*k' + \Delta$$
$$k' = 0, 1, \ldots, L-1;$$
$$l = \bar{l} + l'$$
$$n = 0, 1 \ldots$$
$$l' = 0, 1, \ldots, X-1$$
$$L \in \{2, 6\}$$

wherein the X is the number of continuous OFDM symbols for DMRS. When max-length is determined (or configured) to be 1, the X equals 1 and l'=0. When max-length is determined (or configured) with 2 and single symbol is indicated by DCI, the X equals 1 and l'=0. When max-length is determined/configured to be 2 and double symbol is indicated by DCI, the X equals 2 and l'=0,1.

The DCI may indicate the number of continuous symbols is 1 or 2 by number of front-load symbols as shown in Table 18 to 21. The DCI may indicate which FD-OCC length is used by the UE to transmit uplink DMRS. The DCI may indicate which DMRS port from DMRS ports corresponding to FD-OCC length 2 and FD-OCC length 6.

The gNB can inform the UE which FD-OCC length should be used to transmit the Uplink DMRS according to following Table 8 if the rank indicated in the DCI is 1.

TABLE 18

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14 | 1 | 8 | 1 |
| 15 | 1 | 9 | 1 |
| 16 | 2 | 8 | 1 |
| 17 | 2 | 9 | 1 |
| 18 | 2 | 10 | 1 |
| 19 | 2 | 11 | 1 |
| 20 | 2 | 8 | 2 |
| 21 | 2 | 9 | 2 |
| 22 | 2 | 10 | 2 |
| 23 | 2 | 11 | 2 |
| 24 | 2 | 12 | 2 |
| 25 | 2 | 13 | 2 |
| 26 | 2 | 14 | 2 |
| 27 | 2 | 15 | 2 |
| 28-31 | Reserved | Reserved | Reserved |

The gNB can inform the UE which FD-OCC length should be used to transmit the Uplink DMRS using following Table 19 if the rank indicated in the DCI is 2.

TABLE 19

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 2 | 0, 2 | 1 |
| 4 | 2 | 0, 1 | 2 |
| 5 | 2 | 2, 3 | 2 |
| 6 | 2 | 4, 5 | 2 |
| 7 | 2 | 6, 7 | 2 |
| 8 | 2 | 0, 4 | 2 |
| 9 | 2 | 2, 6 | 2 |
| 10 | 1 | 8, 9 | 1 |
| 11 | 2 | 8, 9 | 1 |
| 12 | 2 | 10, 11 | 1 |
| 13 | 2 | 8, 9 | 2 |
| 14 | 2 | 10, 11 | 2 |

TABLE 19-continued

| Value | Number of DMRS CDM group(s) without data | DMRS port(s) | Number of front-load symbols |
|---|---|---|---|
| 15 | 2 | 12, 13 | 2 |
| 16 | 2 | 14, 15 | 2 |
| 17-31 | Reserved | Reserved | Reserved |

The gNB can inform the UE which FD-OCC length should be used to transmit the Uplink DMRS using following Table 20 if the rank indicated in the DCI is 3.

TABLE 20

| Value | Number of DMRS CDM group(s) without data | DMRS port(s) | Number of front-load symbols |
|---|---|---|---|
| 0 | 2 | 0-2 | 1 |
| 1 | 2 | 0, 1, 4 | 2 |
| 2 | 2 | 2, 3, 6 | 2 |
| 3 | 1 | 0, 8, 9 | 1 |
| 4 | 2 | 0, 8, 9 | 1 |
| 5 | 2 | 2, 10, 11 | 1 |
| 6 | 2 | 0, 8, 9 | 2 |
| 7 | 2 | 4, 12, 13 | 2 |
| 8 | 2 | 2, 10, 11 | 2 |
| 9 | 2 | 6, 14, 15 | 2 |
| 10 | 1 | 8, 9, 12 | 2 |
| 10-15 | Reserved | Reserved | Reserved |

The gNB can inform the UE which FD-OCC length should be used to transmit the Uplink DMRS using following Table 21 or Table 22 if the rank indicated in the DCI is 4. Table 21 Value Number of DMRS CDM group(s) DMRS Number of front-load without data port(s) symbols

TABLE 21

| Value | Number of DMRS CDM group(s) without data | DMRS port(s) | Number of front-load symbols |
|---|---|---|---|
| 0 | 2 | 0-3 | 1 |
| 1 | 2 | 0, 1, 4, 5 | 2 |
| 2 | 2 | 2, 3, 6, 7 | 2 |
| 3 | 2 | 0, 2, 4, 6 | 2 |
| 4 | 2 | 8, 9, 10, 11 | 1 |
| 5 | 2 | 8, 9, 12, 13 | 2 |
| 6 | 2 | 10, 11, 14, 15 | 2 |
| 7-15 | Reserved | Reserved | Reserved |

The Table 18 through Table 21 may be enabled by the second DMRS parameter Alternatively, Table 18 and table 19 may be new tables and may be enabled by the second DMRS parameter. Table 20 and Table 21 may be old Tables with some new entries including DMRS ports corresponding to FD-OCC length 6. The DMRS ports corresponding to FD-OCC length 6 may only be indicated to new UE who has Rel-18 DMRS enhancement feature/capability.

TABLE 22

| Value | Number of DMRS CDM group(s) without data | DMRS port(s) | Number of front-load symbols |
|---|---|---|---|
| 0 | 2 | 0-3 | 1 |
| 1 | 2 | 0, 1, 4, 5 | 2 |
| 2 | 2 | 2, 3, 6, 7 | 2 |
| 3 | 2 | 0, 2, 4, 6 | 2 |
| 4 | 2 | 8, 9, 10, 11 | 1 |
| 5 | 1 | 8, 9, 12, 13 | 2 |
| 6 | 2 | 8, 9, 12, 13 | 2 |

TABLE 22-continued

| Value | Number of DMRS CDM group(s) without data | DMRS port(s) | Number of front-load symbols |
|---|---|---|---|
| 7 | 2 | 10, 11, 14, 15 | 2 |
| 8 | 1 | 0, 1, 4, 5 | 2 |
| 8-15 | Reserved | Reserved | Reserved |

In addition, although DMRS ports 8 to 15 corresponding to FD-OCC length 3 shown in Table 3 and DMRS ports 8 to 15 corresponding to FD-OCC length 6 shown in Table 13 are in sequence shared same sequence, but from Table 4-1 to 12 and Table 14-22, their indicated tables may be different. For example, the FD-OCC of length 6 of DMRS 8 may be two repeated FD-OCC of length 3. Because, if single symbol is used, there may be 3 CDM orthogonal DMRS ports in one CDM group for FD-OCC length 3 such as DMRS port {0,8,9}, but there are 4 CDM orthogonal DMRS ports in one CDM group for FD-OCC length 6 such as DMRS port {0,1,8,9}. In one aspect, DMRS port 1 is shared between FD-OCC length 2 and length 6, but it doesn't used for FD-OCC length 3.

The number of CDM groups without data of values 1, 2 in Tables 18 to 22 may refer to CDM groups {0}, {0,1} respectively, wherein the CDM group 0,1 is shown in FIG. 3, FIG. 8, Table 1 and Table 8.

Example 3: For UL DMRS, the Maximal Length of FD-OCC is 4

The UE may determine that the FD-OCC length of uplink DMRS port belongs to {2,4}. Which FD-OCC should be adopted for one uplink DMRS port may be informed by DCI. The UE may adopt the determined FD-OCC length to transmit DMRS of PUSCH, or transmit DMRS of PUSCH.

The frequency pattern of DMRS may be configured by DMRS type. The time domain pattern of DMRS may be configured by max number of continuous OFDM symbols and additional DMRS position as shown in Table 2. Following examples of dynamically switching between FD-OCC of length 2 and FD-OCCL of length 4 may be for different FD pattern configuration and time domain pattern configuration. The max number of continuous OFDM symbols may be configured by parameter max-length.

Example 3-1

Figure 9:
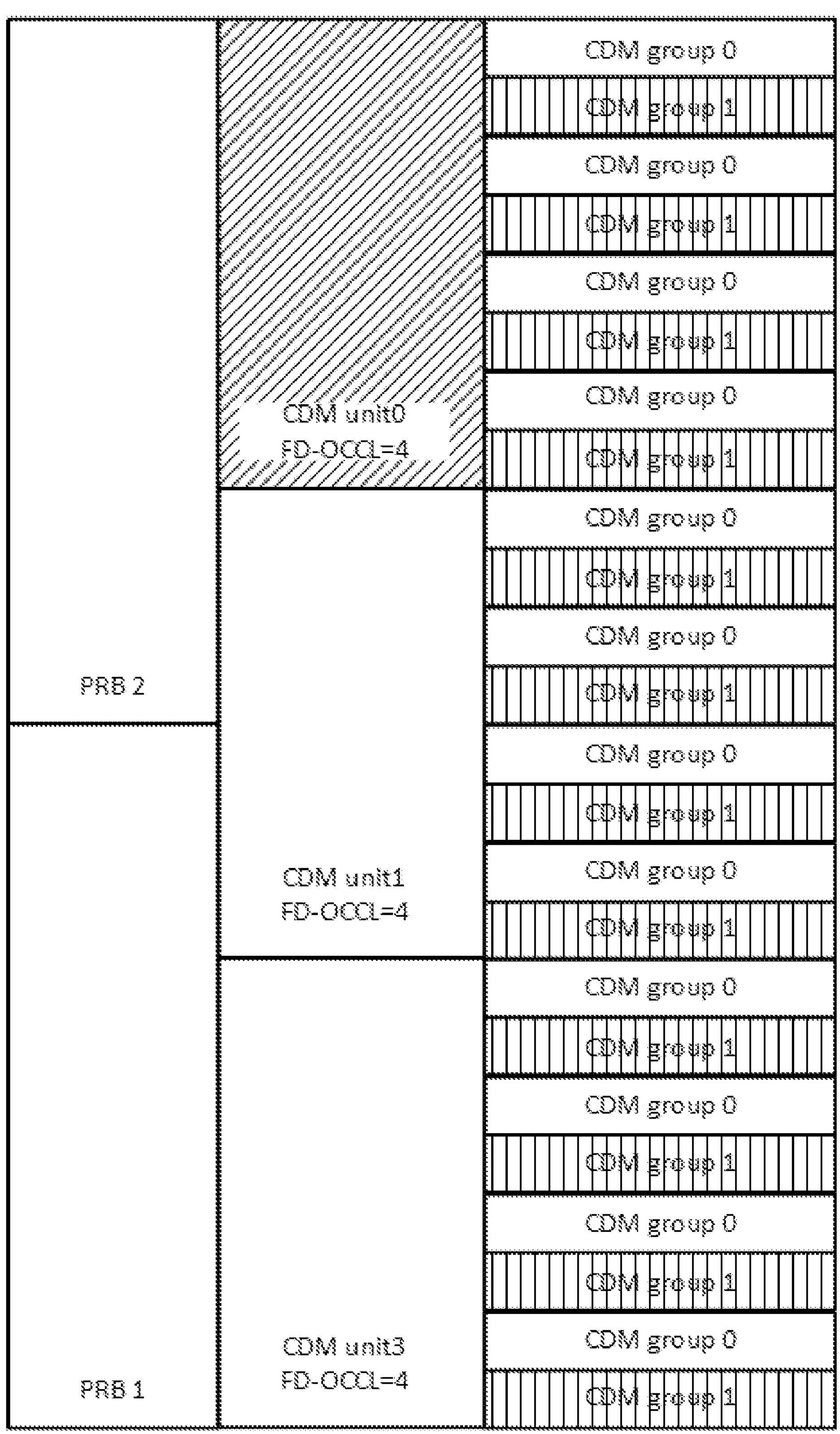
FIG. 9 illustrates a DMRS pattern for FD-OCC length 4 in one DMRS OFDM symbol and of DMRS type I, in accordance with some embodiments of the present disclosure.

For DMRS type I and max number of continuous OFDM symbols with value 1, the DMRS pattern for FD-OCC length 2 in one OFDM may be shown in FIG. 3. The DMRS pattern for FD-OCC length 4 in one OFDM is shown in FIG. 9. One DMRS port may occupy each RE (resource element) of its corresponding CDM group. One FD-OCC may correspond to one CDM unit. One FD-OCC may correspond to REs of one CDM group in one CDM unit. Elements of one FD-OCC in sequence corresponds to REs of one CDM group in one CDM unit by the ordering of the elements of the one FD-OCC and the REs of one CDM group in one CDM unit. The length of one FD-OCC may be equal to the number of REs of one CDM group in one CDM unit. The number of REs in one CDM unit may be equal to the length of FD-OCC multiple the number of CDM groups in one CDM unit. As shown in FIG. 9, the number of REs in one CDM units are 4*2=8.

As shown in FIG. 9, two PRB may include three CDM units of FD-OCC of length 4 in one OFDM symbol for each CDM group. Each CDM unit of one CDM group may include 4 REs each of which may correspond to one element of one FD-OCC of length 3.

When the FD-OCC length 2 is used, the UE may obtain the sequence of a DMRS port corresponding to FD-OCC length 2 according to equation (1) and Table 1.

When the FD-OCC length 4 is used, the UE may obtain the sequence of a DMRS port corresponding to FD-OCC length 4 according to equation (11), $$a_{k,l}^{(p,\mu)} = w_f(k')w_t(l')r(4*n+k') \tag{11}$$

$$k = (8*n+2*k'+\Delta) \bmod 12$$

$$k' = 0, 1, 2, 3;$$

a. $l = \bar{l} + l'$ $$n = 0, 1 \ldots$$

$$j = 0, 1, \ldots, \nu-1$$

$$l' = 0$$

where $w_f(k')$, $w_t(l')$, and Δ are obtained by Tables 23. 1 may be based on Table 2. The $w_t(l')$ for l'=1 in Table 13 can be ignored for this configuration of max number of continuous OFDM symbols with value 1. Then for this configuration, it includes DMRS ports of {0,1,2,3,8,9,10,11} because the $w_t(l')$ may only have one element corresponding to l'=0. The DMRS ports distinguished by TD-OCC may be indicated to UE in the configuration of DMRS type 1 and max-length equaling to 2.

TABLE 23

| FD-OCC with length 4 | | | | | | | | |
|---|---|---|---|---|---|---|---|---|
| | CDM | | $w_f(k')$ | | | | $w_t(l')$ | |
| p | group λ | Δ | k' = 0 | k' = 1 | k' = 2 | k' = 3 | l' = 0 | l' = 1 |
| 8 | 0 | 0 | +1 | +1 | −1 | −1 | +1 | +1 |
| 9 | 0 | 0 | +1 | −1 | −1 | +1 | +1 | +1 |
| 10 | 1 | 1 | +1 | +1 | −1 | −1 | +1 | +1 |
| 11 | 1 | 1 | +1 | −1 | −1 | +1 | +1 | +1 |
| 12 | 0 | 0 | +1 | +1 | −1 | −1 | +1 | −1 |
| 13 | 0 | 0 | +1 | −1 | −1 | +1 | +1 | −1 |
| 14 | 1 | 1 | +1 | +1 | −1 | −1 | +1 | −1 |
| 15 | 1 | 1 | +1 | −1 | −1 | +1 | +1 | −1 |

Alternative, the equations (1) and (11) can be unified to following equation:

$$a_{k,l}^{(p,\mu)} = w_f(k')w_t(l')r(L*n+k') \tag{12}$$

$$k = (2*L*n+2*k'+\Delta) \bmod 12$$

$$k' = 0, 1, \ldots, L-1;$$

$$l = \bar{l} + l'$$

$$n = 0, 1 \ldots$$

$$l' = 0$$

$$L \in \{2, 4\}$$

Wherein L is the length of FD-OCC. For example, if FD-OCC length is 2, then L may be 2, if FD-OCC length is 4, then L may be 4. In Table 23, there may be two DMRS ports corresponding to one $w_t(l')$. Although L DMRS ports corresponding to one $w_t(l')$ for FD-OCC length L can be provided, to reduce the overhead of indication in DCI, the DMRS port of FD-OCC length 2 with $w_f(k')$=[1,1] and the DMRS port of FD-OCC length 4 with $w_f(k')$=[1,1,1,1] may share same DMRS port number, and the DMRS port of FD-OCC length 2 with $w_f(k')$=[1,−1] and the DMRS port of FD-OCC length 4 with $w_f(k')$=[1,1,1,1] may share same DMRS port number. 4 $w_f(k')$ may be selected from 4 orthogonal FD-OCCs of length 4. The UE may not distinguish the two DMRS ports sharing same DMRS port number because their sequence are same. The gNB can distinguish them based on DMRS ports of MU UE. For example, if the gNB schedules UE 1 with the DMRS port {0,1} and UE 2 with DMRS port {8,9} and UE 1 and UE 2 are MU UE, then gNB may obtain the channel of DMRS port {0,1} with FD-OCC length 4. If the gNB schedules UE 1 with the DMRS port 0 and UE 2 with DMRS port 1 and UE 1 and UE 2 are MU UE, then gNB may obtain the channel of DMRS port 0 with FD-OCC length 2. That is the FD-OCC length of DMRS port 0 may be determined by gNB and the UE may not need to know. Similar aspects can be applied to DMRS port {1-7}. For example, for DMRS ports 0-7, FD-OCC length 2 and FD-OCC length 4 may share the same DMRS port number. The actual FD-OCC length of the DMRS port {0,1,2,3,4,5,6,7} may be determined by gNB and UE may not know the actual FD-OCC length.

The gNB can inform the UE which FD-OCC length should be used to transmit the Uplink DMRS using above Table 14 to Table 17, if the rank indicated in the DCI is 1,2,3,4 respectively. Table 14 to 17 in sequence may correspond to rank 1 to 4, respectively. For example, Table 14 may correspond to rank 1 and Table 15 may correspond to rank 2, and so on. Then the gNB can dynamical switch DMRS port of FD-OCC length 2 and FD-OCC length 4. It allows new UE to be scheduled as MU(multiple UE) UE with old UE or new UE. A new UE may have or support Rel-18 DMRS enhancement feature. An old UE may not have or may not support Rel-18 DMRS enhancement feature. For example, if the gNB attempts to or intends to schedule one old UE and one new UE in one CDM group as MU UE, then the gNB can schedule the new UE with DMRS ports corresponding to FD-OCC length 2. If the gNB attempts to or intends to schedule four new UEs in one CDM group as MU UE, then the gNB can schedule the four new UEs with DMRS ports corresponding to FD-OCC length 4, for example, each of the four new UEs can be scheduled with one of DMRS ports of {0,1,8,9} in CDM group 0

In some implementation, the value of rank is determined according to the SRS resource indicator field if non codebook scheme is configured and according to the field of Precoding information and number of layers if codebook scheme is configured.

The number of CDM groups without data of values 1, 2, and 3 in Tables 14 to 17 may refer to CDM groups {0}, {0,1}, and {0, 1,2} respectively, wherein the CDM group 0,1 may be shown in FIG. 3, FIG. 9, Table 1 and Table 13.

i.Example 3-2: For DMRS Type I and Max Number of Continuous OFDM Symbols with Value 2

The DMRS pattern for FD-OCC length 2 in two continuous OFDM is shown in FIG. 5. The DMRS pattern for FD-OCC length 6 in two continuous OFDM is shown in FIG. 10. The two continuous OFDM may correspond to one TD-OCC unit. Each element of TD-OCC length 2 may correspond one OFDM in the two continuous OFDM.

When the FD-OCC length 2 is used, the UE may assume the sequence of a DMRS port corresponding to FD-length 2 according to following equation (4) and Table 1.

When the FD-OCC length 6 is used, the UE may assume the sequence of a DMRS port corresponding to FD-length 2 according to following equation (13) and Table 23.

$$a_{k,l}^{(p,\mu)} = w_f(k')w_t(l')r(4*n+k') \quad (13)$$

$$k = (8*n+2*k'+\Delta) \bmod 12$$

$$k' = 0, 1, 2, 3;$$

$$l = \bar{l} + l'$$

$$n = 0, 1 \ldots$$

$$l' = 0, 1$$

The equations (1), (11) (12) and (13) can be combine to following equation (14):

$$a_{k,l}^{(p,\mu)} = w_f(k')w_t(l')r(L*n+k') \quad (14)$$

a.
$$k = (2*L*n+2*k'+\Delta) \bmod 12$$
$$k' = 0, 1, \ldots, L-1;$$
$$l = \bar{l} + l'$$
$$n = 0, 1 \ldots$$
$$l' = 0, 1, \ldots X-1$$
$$L \in \{2, 4\}$$

wherein the X is the number of continuous OFDM symbols for DMRS. When max-length is determined (or configured) to be 1, the X may be 1 and l'=0. When max-length is determined (or configured) with 2 and single symbol is indicated by DCI, the X may be 1 and l'=0. When max-length is determined/configured to be 2 and double symbol is indicated by DCI, the X may be 2 and l'=0,1.

The DCI may indicate that the number of continuous symbols is 1 or 2 by number of front-load symbols as shown in Table 18 to 22. The DCI may indicate which FD-OCC length is used by the UE to transmit uplink DMRS. The DCI may indicate which DMRS port from DMRS ports corresponding to FD-OCC length 2 and FD-OCC length 4.

The gNB can inform the UE which FD-OCC length should be used to transmit the Uplink DMRS according to following Table 18 to 22 if the rank indicated in the DCI is 1, 2, 3, or 4 respectively. Table 18 to 22 in sequence may correspond to rank 1 to 4. Table 18 may be enabled when the rank is indicated to be 1 and Table 19 may be enable when the rank is indicated to be 2.

For above example 3-1 and example 3-2, because the number of REs in one PRB is 12 which isn't the multiple number of one CDM unit, it needs a PRB group including two PRBs bundled and including minimum number of CDM units, that is three CDM units. The UE may determine which two PRBs should be bundled to get the three CDM units for FD-OCC length 4.

In some implementation, the UE determines that each two consecutive two PRBs is bundled and the first two PRBs of the BWP is bundled. The UE expect that the number of PRBs of the BWP should be an integer multiple of 2. Alternatively, when the number of PRBs of the BWP isn't an integer multiple of 2, the UE may not expect to be indicated with a DMRS port corresponding to FD-OCC length 4 in case that the UE is allocated with the last PRB of the BWP. In the third implementation, the UE can be indicated with a DMRS port corresponding to FD-OCC length 4 in other PRBs except the last PRB which is with a DMRS port corresponding to FD-OCC length 2. That is different PRBs can be allocated with DMRS port corresponding to different FD-OCC lengths. Each DMRS port of FD-OCC length 4 can be associated with a DMRS port of FD-OCC length 2. The UE can be indicated with a DMRS port corresponding to FD-OCC length 4 and the UE determines that the indicated DMRS port are applied to other PRBs except the last PRB which should be with DMRS port of FD-OCC length 2 (or 3,6) which is associated with the indicated DMRS port in case that the UE is allocated with the last PRB and the number of PRBs of the BWP isn't an integer multiple of 2.

In some implementation, the UE may determine which two PRBs should be bundled according to PRB size of a BWP, the starting PRBs index of the BWP. For example, the BWP is parted multiple PRB groups each of which includes two consecutive PRBs except the first PRB groups and the last PRB group. The first PRB group may include $2-P_{start,BWP}$ mod2 PRBs starting from the first PRB of the BWP. $P_{start,BWP}$ may be common PRB index of the first PRB of the BWP. Common PRB index may be a PRB index with reference subcarrier 0 coinciding with point A. The first PRB group may include the first two consecutive PRBs of the BWP if $P_{start,BWP}$ mod 2=0. The first PRB group may only include the first PRB of the BWP if $P_{start,BWP}$ mod 2≠0. The last PRB group may include $(P_{start,BWP}+N_{size,BWP})$mod 2 PRBs if $(P_{start,BWP}+N_{size,BWP})$mod 2≠0. That is, the last PRB group may include the last one PRB of the BWP if $(P_{start,BWP}+N_{size,BWP})$mod 2≠0. The last PRB group may include the last 2 PRBs of the BWP if $(P_{start,BWP}+N_{size,BWP})$ mod2=0 In some implementation, the UE may expect that the first PRB group and the last PRB group may include 2 PRBs in case that the UE can be allocated with a DMRS port corresponding to FD-OCC length 4. In another implementation, when the first PRB group (and/or the last PRB group) may not include 2 PRBs, the UE may not expect to be indicated with a DMRS port corresponding to FD-OCC length 4 in case that the UE is allocated with PRB in the first PRB group (or in the last PRB group). In the third implementation, the UE can be indicated with a DMRS port corresponding to FD-OCC length 4 in other PRB group except the first PRB group (and/or in the last PRB group) which may be with a DMRS port corresponding to FD-OCC length 2. For example, different PRB groups can be allocated with DMRS port corresponding to different FD-OCC lengths. Each DMRS port of FD-OCC length 4 can be associated with a DMRS port of FD-OCC length 2 (or 3,6). The UE can be indicated with a DMRS port corresponding to FD-OCC length 4 and the UE may determine that the indicated DMRS port are applied to other PRB group except the first PRB group (and/or the last PRB group) which should be with DMRS port of FD-OCC length 2 which is associated with the indicated DMRS port in case that the UE is allocated with the PRB in the first PRB group (and/or in the last PRB group) and the number of PRBs of the first PRB group (and or the second PRB group) BWP is 1. One PRB group may be in one PRG (Precoding Resource Block Group). Precoding of channel in one PRG may be the same.

In above implementation, if the UE is allocated with a DMRS port corresponding to FD-OCC length 4, the UE may be allocated with all PRBs in one PRB group instead of with only one PRB in one PRB group. For example, the UE may be allocated with 2 PRBs in one PRB group or is allocated with 2 PRBs in the PRB group. Alternatively, the UE may use DMRS ports corresponding to FD-OCC length 4 for a PRB groups which is allocated with 2 PRBs. The UE may use DMRS ports corresponding to FD-OCC length 4/2 for a PRB groups which is allocated with 1 PRBs according to DCI indication.

In some implementation, the UE may determine the two bundled PRBs based on the allocated PRBs. The UE may determine the two bundled PRBs according to above method except replacing PRBs of the BWP with allocated PRBs. The allocated PRBs is PRB allocated with one PUSCH transmission. It can be indicated by DCI or configured by RRC signaling. For example, the UE is allocated with {PRB 2, PRB 3, PRB7, PRB17}, then the UE determines which two PRB is bundled according to above method by replacing PRBs of BWP with the set of allocated PRB such as {PRB 2, PRB 3, PRB7, PRB17}.

The DMRS ports {0-7} corresponding to FD-OCC length 2 may be in sequence associated with DMRS ports {8-15} corresponding to FD-OCC length 4.

Example 3-3

For DMRS type II and max number of continuous OFDM symbols with value 1, the DMRS pattern for FD-OCC length 2 in one OFDM is shown in FIG. 11. The DMRS pattern for FD-OCC length 4 in one OFDM is shown in FIG. 12.

When the FD-OCC length 2 is used, the UE may assume the sequence of a DMRS port corresponding to FD-length 2 according to equation (15) and Table 24.

$$a_{k,l}^{(p,\mu)} = w_f(k')w_t(l')r(2*n+k') \quad (15)$$

$$k = 6*n+k'+\Delta$$

$$k' = 0, 1;$$

$$l = \bar{l}+l'$$

$$n = 0, 1 \ldots$$

$$l' = 0$$

When the FD-OCC length 4 is used, the UE may assume the sequence of a DMRS port corresponding to FD-length 4 according to equation (16) and Table 25

$$a_{k,l}^{(p,\mu)} = \beta_{PDSCH}^{DMRS} w_f(k')w_t(l')r(4*n+k') \quad (16)$$

$$k = 12*n+k' \bmod 2+6*\lfloor k'/2 \rfloor+\Delta$$

$$k' = 0, 1, 2, 3;$$

$$l = \bar{l}+l'$$

$$n = 0, 1 \ldots$$

$$l' = 0$$

The equations (15) and (16) can be combined to equation (17).

$$a_{k,l}^{(p,\mu)} = w_f(k')w_t(l')r(L*n+k') \quad (17)$$

$$k = 3*L*n+k' \bmod 2+6*\lfloor k'/2 \rfloor+\Delta$$

$$k' = 0, 1, \ldots, L-1;$$

$$l = \bar{l}+l'$$

$$n = 0, 1 \ldots$$

$$l' = 0$$

a. $L \in \{2, 4\}$

TABLE 24

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

TABLE 25

| p | CDM group λ | | $w_f(k')$ k' = 0 | k' = 1 | k' = 2 | k' = 3 | $w_t(l')$ l' = 0 | l' = 1 |
|---|---|---|---|---|---|---|---|---|
| 12 | 0 | 0 | +1 | +1 | −1 | −1 | +1 | +1 |
| 13 | 0 | 0 | +1 | −1 | −1 | +1 | +1 | +1 |
| 14 | 1 | 2 | +1 | +1 | −1 | −1 | +1 | +1 |
| 15 | 1 | 2 | +1 | −1 | −1 | +1 | +1 | +1 |
| 16 | 2 | 4 | +1 | +1 | −1 | −1 | +1 | +1 |
| 17 | 2 | 4 | +1 | −1 | −1 | +1 | +1 | +1 |
| 18 | 0 | 0 | +1 | +1 | −1 | −1 | +1 | −1 |
| 19 | 0 | 0 | +1 | −1 | −1 | +1 | +1 | −1 |
| 20 | 1 | 2 | +1 | +1 | −1 | −1 | +1 | −1 |
| 21 | 1 | 2 | +1 | −1 | −1 | +1 | +1 | −1 |
| 22 | 2 | 4 | +1 | +1 | −1 | −1 | +1 | −1 |
| 23 | 2 | 4 | +1 | −1 | −1 | +1 | +1 | −1 |

The DMRS port corresponding to FD-OCC length 2 and FD-OCC length 4 can be dynamically switched by DCI. The gNB can inform the UE which FD-OCC length should be used to transmit the Uplink DMRS using following Table 26 if the rank indicated in the DCI is 1. For example, the gNB may inform the DMRS ports corresponding to FD-OCC length 2 and FD-OCC length 4 by DCI according to Table 26 if the rank indicated in the DCI is 1.

The number of CDM groups without data of values 1, 2, and 3 in Tables 26 to 29 may refer to CDM groups {0}, {0,1}, and {0, 1,2} respectively, wherein the CDM group 0,1,2 is shown in FIG. 11, FIG. 12, Table 24 and Table 25.

TABLE 26

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |
| 8 | 3 | 2 |
| 9 | 3 | 3 |
| 10 | 3 | 4 |
| 11 | 3 | 5 |
| 12 | 3 | 12 |
| 13 | 3 | 13 |
| 14 | 3 | 14 |
| 15 | 3 | 15 |
| 16 | 3 | 16 |
| 17 | 3 | 17 |
| 18-31 | Reserved | Reserved |

As shown in Table 25, when the UE is associated with a DMRS port corresponding to FD-OCC length 4, then number of DMRS CDM group(s) without data may be 3 and may not be 1, 2. In one example, only when the gNB attempts to or intends to schedule more than 6 MU UEs, then gNB may indicate UE with a DMRS port corresponding to FD-OCC length 4, otherwise the gNB may only indicate UE with a DMRS port corresponding to FD-OCC length 2.

The gNB may inform the DMRS ports corresponding to FD-OCC length 2 and FD-OCC length 4 by DCI according to Table 27 if the rank indicated in the DCI is 2.

TABLE 27

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 3 | 0, 1 |
| 4 | 3 | 2, 3 |
| 5 | 3 | 4, 5 |
| 6 | 2 | 0, 2 |
| 7 | 3 | 12, 13 |
| 8 | 3 | 14, 15 |
| 9 | 3 | 16, 17 |
| 10-31(10-15) | Reserved | Reserved |

The gNB may inform the DMRS ports corresponding to FD-OCC length 2 and FD-OCC length 4 by DCI according to Table 28 if the rank indicated in the DCI is 3.

TABLE 28

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3 | 3 | 12, 13, 14 |
| 4 | 3 | 15, 16, 17 |
| 5-31(5-15) | Reserved | Reserved |

The gNB may inform the DMRS ports corresponding to FD-OCC length 2 and FD-OCC length 4 by DCI according to Table 29 if the rank indicated in the DCI is 4.

TABLE 29

| Value | Number of DMRS CDM group(s) without data | DMRS port(s) |
|---|---|---|
| 0 | 2 | 0-3 |
| 1 | 3 | 0-3 |
| 2 | 3 | 4, 5, 12, 13 |
| 3 | 3 | 14, 15, 16, 17 |
| 4-31(or 4-15) | Reserved | Reserved |

In another implementation, the Table 26 to 29 can be replaced by Table 30 to 33 respectively. Table 26 can be replaced with Table 30. Table 27 can be replaced with Table 31, and so on. If Table 30 to Table 33 is enabled, the gNB can schedule DMRS corresponding to FD-OCC length 4 in CDM group 0 and number of DMRS CDM group(s) without data is one of {1,2,3}. The gNB can schedule DMRS corresponding to FD-OCC length 4 in CDM group 1 and number of DMRS CDM group(s) without data is one of {2,3}. The gNB can schedule DMRS corresponding to FD-OCC length 4 in CDM group 2 and number of DMRS CDM group(s) without data is 3.

TABLE 30

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |
| 8 | 3 | 2 |
| 9 | 3 | 3 |
| 10 | 3 | 4 |
| 11 | 3 | 5 |
| 12 | 3 | 12 |
| 13 | 3 | 13 |
| 14 | 3 | 14 |
| 15 | 3 | 15 |
| 16 | 3 | 16 |
| 17 | 3 | 17 |
| 18 | 1 | 12 |
| 19 | 1 | 13 |
| 20 | 2 | 12 |
| 21 | 2 | 13 |
| 22 | 2 | 14 |
| 23 | 2 | 15 |
| 24-31 | Reserved | Reserved |

TABLE 31

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 3 | 0, 1 |
| 4 | 3 | 2, 3 |
| 5 | 3 | 4, 5 |
| 6 | 2 | 0, 2 |
| 7 | 3 | 12, 13 |
| 8 | 3 | 14, 15 |
| 9 | 3 | 16, 17 |
| 10 | 1 | 12, 13 |
| 11 | 2 | 12, 13 |
| 12 | 2 | 14, 15 |
| 13-31(or 13-15) | Reserved | Reserved |

TABLE 32

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3 | 3 | 12, 13, 14 |
| 4 | 3 | 15, 16, 17 |
| 5 | 1 | 1, 12, 13 |
| 6 | 2 | 1, 12, 13 |
| 7 | 3 | 1, 12, 13 |
| 8 | 2 | 3, 14, 15 |
| 9 | 3 | 3, 14, 15 |
| 10 | 3 | 5, 16, 17 |
| 11 | 2 | 12, 13, 14 |
| 12-31(or 12-15) | Reserved | Reserved |

TABLE 33

| Value | Number of DMRS CDM group(s) without data | DMRS port(s) |
|---|---|---|
| 0 | 2 | 0-3 |
| 1 | 3 | 0-3 |
| 2 | 3 | 4, 5, 12, 13 |
| 3 | 3 | 14, 15, 16, 17 |
| 4 | 1 | 0, 1, 12, 13 |
| 5 | 2 | 0, 1, 12, 13 |
| 6 | 3 | 0, 1, 12, 13 |
| 7 | 2 | 2, 3, 14, 15 |
| 8 | 3 | 2, 3, 14, 15 |
| 9 | 3 | 4, 5, 16, 17 |
| 10-31(or 10-15) | Reserved | Reserved |

For one PUSCH transmission, the UE can be indicated with DMRS port corresponding to FD-length 2 and FD-OCC length 4 such as the DMRS ports corresponding to value 5 to 11 in Table 32 and the DMRS ports corresponding to value 4 to 9 in Table 33.

Example 3-4: For DMRS Type II and Max Number of Continuous OFDM Symbols with Value 2

The DMRS pattern for FD-OCC length 2 in two continuous OFDM is shown in FIG. 13. The DMRS pattern for FD-OCC length 6 in two continuous OFDM is shown in FIG. 14. The two continuous OFDM may correspond to one TD-OCC unit. Each element of TD-OCC length 2 may correspond one OFDM in the two continuous OFDM.

When the FD-OCC length 2 is used, the UE may assume the sequence of a DMRS port corresponding to FD-length 2 according to equation (18) and Table 24.

$$a_{k,l}^{(p,\mu)} = w_f(k')w_t(l')r(2*n+k') \quad (18)$$
$$k = 6*n+k'+\Delta$$
$$k' = 0, 1;$$
$$l = \bar{l}+l'$$
$$n = 0, 1 \ldots$$
$$a.\quad l' = 0, 1$$

When the FD-OCC length 4 is used, the UE may assume the sequence of a DMRS port corresponding to FD-length 4 according to equation (19) and Table 25

$$a_{k,l}^{(p,\mu)} = w_f(k')w_t(l')r(4*n+k') \quad (19)$$
$$k = (12*n+k' \bmod 2+6*\lfloor k'/2 \rfloor+\Delta) \bmod 12$$
$$k' = 0, 1, 2, 3;$$
$$l = \bar{l}+l'$$
$$n = 0, 1 \ldots$$
$$l' = 0, 1$$

The equations (15) to (19) can be combined to equation (20).

$$a_{k,l}^{(p,\mu)} = w_f(k')w_t(l')r(L*n+k') \quad (20)$$
$$k = 3*L*n+k' \bmod 2+6*\lfloor k'/2 \rfloor+\Delta$$
$$k' = 0, 1, \ldots, L-1;$$
$$l = \bar{l}+l'$$
$$n = 0, 1 \ldots$$
$$l' = 0$$
$$b.\quad L \in \{2, 4\}$$

wherein the X is the number of continuous OFDM symbols for DMRS. When max-length is determined/configured to 1, the X may be 1 and l'=0. When max-length is determined/configured to 2 and single symbol is indicated by DCI, the X may be 1 and l'=0. When max-length is determined/configured to 2 and double symbol is indicated by DCI, the X may be 2 and l'=0,1. The single or double symbol may be determined as a number of front-load symbols in Table 33 to Table 36.

The gNB may inform UE a DMRS port from a DMRS port set including DMRS port corresponding to FD-OCC length 2 and DMRS port corresponding to FD-OCC length 4 by DCI according to Table 34 if rank is indicated to be 1 in the DCI.

As shown in Table 34, the DMRS corresponding to FD-OCC length 4 and CDM group 0 can be indicated with a UE with number of DMRS CDM group(s) without data being one of {1,3} and number of front-load symbols being one of {1,2}. The DMRS corresponding to FD-OCC length 4 and CDM group 1 can be indicated with a UE with number of DMRS CDM group(s) without data being 3 and number of front-load symbols being 2. The DMRS corresponding to FD-OCC length 4 and CDM group 2 can be indicated with a UE with number of DMRS CDM group(s) without data is 3 and number of front-load symbols being 2.

TABLE 34

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28 | 3 | 12 | 2 |
| 29 | 3 | 13 | 2 |

TABLE 34-continued

| Value | Number of DMRS CDM group(s) without data | DMRS port(s) | Number of front-load symbols |
|---|---|---|---|
| 30 | 3 | 14 | 2 |
| 31 | 3 | 15 | 2 |
| 32 | 3 | 16 | 2 |
| 33 | 3 | 17 | 2 |
| 34 | 3 | 18 | 2 |
| 35 | 3 | 19 | 2 |
| 36 | 3 | 20 | 2 |
| 37 | 3 | 21 | 2 |
| 38 | 3 | 22 | 2 |
| 39 | 3 | 23 | 2 |
| 40 | 1 | 12 | 1 |
| 41 | 1 | 13 | 1 |
| 42 | 1 | 18 | 2 |
| 43 | 1 | 19 | 2 |
| 44-63 | Reserved | Reserved | Reserved |

The gNB may inform UE a DMRS port from a DMRS port set including DMRS port corresponding to FD-OCC length 2 and DMRS port corresponding to FD-OCC length 4 by DCI according to Table 35 if rank is indicated to be 2 in the DCI.

TABLE 35

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 3 | 0, 1 | 1 |
| 4 | 3 | 2, 3 | 1 |
| 5 | 3 | 4, 5 | 1 |
| 6 | 2 | 0, 2 | 1 |
| 7 | 3 | 0, 1 | 2 |
| 8 | 3 | 2, 3 | 2 |
| 9 | 3 | 4, 5 | 2 |
| 10 | 3 | 6, 7 | 2 |
| 11 | 3 | 8, 9 | 2 |
| 12 | 3 | 10, 11 | 2 |
| 19 | 3 | 12, 13 | 2 |
| 20 | 3 | 14, 15 | 2 |
| 21 | 3 | 16, 17 | 2 |
| 22 | 3 | 18, 19 | 2 |
| 23 | 3 | 20, 21 | 2 |
| 24 | 3 | 22, 23 | 2 |
| 25-63(or 25-31) | Reserved | Reserved | Reserved |

The gNB informs UE a DMRS port from a DMRS port set including DMRS port corresponding to FD-OCC length 2 and DMRS port corresponding to FD-OCC length 4 by DCI according to Table 36 if rank is indicated to be 3 in the DCI.

As shown in Table 36, if a DMRS ports corresponding to TD-OCC $w_f(l')[1,-1]$ in Table 24 or Table 23 is indicated to a UE, the number of front-loaded symbols should be 2 and number of DMRS CDM group(s) without data may be 3. If a DMRS ports corresponding to FD-OCC length 4 in Table 24 is indicated to a UE, the number of front-load symbols should be 2 and number of DMRS CDM group(s) without data may be 3.

TABLE 36

| Value | Number of DMRS CDM group(s) without data | DMRS port(s) | Number of front-load symbols |
|---|---|---|---|
| 0 | 2 | 0-2 | 1 |
| 1 | 3 | 0-2 | 1 |
| 2 | 3 | 3-5 | 1 |
| 3 | 3 | 0, 1, 6 | 2 |
| 4 | 3 | 2, 3, 8 | 2 |
| 5 | 3 | 4, 5, 10 | 2 |
| 6 | 3 | 12, 13, 14 | 2 |
| 7 | 3 | 15, 16, 17 | 2 |
| 8 | 3 | 18, 19, 20 | 2 |
| 9 | 3 | 21, 22, 23 | 2 |
| 10-63(or10-31) | Reserved | Reserved | Reserved |

The gNB may inform UE a DMRS port from a DMRS port set including DMRS port corresponding to FD-OCC length 2 and DMRS port corresponding to FD-OCC length 4 by DCI according to Table 37 if rank is indicated to be 4 in the DCI.

TABLE 37

| Value | Number of DMRS CDM group(s) without data | DMRS port(s) | Number of front-load symbols |
|---|---|---|---|
| 0 | 2 | 0-3 | 1 |
| 1 | 3 | 0-3 | 1 |
| 2 | 3 | 0, 1, 6, 7 | 2 |
| 3 | 3 | 2, 3, 8, 9 | 2 |
| 4 | 3 | 4, 5, 10, 11 | 2 |
| 5 | 3 | 12, 13, 18, 19 | 2 |
| 6 | 3 | 14, 15, 20, 21 | 2 |
| 7 | 3 | 16, 17, 22, 23 | 2 |
| 8-63(or 8-31) | Reserved | Reserved | Reserved |

In another implementation, the DMRS ports corresponding to FD-OCC length 4, TD-OCC $w_t(l')[1,1]$ in Table 24 and CDM group 0 can be indicated to UE with number of DMRS CDM group(s) without data being one of {1,2,3} and with number of front loaded symbol being one of {1,2}. The DMRS ports corresponding to FD-OCC length 4, TD-OCC $w_t(l')=[1,-1]$ in Table 24 and CDM group 0 can be indicated to UE with number of DMRS CDM group(s) without data being one of {1,2,3} and with number of front loaded symbol being 2.

The DMRS ports corresponding to FD-OCC length 4, TD-OCC $w_t(l')[1,1]$ in Table 24 and CDM group 1 can be indicated to UE with number of DMRS CDM group(s) without data being one of {2,3} and with number of front loaded symbol being one of {1,2}. The DMRS ports corresponding to FD-OCC length 4, TD-OCC $w_t(l')=[1,1]$ in Table 24 and CDM group 0 can be indicated to UE with number of DMRS CDM group(s) without data being one of {2,3} and with number of front loaded symbol being 2.

The DMRS ports corresponding to FD-OCC length 4, TD-OCC $w_t(l')[1,1]$ in Table 24 and CDM group 2 can be indicated to UE with number of DMRS CDM group(s) without data being 3 and with number of front loaded symbol being one of {1,2}. The DMRS ports corresponding to FD-OCC length 4, TD-OCC $w_t(l')=[1,1]$ and CDM group 0 can be indicated to UE with number of DMRS CDM group(s) without data being one of {2,3} and with number of front loaded symbol being 2.

The DMRS ports corresponding to TD-OCC $w_t(l')=[1,1]$ in Table 24 can be indicated to a UE with Number of front-load symbols being one of {1,2}. The DMRS ports corresponding to TD-OCC $w_t(l')=[1,-1]$ in Table 24 can be indicated to a UE with Number of front-load symbols being 2.

The DMRS ports of CDM group n∈{0,1,2} can be indicated to a UE with number of DMRS CDM group(s) without data being one of {n+1,n+2, . . . , 3}. For example, the DMRS ports of CDM group 0 can be indicated to a UE with number of DMRS CDM group(s) without data being one of {1,2,3}. The DMRS ports of CDM group 1 can be indicated to a UE with number of DMRS CDM group(s) without data being one of {2,3}. The DMRS ports of CDM group 1 can be indicated to a UE with number of DMRS CDM group(s) without data being 3.

In some implementation, Table 34 to 37 are replaced with Table 38 to 41 respectively.

TABLE 38

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28 | 3 | 12 | 2 |
| 29 | 3 | 13 | 2 |
| 30 | 3 | 14 | 2 |
| 31 | 3 | 15 | 2 |
| 32 | 3 | 16 | 2 |
| 33 | 3 | 17 | 2 |
| 34 | 3 | 18 | 2 |
| 35 | 3 | 19 | 2 |
| 36 | 3 | 20 | 2 |
| 37 | 3 | 21 | 2 |
| 38 | 3 | 22 | 2 |
| 39 | 3 | 23 | 2 |
| 40 | 1 | 12 | 1 |
| 41 | 1 | 13 | 1 |
| 42 | 2 | 12 | 1 |
| 43 | 2 | 13 | 1 |
| 44 | 3 | 12 | 1 |
| 45 | 3 | 13 | 1 |
| 46 | 2 | 14 | 1 |
| 47 | 2 | 15 | 1 |
| 48 | 3 | 14 | 1 |
| 49 | 3 | 15 | 1 |
| 50 | 3 | 16 | 1 |
| 51 | 3 | 17 | 1 |
| 52 | 1 | 12 | 2 |
| 53 | 1 | 13 | 2 |
| 54 | 1 | 18 | 2 |
| 56 | 1 | 19 | 2 |
| 57 | 2 | 14 | 2 |
| 58 | 2 | 15 | 2 |

TABLE 38-continued

| Value | Number of DMRS CDM group(s) without data | DMRS port(s) | Number of front-load symbols |
|---|---|---|---|
| 59 | 2 | 20 | 2 |
| 60 | 2 | 21 | 2 |
| 55-63 | Reserved | Reserved | Reserved |

TABLE 39

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 3 | 0, 1 | 1 |
| 4 | 3 | 2, 3 | 1 |
| 5 | 3 | 4, 5 | 1 |
| 6 | 2 | 0, 2 | 1 |
| 7 | 3 | 0, 1 | 2 |
| 8 | 3 | 2, 3 | 2 |
| 9 | 3 | 4, 5 | 2 |
| 10 | 3 | 6, 7 | 2 |
| 11 | 3 | 8, 9 | 2 |
| 12 | 3 | 10, 11 | 2 |
| 13 | 1 | 0, 1 | 2 |
| 14 | 1 | 6, 7 | 2 |
| 15 | 2 | 0, 1 | 2 |
| 16 | 2 | 2, 3 | 2 |
| 17 | 2 | 6, 7 | 2 |
| 18 | 2 | 8, 9 | 2 |
| 19 | 3 | 12, 13 | 2 |
| 20 | 3 | 14, 15 | 2 |
| 21 | 3 | 16, 17 | 2 |
| 22 | 3 | 18, 19 | 2 |
| 23 | 3 | 20, 21 | 2 |
| 24 | 3 | 22, 23 | 2 |
| 25 | 1 | 12, 13 | 2 |
| 26 | 1 | 18, 19 | 2 |
| 27 | 2 | 12, 13 | 2 |
| 28 | 2 | 18, 19 | 2 |
| 29 | 2 | 14, 15 | 2 |
| 30 | 2 | 20, 21 | 2 |
| 31 | 3 | 12, 13 | 2 |
| 32 | 3 | 18, 19 | 2 |
| 33 | 3 | 14, 15 | 2 |
| 34 | 3 | 20, 21 | 2 |
| 36-63 | Reserved | Reserved | Reserved |

TABLE 40

| Value | Number of DMRS CDM group(s) without data | DMRS port(s) | Number of front-load symbols |
|---|---|---|---|
| 0 | 2 | 0-2 | 1 |
| 1 | 3 | 0-2 | 1 |
| 2 | 3 | 3-5 | 1 |
| 3 | 3 | 0, 1, 6 | 2 |
| 4 | 3 | 2, 3, 8 | 2 |
| 5 | 3 | 4, 5, 10 | 2 |
| 6 | 3 | 12, 13, 14 | 2 |
| 7 | 3 | 15, 16, 17 | 2 |
| 8 | 3 | 18, 19, 20 | 2 |
| 9 | 3 | 21, 22, 23 | 2 |
| 10 | 1 | 0, 12, 13 | 1 |
| 11 | 2 | 0, 12, 13 | 1 |
| 12 | 3 | 0, 12, 13 | 1 |
| 13 | 2 | 3, 14, 15 | 1 |
| 14 | 3 | 3, 14, 15 | 1 |
| 15 | 3 | 4, 16, 17 | 1 |
| 16 | 1 | 0, 12, 13 | 2 |
| 17 | 2 | 0, 12, 13 | 2 |
| 18 | 3 | 0, 12, 13 | 2 |
| 19 | 2 | 3, 14, 15 | 2 |
| 20 | 3 | 3, 14, 15 | 2 |

TABLE 40-continued

| Value | Number of DMRS CDM group(s) without data | DMRS port(s) | Number of front-load symbols |
|---|---|---|---|
| 21 | 3 | 4, 16, 17 | 2 |
| 22 | 1 | 12, 13, 18 | 2 |
| 23 | 2 | 12, 13, 18 | 2 |
| 24 | 3 | 12, 13, 18 | 2 |
| 25 | 2 | 14, 15, 20 | 2 |
| 26 | 3 | 14, 15, 20 | 2 |
| 27 | 3 | 16, 17, 22 | 2 |
| 28-63(or28-31) | Reserved | Reserved | Reserved |

The UE can be indicated with two DMRS ports corresponding to FD-OCC length 4 and one DMRS port corresponding to FD-OCC length 2.

TABLE 41

| Value | Number of DMRS CDM group(s) without data | DMRS port(s) | Number of front-load symbols |
|---|---|---|---|
| 0 | 2 | 0-3 | 1 |
| 1 | 3 | 0-3 | 1 |
| 2 | 3 | 0, 1, 6, 7 | 2 |
| 3 | 3 | 2, 3, 8, 9 | 2 |
| 4 | 3 | 4, 5, 10, 11 | 2 |
| 5 | 3 | 12, 13, 18, 19 | 2 |
| 6 | 3 | 14, 15, 20, 21 | 2 |
| 7 | 3 | 16, 17, 22, 23 | 2 |
| 8 | 1 | 0, 1, 12, 13 | 1 |
| 9 | 2 | 0, 1, 12, 13 | 1 |
| 10 | 3 | 0, 1, 12, 13 | 1 |
| 11 | 2 | 2, 3, 14, 15 | 1 |
| 12 | 3 | 2, 3, 14, 15 | 1 |
| 13 | 3 | 4, 5, 16, 17 | 1 |
| 14 | 1 | 0, 1, 12, 13 | 2 |
| 15 | 2 | 0, 1, 12, 13 | 2 |
| 16 | 3 | 0, 1, 12, 13 | 2 |
| 17 | 2 | 2, 3, 14, 15 | 2 |
| 18 | 3 | 2, 3, 14, 15 | 2 |
| 19 | 3 | 4, 5, 16, 17 | 2 |
| 20 | 1 | 6, 7, 18, 19 | 2 |
| 21 | 2 | 6, 7, 18, 19 | 2 |
| 22 | 3 | 6, 7, 18, 19 | 2 |
| 23 | 2 | 8, 9, 20, 21 | 2 |
| 24 | 3 | 8, 9, 20, 21 | 2 |
| 25 | 3 | 10, 11, 22, 23 | 2 |
| 26 | 3 | 12, 13, 14, 15 | 2 |
| 27 | 3 | 16, 17, 18, 19 | 2 |
| 28 | 3 | 20, 21, 22, 23 | 2 |
| 29-63(or 29-31) | Reserved | Reserved | Reserved |

Example 4

The UE may assume the sequence of a DMRS port corresponding to FD-length L and mapped to resource elements $(k, l)_{p,\mu}$, according to equation (21) for DMRS type I.

$$a_{k,l}^{(p,\mu)} = w_f(k')w_t(l')r(L*n+k') \tag{21}$$

$$k = 2*L*n+2*k'+\Delta,\text{ or } k = (2*L*n+2*k'+\Delta) \bmod 12$$

$$\text{configration type } I$$

$$k' = 0, 1, \ldots, L-1;$$

$$l = \bar{l} + l'$$

$$n = 0, 1 \ldots$$

In some implementation, the UE may assume the sequence of a DMRS port corresponding to FD-length L and mapped to resource elements $(k, l)_{p,\mu}$, according to equation (22) for DMRS type II.

$$a_{k,l}^{(p,\mu)} = w_f(k')w_t(l')r(L*n+k') \tag{22}$$

$$k = 3*L*n+k' \bmod 2 + 6*\left\lfloor \frac{k'}{2} \right\rfloor + \Delta \quad \text{configration type } II$$

$$k' = 0, 1, \ldots, L-1;$$

$$l = \bar{l} + l'$$

$$n = 0, 1 \ldots$$

In some implementation, the UE may assume the sequence of a DMRS port corresponding to FD-length L and mapped to resource elements $(k, l)_{p,\mu}$, according to equation (23).

$$a_{k,l}^{(p,\mu)} = w_f(k')w_t(l')r(L*n+k') \tag{23}$$

$$k = \begin{cases} (2*L*n+2*k'+\Delta) \bmod 12, & \text{configration type } I \\ 3*L*n+k' \bmod 2 + 6*\left\lfloor \frac{k'}{2} \right\rfloor + \Delta, & \text{configration type } II \end{cases}$$

$$k' = 0, 1, \ldots, L-1;$$

$$l = \bar{l} + l'$$

$$n = 0, 1 \ldots$$

where l' can be got according to Table 42.

TABLE 42

| Max length | | l' |
|---|---|---|
| 1 | | 0 |
| 2 | Number of front loaded symbols = 1 | 0 |
| | Number of front loaded symbols = 2 | 0, 1 |

The $\bar{l}$ is first symbol of each consecutive symbols. It can be got according to Table 2.

The L is length of FD-OCC. The Table used to get $w_f(k')$, $w_t(l')$, Δ is shown in Table 43.

TABLE 43

| (DMRS type, FD-OCC length) | Table |
|---|---|
| (I, 2) | Table 1 |
| (I, 3) | Table 3 |
| (I, 6) | Table 13 |
| (I, 4) | Table 23 |
| (II, 2) | Table 24 |
| (II, 4) | Table 25 |

In some implementation, for DMRS type I, the gNB can indicate UE by DCI with DMRS port from a DMRS port set including DMRS port corresponding to FD-OCC length 2 as shown in Table 1 and FD-OCC length 3 as shown in Table 3 as described in Example 1-1 and example 1-2; Table 4 to 7 or Table 8 to 12 can be enabled by a RRC/MAC-CE signaling which includes one bit information to indicate whether Table 4 to 7 or Table 8 to 12 is enabled. In some implementation, four new Tables including a DMRS port corresponding to FD-OCC length 3 can be other 4 Tables each of which corresponding to one rank and the four new Table can be enabled by the 1 bit parameter. Table 3 can be also enabled by the 1 bit parameter. If the four new Tables is disabled, then old four tables may be enabled. Each of the old four Tables may only include DMRS ports including FD-OCC length 2 and corresponds one rank respectively.

In some implementation, for DMRS type I, the gNB can indicate UE by DCI with DMRS port from a DMRS port set including DMRS port corresponding to FD-OCC length 2 as shown in Table 1 and FD-OCC length 6 as shown in Table 13 as described in Example 2-1 and example 2-2. Table 14 to 17 or Table 18 to 22 can be enabled by a RRC/MAC-CE signaling which includes one bit information to indicate whether Table 14 to 17 or Table 18 to 22 is enabled. In some implementation, four new Tables including a DMRS port corresponding to FD-OCC length 6 can be other 4 Tables each of which corresponding to one rank and the four new Tables can be enabled by the 1 bit parameter. Table 13 can be also enabled by the 1 bit parameter.

In some implementation, for DMRS type I, the gNB can indicate UE by DCI with DMRS port from a DMRS port set including DMRS port corresponding to FD-OCC length 2 as shown in Table 1 and FD-OCC length 4 as shown in Table 23 as described in Example 3-1 and example 3-2. Table 14 to 17 or Table 18 to 22 can be enabled by a RRC/MAC-CE signaling which includes one bit information to indicate whether Table 14 to 17 or Table 18 to 22 is enabled. In some implementation, Four new Tables including a DMRS port corresponding to FD-OCC length 4 can be other 4 Tables each of which corresponding to one rank and the four new Tables can be enabled by the 1 bit parameter. Table 23 can be also enabled by the 1 bit parameter.

In some implementation, for DMRS type IL, the gNB can indicate UE by DCI with DMRS port from a DMRS port set including DMRS port corresponding to FD-OCC length 2 as shown in Table 24 and FD-OCC length 4 as shown in Table 25 as described in Example 3-3 and example 3-4. one of Table 26 to 29, Table 30 to 33,Table 34 to 37 or Table 38 to 41 can be enabled by a RRC/MAC-CE signaling which includes one bit information to indicate whether Table 14 to 17 or Table 18 to 22 is enabled. In some implementation, four new Tables including a DMRS port corresponding to FD-OCC length 4 can be other 4 Tables each of which corresponding to one rank and the four new Tables can be enabled by the 1 bit parameter. Table 25 can be also enabled by the 1 bit parameter.

In some implementation, for DMRS type I, the gNB can indicate UE by DCI with DMRS port from a DMRS port set including DMRS port corresponding to FD-OCC length 2 as shown in Table 1, FD-OCC length 3 as shown in Table 3, FD-OCC length 6. That is the FD-OCC length can be switched dynamically by DCI among length 2, 3, 6. For one CDM group/for one UL transmission, the UE can be indicated with a DMRS port corresponding to FD-OCC length being one of {2,3,6,(2,3),(2,6)} which excludes (3,6). The DMRS port corresponding to 3 and another DMRS port corresponding to FD-OCC length 6 may not be indicated together to the UE for one UL transmission/for one CDM group. One UL transmission corresponds to one codepoint value in the Table. The codepoint is codepoint of antenna indication. The DMRS ports corresponding to FD-OCC length (2,3) includes a DMRS port corresponding to FD-OCC length 2 and a DMRS port corresponding to FD-OCC length. Because different FD-OCC length may be suitable for different scenarios. For example, small FD-OCC length is suitable for frequency selective channel and long FD-OCC length is suitable for frequency flat channel. There are more orthogonal DMRS ports using longer FD-OCC length. The gNB can allocate suitable DMRS port according to current scenario. Four new Tables including DMRS ports corresponding to the three FD-OCC lengths are enable by a 1 bit information in RRC signaling/MAC-CE signaling. Each of the four new Tables including DMRS ports the three FD-OCC lengths corresponds one rank. Table 3 and 13 also can be enabled by the 1 bit information.

In some implementation, for DMRS type I, the gNB can indicate UE by DCI with DMRS port from a DMRS port set including DMRS port corresponding to FD-OCC length 2 as shown in Table 1, FD-OCC length 4 as shown in Table 23, FD-OCC length 6 as shown in 13. That is the FD-OCC length can be switched dynamically by DCI among length 2, 4, 6. For one CDM group, the UE can be indicated with a DMRS port corresponding to FD-OCC length being one of {2,4,6,(2,4),(2,6)} which doesn't includes (4,6). The DMRS port corresponding to 4 and another DMRS port corresponding to FD-OCC length 6 may not be indicated together to the UE for one UL transmission/for one CDM group. Four new Tables including DMRS ports corresponding to the three FD-OCC lengths are enable by a 1 bit information in RRC signaling/MAC-CE signaling. Each of the four new Tables including DMRS ports the three FD-OCC lengths corresponds one rank. Table 3 and Table 23 also can be enabled by the 1 bit information.

In some implementations, for DMRS type I, the gNB can indicate UE by DCI with DMRS port from a DMRS port set including DMRS port corresponding to FD-OCC length 2 as shown in Table 1, FD-OCC length 4 as shown in Table 23, FD-OCC length 6 as shown in Table 13, FD-OCC length 3 as shown in Table 3. That is the FD-OCC length can be switched dynamically by DCI among length 2, 3, 4, 6. For one CDM group, the UE can be indicated with a DMRS port corresponding to FD-OCC length being one of {2,4,6,(2,4),(2,6),(2,3)} which excludes {(4,6),(3,4),(3,6)}. Two DMRS port corresponding to two different FD-OCC lengths which doesn't include 2 may not be indicated together to the UE for one UL transmission/for one CDM group. Four new Tables including DMRS ports corresponding to the four FD-OCC lengths are enable by a 1 bit information in RRC signaling/MAC-CE signaling. Each of the four new Tables including DMRS ports the three FD-OCC lengths corresponds one rank. Table 3, Table 13 and Table 23 also can be enabled by the 1 bit information.

In above implementation, only one type new Table present. The new type Table can be enabled by one 1 bit information. The Table is selected by DMRS type, max-length of consecutive OFDM symbol and the 1 bit information. The 1 bit information can be in RRC signaling or MAC-CE signaling and can be a new information which can be named new Table enable, max-length of FD-OCC, or other name. The Table may be for indicating DMRS port information as shown in Table 4 to 11, 14 to 22, 16 to 41. The number of bits of antenna bit field can be determined by DMRS type, max-length of consecutive OFDM symbol and the 1 bit information.

In another implementation, the new Table includes more than one mode of DMRS Table, a more than one bits parameter indicates which mode of Table is used. Table of antenna bit field is selected by DMRS type, max-length of consecutive OFDM symbol and the 1 bit information. The number of bits of antenna bit field can be determined by DMRS type, max-length of consecutive OFDM symbol and the more than one bit information. For example the more than one bit parameter can be used to enable one from following at least two modes including mode A to mode F. The mode A to mode F also can named type A to type F. To avoid confusion with DMRS type I/II, here mode A to mode F can be utilized.

TABLE 44

| mode of new type/DMRS type | Type I | Type II |
|---|---|---|
| mode A | A Table including DMRS ports corresponding to FD-OCC length 2 and FD-OCC length 3 | |
| mode B | A Table including DMRS ports corresponding to FD-OCC length 2 and FD-OCC length 6 | |
| mode C | A Table including DMRS ports corresponding to FD-OCC length 2 and FD-OCC length 4 | A Table including DMRS ports corresponding to FD-OCC length 2 and FD-OCC length 4 |
| mode D | A Table including DMRS ports corresponding to FD-OCC length 2, 3 and 6 | |
| mode E | A Table including DMRS ports corresponding to FD-OCC length 2, 4 and 6 | |
| mode F | A Table including DMRS ports corresponding to FD-OCC length 2, 3,4 and 6 | |

In some implementation, the parameter of DMRS type can be in MAC-CE, then type I and type II can be switched by MAC-CE signaling.

In some implementation, the parameter of max-length consecutive OFDM symbols can also be in MAC-CE, then max-length being 1 and max-length being 2 can be switched by MAC-CE.

In some implementation, the candidate mode of new Table for type I is different from the candidate mode of new Table for type II. For example, for type IL, only mode C can be candidate mode. For type I, mode A to mode F can be candidate mode. Alternative for type I, mode B can be candidate mode.

In some implementation, the parameter to enable the new Table and the DMRS type selection parameter, are two different parameters. In another implementation, one parameter can indicate one combination of DMRS type and new Table mode. That is, the DMRS type and new Table mode can be indicated together to same overhead of the parameter. Because some combination of the two parameters isn't a candidate combination. For example, only mode C can be used for DMRS type II.

Example 5

For the downlink transmission, the DMRS of the downlink channel can be indicated by a Table, wherein the table comprises DMRS ports corresponding to more than two FD-OCC lengths, such as the length of FD-OCC can be one of {2,3,4,6}.

For DMRS of PDSCH, the UE may obtain the sequence of a DMRS port of a FD-OCC of length L according to above method of DMRS PUSCH except the $\bar{l}$ is based on Table 45-1 or Table 45-2.

For DMRS of PDSCH, the reference point for l and the position $l_0$ of the first DM-RS symbol in above equations may depend on the mapping type. For PDSCH mapping type A, l is defined or determined relative to the start of the slot, and $l_0$=3 if the higher-layer parameter dmrs-TypeA-Position is equal to 'pos3' and $l_0$=2. For PDSCH mapping type B: I is defined relative to the start of the scheduled PDSCH resources and $l_0$=0.

The position(s) of the DM-RS symbols may be given by $\bar{l}$ and duration $l_d$. For example, for PDSCH mapping type A, $l_d$ may be the duration between the first OFDM symbol of the slot and the last OFDM symbol of the scheduled PDSCH resources in the slot. For PDSCH mapping type B, $l_d$ may be the duration of the scheduled PDSCH resources. Table 45-1 may be applicable for the case where the number of OFDM symbols in one DMRS OFDM symbol group is 1 and Table 45-2 may be applicable for the case where the number of OFDM symbols in one DMRS OFDM symbol group is 2. In some embodiments, $l_1$ is 11 or 12 which depends on higher layer configuration.

TABLE 45-1

| | DM-RS positions $\bar{l}$ | | | | | | | |
|---|---|---|---|---|---|---|---|---|
| $l_d$ in | PDSCH mapping type A dmrs-AdditionalPosition | | | | PDSCH mapping type B dmrs-AdditionalPosition | | | |
| symbols | pos0 | pos1 | pos2 | pos3 | pos0 | pos1 | pos2 | pos3 |
| 2 | — | — | — | — | $l_0$ | $l_0$ | $l_0$ | $l_0$ |
| 3 | $l_0$ | $l_0$ | $l_0$ | $l_0$ | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 7 | $l_0$, 4, 7 | $l_0$, 4, 7 |
| 10 | $l_0$ | $l_0$, 9 | $l_0$, 6, 9 | $l_0$, 6, 9 | $l_0$ | $l_0$, 7 | $l_0$, 4, 7 | $l_0$, 4, 7 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 9 | $l_0$, 5, 9 | $l_0$, 3, 6, 9 |

TABLE 45-1-continued

| $l_d$ in symbols | DM-RS positions $\bar{l}$ | | | | | | | |
|---|---|---|---|---|---|---|---|---|
| | PDSCH mapping type A dmrs-AdditionalPosition | | | | PDSCH mapping type B dmrs-AdditionalPosition | | | |
| | pos0 | pos1 | pos2 | pos3 | pos0 | pos1 | pos2 | pos3 |
| 13 | $l_0$ | $l_0$, $l_1$ | $l_0$, 7, 11 | $l_0$, 5, 8, 11 | $l_0$ | $l_0$, 9 | $l_0$, 5, 9 | $l_0$, 3, 6, 9 |
| 14 | $l_0$ | $l_0$, $l_1$ | $l_0$, 7, 11 | $l_0$, 5, 8, 11 | — | — | — | — |

TABLE 45-2

| $l_d$ in symbols | DM-RS positions $\bar{l}$ | | | | | |
|---|---|---|---|---|---|---|
| | PDSCH mapping type A dmrs-AdditionalPosition | | | PDSCH mapping type B dmrs-AdditionalPosition | | |
| | pos0 | pos1 | pos2 | pos0 | pos1 | pos2 |
| <4 | | | | — | — | |
| 4 | $l_0$ | $l_0$ | | — | — | |
| 5 | $l_0$ | $l_0$ | | $l_0$ | $l_0$ | |
| 6 | $l_0$ | $l_0$ | | $l_0$ | $l_0$ | |
| 7 | $l_0$ | $l_0$ | | $l_0$ | $l_0$ | |
| 8 | $l_0$ | $l_0$ | | $l_0$ | $l_0$, 5 | |
| 9 | $l_0$ | $l_0$ | | $l_0$ | $l_0$, 5 | |
| 10 | $l_0$ | $l_0$, 8 | | $l_0$ | $l_0$, 7 | |
| 11 | $l_0$ | $l_0$, 8 | | $l_0$ | $l_0$, 7 | |
| 12 | $l_0$ | $l_0$, 8 | | $l_0$ | $l_0$, 8 | |
| 13 | $l_0$ | $l_0$, 10 | | $l_0$ | $l_0$, 8 | |
| 14 | $l_0$ | $l_0$, 10 | | — | — | |

In addition, if a same DMRS index is shared between different FD-OCC with different FD-OCC lengths, unlink the DMRS table of PUSCH, the DMRS table for PDSCH should includes a second parameter to indicate the length of a FD-OCC of a DMRS port with the same DMRS index. Because the UE gets channel estimate of the DMRS port and the DMRS ports of co-scheduled UEs according actual FD-OCC of the DMRS port. The UE gets co-scheduled UEs interference according to the DMRS ports of co-scheduled UEs. Then the UE can decode PDSCH more accurately.

For example, for DMRS type I, a same DMRS port index for each of DMRS port {0,2,4,6} is shared between a first category DMRS port with a first FD-OCC [1,1] and a second category DMRS port with a second FD-OCC of length L and L elements being 1, such as [1,1,1] if L=3,such as [1,1,1,1] if L=4, such as [1,1,1,1,1,1] if L=6. If UE is allocated with a DMRS port from DMRS port {0,2,4,6}, the UE needs to know the DMRS port with which FD-OCC between the first FD-OCC and the second FD-OCC. Each CDM group includes up two DMRS ports with the same index. If the FD-OCC of the DMRS port with the same index is [1,1], then the DMRS ports of the co-scheduled DMRS ports includes other DMRS ports with a FD-OCC of length 2 in each CDM group without data. If the FD-OCC of the DMRS port with the same index is [1,1,1], then the DMRS ports of the co-scheduled DMRS ports includes other DMRS ports with a FD-OCC of length 3 in each CDM group without data. In some implementation, for DMRS type I, a same DMRS port index for each of DMRS port {1,3,5,7} is shared between a first category DMRS port with a first FD-OCC [1,−1] and a second category DMRS port with a second FD-OCC of length L and L elements which includes L/2 repetition of [1,−1], such as [1,−1,1,−1] if L=4, such as [1,−1,1,−1,1,−1] is L=6. If UE is allocated with a DMRS port from DMRS port {1,3,5,7}, the UE needs to know the DMRS port with which FD-OCC between the first FD-OCC and the second FD-OCC. Each CDM group includes up two DMRS ports with the same index. If the FD-OCC of the DMRS port with the same index is [1,−1], then the DMRS ports of the co-scheduled DMRS ports includes other DMRS ports with a FD-OCC of length 2 in each CDM group without data. If the FD-OCC of the DMRS port with the same index is L/2 repetition of [1,−1], then the DMRS ports of the co-scheduled DMRS ports includes other DMRS ports with a FD-OCC of length L in each CDM group without data. For example, for DMRS type IL, a same DMRS port index for each of DMRS port {0,2,4,6,8,10} is shared between a first category DMRS port with a first FD-OCC [1,1] and a second category DMRS port with a second FD-OCC of length L and L elements being 1, such as [1,1,1,1] if L=4. If UE is allocated with a DMRS port from DMRS port {0,2,4,6,8,10}, the UE needs to know the DMRS port with which FD-OCC between the first FD-OCC and the second FD-OCC. Each CDM group includes up two DMRS ports with the same index. If the FD-OCC of the DMRS port with the same index is [1,1], then the DMRS ports of the co-scheduled DMRS ports includes other DMRS ports with a FD-OCC of length 2 in each CDM group without data. If the FD-OCC of the DMRS port with the same index is [1,1,1], then the DMRS ports of the co-scheduled DMRS ports includes other DMRS ports with a FD-OCC of length 3 in each CDM group without data. In some implementation, for DMRS type II, a same DMRS port index for each of DMRS port {1,3,5,7,9,10} is shared between a first category DMRS port with a first FD-OCC [1,−1] and a second category DMRS port with a second FD-OCC of length L and L elements which includes L/2 repetition of [1,−1], such as [1,−1,1,−1] if L=4. If UE is allocated with a DMRS port from DMRS port {1,3,5,7}, the UE needs to know the DMRS port with which FD-OCC between the first FD-OCC and the second FD-OCC. Each CDM group includes up two DMRS ports with the same index. If the FD-OCC of the DMRS port with the same index is [1,−1], then the DMRS ports of the co-scheduled DMRS ports includes other DMRS ports with a FD-OCC of length 2 in each CDM group without data. If the FD-OCC of the DMRS port with the same index is L/2 repetition of [1,−4], then the DMRS ports of the co-scheduled DMRS ports includes other DMRS ports with a FD-OCC of length L in each CDM group without data.

Unlike the DMRS table for PUSCH, the DMRS table for PDSCH isn't selected by rank. The DMRS table for PDSCH includes multiple values each of values can corresponds to a respective rank.

Alternatively, for PUSCH, if a same DMRS index is shared between different FD-OCCs with different FD-OCC lengths, but for PDSCH, if a same DMRS index is shared between different FD-OCCs with different FD-OCC lengths In addition, because the gNB can schedule MU-UEs. Different CDM groups can includes DMRS ports of different lengths of FD-OCC. Each CDM group without date is associated with a respective length of FD-OCC. The DMRS table should include a third parameter to let the UE get the DMRS ports of co-scheduled UEs. For example, the third parameter includes at least one of: length of FD-OCC for each CDM group without data, whether lengths of FD-OCC for different CDM groups are different.

Example 5-1 DMRS type I and maximum length of FD-OCC is 3. Similar as example 1, if the DMRS type is configured to be type I and max-length is configured to be 1, one Table for indicating downlink DMRS port of PDSCH including a first category DMRS port corresponding to FD-OCC length 2 and a second category DMRS port corresponding to FD-OCC length 3. The pattern of the first DMRS port may be based on Table 1, equation (1) and FIG. 1. The pattern of the second DMRS may be based on Table 45 or Table 46, equation (2) and FIG. 4. Different from Table 3, the DMRS port corresponding FD-OCC [1,1] and DMRS port corresponding to FD-OCC [1,1,1] may not share same DMRS port. Because the UE may not know the actual FD-OCC length of a DMRS port to get channel coefficient of the DMRS port.

TABLE 45

| FD-OCC with length 3 | | | | | | | |
|---|---|---|---|---|---|---|---|
| | CDM group | | $w_f(k')$ | | | $w_t(l')$ | |
| $\tilde{p}$ | λ | Δ | k' = 0 | k' = 1 | k' = 2 | l' = 0 | l' = 1 |
| 8 | 0 | 0 | +1 | $e^{j2\pi\frac{1}{3}}$ | $e^{j2\pi\frac{2}{3}}$ | +1 | +1 |
| 9 | 0 | 0 | +1 | $e^{j2\pi\frac{2}{3}}$ | $e^{j2\pi\frac{1}{3}}$ | +1 | +1 |
| 10 | 1 | 1 | +1 | $e^{j2\pi\frac{1}{3}}$ | $e^{j2\pi\frac{2}{3}}$ | +1 | +1 |
| 11 | 1 | 1 | +1 | $e^{j2\pi\frac{2}{3}}$ | $e^{j2\pi\frac{1}{3}}$ | +1 | +1 |
| 12 | 0 | 0 | +1 | $e^{j2\pi\frac{1}{3}}$ | $e^{j2\pi\frac{2}{3}}$ | +1 | −1 |
| 13 | 0 | 0 | +1 | $e^{j2\pi\frac{2}{3}}$ | $e^{j2\pi\frac{1}{3}}$ | +1 | −1 |
| 14 | 1 | 1 | +1 | $e^{j2\pi\frac{1}{3}}$ | $e^{j2\pi\frac{2}{3}}$ | +1 | −1 |
| 15 | 1 | 1 | +1 | $e^{j2\pi\frac{2}{3}}$ | $e^{j2\pi\frac{1}{3}}$ | +1 | −1 |
| 16 | 0 | 0 | +1 | +1 | +1 | +1 | +1 |
| 17 | 1 | 1 | +1 | +1 | +1 | +1 | +1 |
| 18 | 0 | 0 | +1 | +1 | +1 | +1 | −1 |
| 19 | 1 | 1 | +1 | +1 | +1 | +1 | −1 |

TABLE 46

| FD-OCC with length 3 | | | | | | | |
|---|---|---|---|---|---|---|---|
| | CDM group | | $w_f(k')$ | | | $w_t(l')$ | |
| $\tilde{p}$ | λ | Δ | k' = 0 | k' = 1 | k' = 2 | l' = 0 | l' = 1 |
| 8 | 0 | 0 | +1 | $e^{j2\pi\frac{1}{3}}$ | $e^{j2\pi\frac{2}{3}}$ | +1 | +1 |
| 9 | 0 | 0 | +1 | $e^{j2\pi\frac{2}{3}}$ | $e^{j2\pi\frac{1}{3}}$ | +1 | +1 |
| 10 | 0 | 0 | +1 | +1 | +1 | +1 | +1 |

TABLE 46-continued

| FD-OCC with length 3 | | | | | | | |
|---|---|---|---|---|---|---|---|
| | CDM group | | $w_f(k')$ | | | $w_t(l')$ | |
| $\tilde{p}$ | λ | Δ | k' = 0 | k' = 1 | k' = 2 | l' = 0 | l' = 1 |
| 11 | 1 | 1 | +1 | $e^{j2\pi\frac{1}{3}}$ | $e^{j2\pi\frac{2}{3}}$ | +1 | +1 |
| 12 | 1 | 1 | +1 | $e^{j2\pi\frac{2}{3}}$ | $e^{j2\pi\frac{1}{3}}$ | +1 | +1 |
| 13 | 1 | 1 | +1 | +1 | +1 | +1 | +1 |
| 14 | 0 | 0 | +1 | $e^{j2\pi\frac{1}{3}}$ | $e^{j2\pi\frac{2}{3}}$ | +1 | −1 |
| 15 | 0 | 0 | +1 | $e^{j2\pi\frac{2}{3}}$ | $e^{j2\pi\frac{1}{3}}$ | +1 | −1 |
| 16 | 0 | 0 | +1 | +1 | +1 | +1 | −1 |
| 17 | 1 | 1 | +1 | $e^{j2\pi\frac{1}{3}}$ | $e^{j2\pi\frac{2}{3}}$ | +1 | −1 |
| 18 | 1 | 1 | +1 | $e^{j2\pi\frac{2}{3}}$ | $e^{j2\pi\frac{1}{3}}$ | +1 | −1 |
| 19 | 1 | 1 | +1 | +1 | +1 | +1 | −1 |

The difference between Table 45 and Table 46 is the number sequence of the DMRS. If Table 42 is adopted, the same DMRS port for uplink DMRS port and downlink DMRS port can corresponds same FD-OCC but the number of DMRS port in one CDM group for single symbol isn't consecutive. For CDM group 0, it includes DMRS port {8,9,16} for single symbol/one TD-OCC. If Table 43 is adopted, the number of DMRS port in one CDM group for single symbol is consecutive. For CDM group 0, it includes DMRS port {8,9, 10} for single symbol/one TD-OCC. Following DMRS indicating Table, Table 43 can be adopted. If the Table 42 is used, then the DMRS port {8~19} in the indication Table can be in sequence replaced with {8,9,16, 10,11,17,12,13,18,14,15,19} respectively. For example, the DMRS port 10 can be replaced to DMRS port 16. The DMRS port 11 can be replaced to DMRS port 10, and so on.

Example 5-2: DMRS Type II and Maximum Length of FD-OCC is 3

Similar as example 3-3, the DMRS table can includes DMRS ports of a FD-OCC of length 2 and a FD-OCC of length 4. The gNB can inform the UE which FD-OCC length should be used to transmit the downlink DMRS using following Table 47 or Table 48 Table 47

TABLE 47

| One codeword: Codeword 0 enabled, Codeword 1 disabled | | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| | | | 2 | 3 | 0-3, 12-15 |
| 2 | 1 | 0, 1 | 3 | 3 | 0, 2, 4, 12, 14, 16 |
| 3 | 2 | 0 | 4 | 2 | 0, 2, 4, 12, 14 |
| 4 | 2 | 1 | 5 | 2 | 0-3, 12 |
| 5 | 2 | 2 | 6 | 2 | 0-3, 12, 13 |
| 6 | 2 | 3 | 7 | 2 | 0-3, 12, 13, 14 |
| 7 | 2 | 0, 1 | 8-63 | reserved | reserved |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 3 | 0, 2 | | | |
| 24 | 3 | 12 | | | |
| 25 | 3 | 13 | | | |
| 26 | 3 | 14 | | | |
| 27 | 3 | 15 | | | |
| 28 | 3 | 16 | | | |
| 29 | 3 | 17 | | | |
| 30 | 3 | 12, 13 | | | |
| 31 | 3 | 14, 15 | | | |
| 32 | 3 | 16, 17 | | | |
| 33 | 3 | 0, 12, 13 | | | |
| 34 | 3 | 2, 14, 15 | | | |
| 35 | 3 | 4, 16, 17 | | | |
| 36 | 3 | 0, 1, 12, 13 | | | |
| 37 | 3 | 2, 3, 14, 15 | | | |
| 38 | 3 | 4, 5, 16, 17 | | | |
| 39 | 3 | 0, 2, 4, 12 | | | |
| 40-63 | Reserved | Reserved | | | |

TABLE 48

| One codeword: Codeword 0 enabled, Codeword 1 disabled | | | | Two codewords: Codeword 0 enabled, Codeword 1 enabled | | | |
|---|---|---|---|---|---|---|---|
| Value | Number of DMRS CDM group(s) without data | Whether different FD-OCC lengths in different CDM groups | DMRS port(s) | Value | Number of DMRS CDM group(s) without data | Whether different FD-OCC lengths in different CDM groups | DMRS port(s) |
| 0 | 1 | 0 | 0 | 0 | 3 | 0 | 0-4 |
| 1 | 1 | 0 | 1 | 1 | 3 | 0 | 0-5 |
| | | 0 | | 2 | 3 | 0 | 0-3, 12-15 |
| 2 | 1 | 0 | 0, 1 | 3 | 3 | 0 | 0, 2, 4, 12, 14, 16 |
| 3 | 2 | 0 | 0 | 4 | 2 | 0 | 0, 2, 4, 12, 14 |
| 4 | 2 | 0 | 1 | 5 | 2 | 0 | 0-3, 12 |
| 5 | 2 | 0 | 2 | 6 | 2 | 0 | 0-3, 12, 13 |
| 6 | 2 | 0 | 3 | 7 | 2 | 0 | 0-3, 12, 13, 14 |
| 7 | 2 | 0 | 0, 1 | 8 | 2 | 1 | 0, 1, 2, 3, 14, 15 |
| | | | | 9 | 3 | 1 | 2, 3, 14, 15, 4 |
| | | | | 10 | 3 | 1 | 2, 3, 14, 15, 4, 5 |
| | | | | 11 | 3 | 1 | 2, 3, 14, 15, 4, 5, 16, 17 |
| 8 | 2 | 0 | 2, 3 | 12-63 | reserved | reserved | reserved |
| 9 | 2 | 0 | 0-2 | | | | |
| 10 | 2 | 0 | 0-3 | | | | |
| 11 | 3 | 0 | 0 | | | | |
| 12 | 3 | 0 | 1 | | | | |
| 13 | 3 | 0 | 2 | | | | |
| 14 | 3 | 0 | 3 | | | | |
| 15 | 3 | 0 | 4 | | | | |
| 16 | 3 | 0 | 5 | | | | |
| 17 | 3 | 0 | 0, 1 | | | | |
| 18 | 3 | 0 | 2, 3 | | | | |
| 19 | 3 | 0 | 4, 5 | | | | |
| 20 | 3 | 0 | 0-2 | | | | |
| 21 | 3 | 0 | 3-5 | | | | |
| 22 | 3 | 0 | 0-3 | | | | |
| 23 | 3 | 0 | 0, 2 | | | | |
| 24 | 3 | 0 | 12 | | | | |
| 25 | 3 | 0 | 13 | | | | |
| 26 | 3 | 0 | 14 | | | | |
| 27 | 3 | 0 | 15 | | | | |
| 28 | 3 | 0 | 16 | | | | |
| 29 | 3 | 0 | 17 | | | | |
| 30 | 3 | 0 | 12, 13 | | | | |
| 31 | 3 | 0 | 14, 15 | | | | |
| 32 | 3 | 0 | 16, 17 | | | | |
| 33 | 3 | 0 | 0, 12, 13 | | | | |
| 34 | 3 | 0 | 2, 14, 15 | | | | |
| 35 | 3 | 0 | 4, 16, 17 | | | | |
| 36 | 3 | 0 | 0, 1, 12, 13 | | | | |
| 37 | 3 | 0 | 2, 3, 14, 15 | | | | |
| 38 | 3 | 0 | 4, 5, 16, 17 | | | | |
| 39 | 3 | 0 | 0, 2, 4, 12 | | | | |
| 40 | 2, | 1 | 0 | | | | |
| 41 | 2 | 1 | 1 | | | | |
| 42 | 2 | 1 | 2 | | | | |
| 43 | 2 | 1 | 3 | | | | |
| 44 | 2 | 1 | 0, 1 | | | | |
| 45 | 2 | 1 | 2, 3 | | | | |
| 46 | 2 | 1 | 0-2 | | | | |
| 47 | 2 | 1 | 0-3 | | | | |
| 48 | 3 | 1 | 0 | | | | |
| 49 | 3 | 1 | 1 | | | | |
| 50 | 3 | 1 | 2 | | | | |
| 51 | 3 | 1 | 3 | | | | |
| 52 | 3 | 1 | 4 | | | | |
| 53 | 3 | 1 | 5 | | | | |
| 54 | 3 | 1 | 0, 1 | | | | |
| 55 | 3 | 1 | 2, 3 | | | | |
| 56 | 3 | 1 | 4, 5 | | | | |
| 57 | 3 | 1 | 0-2 | | | | |
| 58 | 3 | 1 | 3-5 | | | | |
| 59 | 3 | 1 | 0-3 | | | | |
| 60 | 3 | 1 | 0, 2 | | | | |
| 61-63 | reserved | reserved | reserved | | | | |

From Table 47, if the DMRS port corresponds to FD-OCC length 4, then the number of CDM group may be 3. For DMRS type I and max-length 1, a UE can be allocated with up to 8 DMRS ports.

One difference between Table 47 and 48 is that Table 48 includes information indicating whether two CDM groups includes DMRS port corresponding to different FD-OCC lengths when the UE is allocated with DMRS corresponding to FD-OCC length 2 in CDM group 0 or corresponding to FD-OCC length 4 in CDM group 1, or 2. when the number of CDM groups without data is more than one. If no clarification such as value 0~7 for two code word, DMRS ports in different CDM groups corresponds to same FD-OCC length. When the DMRS ports in different CDM groups correspond to different FD-OCC length, the DMRS port for potential MU UE in the another CDM group without UE's allocated DMRS ports may include DMRS ports corresponding to the other FD-OCC length. The UE may obtain the DMRS port of the potential co-scheduled UE based on the information indicating whether different CDM groups includes DMRS port corresponding to different FD-OCC lengths. For example, for one code word and value 3, the UE may be allocated DMRS port 0 for its PDSCH transmission and the two CDM groups includes DMRS ports corresponding to same FD-OCC lengths, then UE gets that the DMRS of potential co-scheduled UE includes {1,2-3}. For one code word and value 40, the UE may be allocated DMRS port 0 for its PDSCH transmission and the two CDM groups includes DMRS ports corresponding to different FD-OCC lengths, then UE may obtain that the DMRS of potential co-scheduled UE includes {1,2,3,14,15}.

Another difference between Table 48 and 47 is that Table 48 includes entry including DMRS ports in CDM group 1 and 2 such as {0,1,2,3,14,15} corresponding to value 8-11 for two codewords. The CDM group 0 includes DMRS ports of potential co-scheduled UEs of a FD-OCC with length 2.

Another difference between Table 48 and 47 is that Table 48 includes entry including DMRS port corresponding to different FD-OCC lengths in different CDM groups such as {0,1,2,3,14,15} corresponding to value 2 for two codewords.

In Table 47 and 48, if the DMRS port corresponding to FD-OCC length 4, the number of CDM group without data may be 3. In other implementation, if the DMRS port corresponding to FD-OCC length 4 and in CDM group 0, the number of CDM group without data can be 1, 2, or 3. if the DMRS port corresponding to FD-OCC length 4 and in CDM group 0, the Table includes entries with same DMRS ports but with different number of without data.

In Table 48, the value for parameter to indicate whether different FD-OCC lengths in different CDM groups only includes {0,1}. In some implementation, the first table can includes parameter to indicate a length of a FD-OCC of each CDM groups without data.

Figure 15:
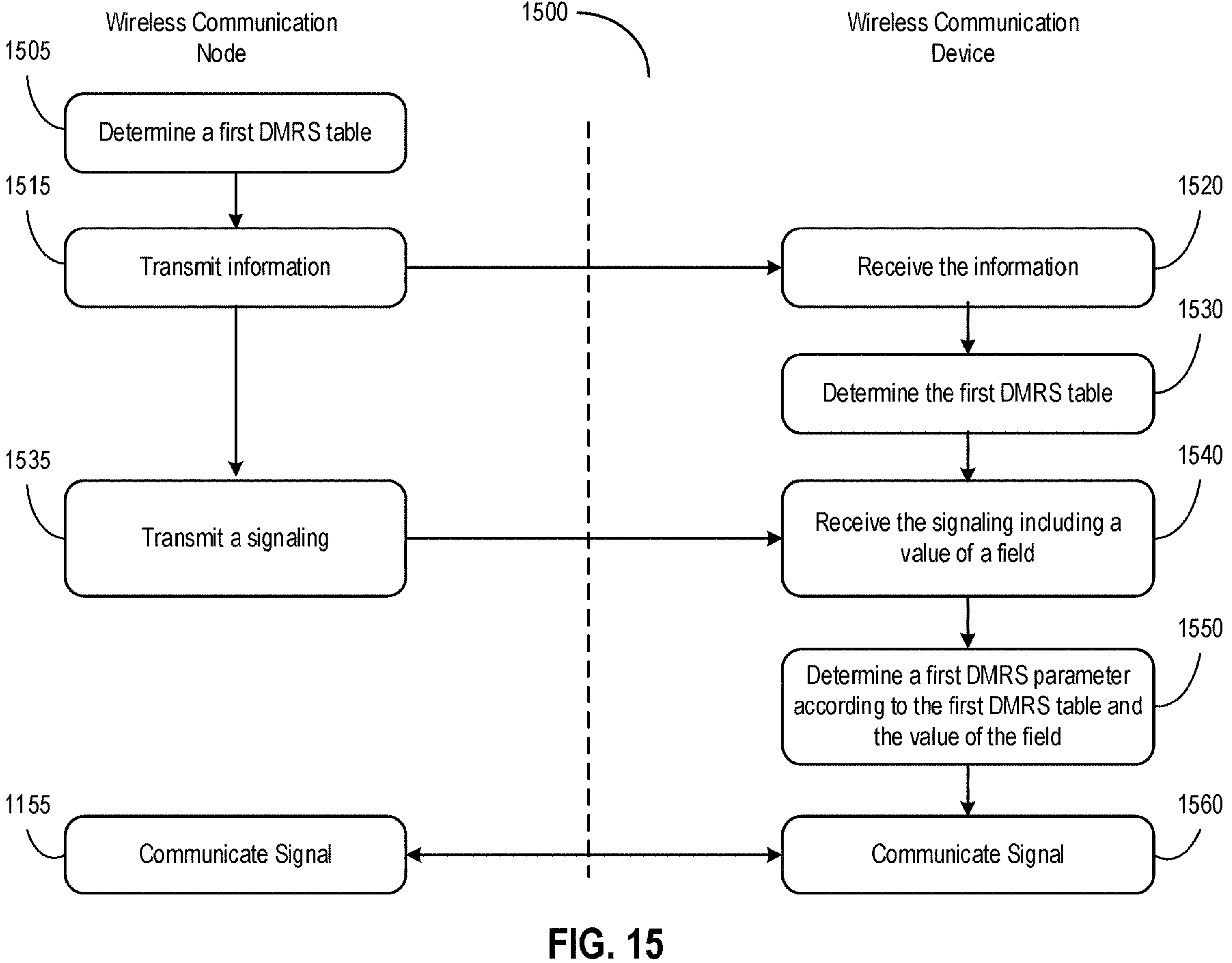
FIG. 15 illustrates a flow diagram of an example method for communicating according to DMRS port indication based on DMRS table, in accordance with an embodiment of the present disclosure.

FIG. 15 illustrates a flow diagram of a method 1500 for communication according to DMRS port indication based on DMRS table, in accordance with an embodiment of the present disclosure. The method 1500 may be implemented using any of the components and devices detailed herein in conjunction with FIGS. 1-14. In brief overview, a wireless communication node may determine a first DMRS table (1505). The wireless communication node may transmit information to determine a first DMRS table (1515). The wireless communication device may receive the information (1520), and determine the first DMRS table according to the information (1530). The wireless communication node may transmit signaling including to the wireless communication device (1535). The wireless communication device may receive the signaling including a value of a field (1540). The wireless communication device may determine a first DMRS parameter according to the first DMRS table and the value of the field (1550). The wireless communication device may communicate a signal with the communication node (1555 and 1560).

In further detail, the wireless communication node may determine a first DMRS table (1505), and the wireless communication node may transmit information for the wireless communication device to determine the first DMRS table (1515). The first information may include at least one of: a DMRS type of type I or type I, a maximum number of continuous DMRS OFDM symbols, a second DMRS parameter, or a number of the DMRS ports.

The wireless communication device may receive the information (1520), and determine the first DMRS table according to the information (1530). In one aspect, the wireless communication device stores a plurality of DMRS tables. According to the first information, the wireless communication device may determine the first DMRS table. For example, the wireless communication device may determine the first DMRS table, according to the DMRS type between type I and type II, the maximum number of OFDM symbols in one DMRS OFDM symbol group, the second DMRS parameter, the total number of OFDM symbol groups included in one transmission occasion, the number of DMRS ports, or any combination of them. In one aspect, the first DMRS table includes a mapping between values of the field of the signaling and values of the first DMRS parameter. Each of the values of the field may be associated with a respective one of the values of the first DMRS parameter. In one aspect, the first DMRS table includes the first DMRS parameter, that has values associated with at least two categories of DMRS ports. In one aspect, some values of the first DMRS parameter are associated with one category. Other values may be associated with multiple categories. Different categories of the at least two categories of DMRS ports may correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC. Each DMRS OFDM symbol group may include one or more consecutive OFDM symbols.

The wireless communication node may transmit signaling to the wireless communication device (1535). Examples of the signaling include downlink control information (DCI) signaling, radio access control (RRC) signaling, or medium access control control element (MAC-CE) signaling. The wireless communication device may receive the signaling (1540). The signaling may include one or more fields.

The wireless communication device may determine a first DMRS parameter according to the first DMRS table and the value of the field (1550). In some embodiments, a number of bits in the field is indicated by or determined according to the first DMRS information. Hence, the wireless communication device may receive the signal, and determine, detect, or identify a field according to the number of bits as indicated by the first DMRS information. The wireless communication device may apply the value of the field to the first DMRS table as an index, and determine, obtain, or identify the first DMRS parameter stored in an entry of the first DMRS table associated with index.

The wireless communication device may communicate a signal with the communication node (1555 and 1560). For example, the wireless communication device may select, control, or configure a DMRS port, according to the first DMRS parameter. Through the determined DMRS port, the wireless communication device and the wireless communication node may communicate with each other.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term “module” as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

receiving, by a wireless communication device, first information from a wireless communication node;

determining, by the wireless communication device, that a category of DMRS ports is enabled according to the first information, wherein the category of DMRS ports has a frequency domain orthogonal cover code (FD-OCC) of length L, where L is 4; and determining, by the wireless communication device, a sequence of a DMRS port p with the FD-OCC of length L, and mapped to resource elements $(k, l)_{p,\mu}$, according to:

$$-a_{k,l}^{(p,\mu)} = w_f(k')w_t(l')r(L*n+k')$$

wherein:

$k=2*L*n+2*k'+\Delta$, where k is an index of a subcarrier;

$k'=0, 1, \ldots, L-1$, where k' is an intermediate parameter to determine an index of a sub-carrier k of the DMRS port;

$l=\bar{l}+l'$, where l is an orthogonal frequency division multiplexing (OFDM) symbol of the DMRS port, l' is an index of the OFDM symbol among X continuous DMRS OFDM symbols;

$l'=0, 1, \ldots X-1$, where X is a number of continuous DMRS OFDM symbols;

n comprises non-negative integer values;

$w_f(k')$, $w_t(l')$, and $\Delta$ are provided by a defined table which includes a mapping between DMRS ports and the $w_f(k')$, $w_t(l')$, and $\Delta$; where $w_f(k')$ is a FD-OCC, $w_t(l')$ is a TD-OCC, and $\Delta$ is a resource element (RE) offset associated with a CDM group;

$\mu$ is a parameter related to subcarrier spacing;

p is an index of the DMRS port;

the DMRS port p is a DMRS port of type I; and $r(L*n+k')$ is a symbol with index $L*n+k'$ in a symbol sequence of $r(\bullet)$.

2. The method of claim 1, wherein if the DMRS port of the category of DMRS ports is of DMRS type I:

the DMRS port occupies REs on two continuous DMRS physical resource blocks (PRBs); and a number of PRBs of the DMRS ports is an integer multiple of 2.

3. The method of claim 1, comprising:

determining, by the wireless communication device, a sequence of the DMRS port p of a FD-OCC of length L, that is mapped to resource elements $(k, l)_{p,\mu}$, according to:

$$a_{k,l}^{(p,\mu)} = w_f(k')w_t(l')r(L*n+k')$$

wherein:

$$k = 3*L*n + k' \bmod 2 + 6*\left\lfloor\frac{k'}{2}\right\rfloor + \Delta,$$

where k' is an intermediate parameter to determine an index of a sub-carrier k of the DMRS port, and L is a length of one FD-OCC;

$l=\bar{l}+l'$, where l is an OFDM symbol of the DMRS port, l' is index of an OFDM symbol among X continuous DMRS OFDM symbols;

$l'=0, 1, \ldots, X-1$, where X is a number of continuous DMRS OFDM symbols;

n comprises non-negative integer values;

$w_f(k')$, $w_t(l')$, and $\Delta$ are provided by a defined table which includes a mapping between DMRS ports and the $w_f(k')$, $w_t(l')$, and $\Delta$; and $w_f(k')$ is a FD-OCC, $w_t(l')$ is a TD-OCC, and $\Delta$ is a RE offset associated with a CDM group;

$\mu$ is a parameter related to subcarrier spacing;

p is an index of the DMRS port, and the DMRS port is a DMRS port of type II; and $r(L*n+k')$ is a symbol with index $L*n+k'$ in a symbol sequence of $r(\bullet)$.

4. The method of claim 3, wherein:

if a number of continuous DMRS OFDM symbols is 1, the category of DMRS ports with a FD-OCC of length L includes DMRS ports {0-5,12-17};

if the number of continuous DMRS OFDM symbols is 1, CDM group 0 includes DMRS ports {0,1,12,13}, CDM group 1 includes DMRS ports {2,3, 14,15}, and CDM group 2 includes DMRS ports {4,5,16,17};

if the number of continuous DMRS OFDM symbols is 2, the category of DMRS ports with a FD-OCC of length L include DMRS ports {0-23}; and if the number of continuous DMRS OFDM symbols is 2, CDM group 0 includes DMRS ports {0,1,12,13,6,7,18, 19}, CDM group 1 includes DMRS ports {2,3,14,15, 8,9,20,21}, and CDM group 2 includes DMRS ports {4,5,16,17,10,11,22,23}.

5. The method of claim 1, comprising:

determining, by the wireless communication device, DMRS ports of potential co-scheduled wireless communication devices of the wireless communication device according to a rule and a signaling, wherein the rule includes:

in one CDM group without data, DMRS ports of the wireless communication device and DMRS ports of potential co-scheduled wireless communication devices have a same L, wherein the signaling includes the DMRS ports of the wireless communication device.

6. A method comprising:

sending, by a wireless communication node to a wireless communication device, first information, wherein the first information is used by the wireless communication device to determine a category of DMRS ports, the category of DMRS ports having a frequency domain orthogonal cover code (FD-OCC) of length L, where L is 4, wherein the wireless communication node determines a sequence of a DMRS port p with a FD-OCC of length L, and mapped to resource elements $(k, l)_{p,\mu}$, according to:

$$a_{k,l}^{(p,\mu)} = w_f(k')w_t(l')r(L*n+k')$$

wherein:

$k=2*L*n+2*k'+\Delta$, where k is an index of a subcarrier;

$k'=0, 1, \ldots, L-1$, where k' is an intermediate parameter to determine an index of a sub-carrier k of the DMRS port;

l=l̄+l', where/is an OFDM symbol of the DMRS port, l' is an index of the OFDM symbol among X continuous DMRS OFDM symbols;

l'=0, 1, . . . , X−1, where X is a number of continuous DMRS OFDM symbols;

n comprises non-negative integer values;

$w_f$(k'), $w_s$(l'), and A are provided by a defined table which includes a mapping between DMRS ports and the $w_f$(k'), $w_t$(l'), and Δ; where $w_f$(k') is a FD-OCC, $w_t$(l') is a TD-OCC, and Δ is a RE offset associated with a CDM group;

μ is a parameter related to subcarrier spacing;

p is an index of the DMRS port;

the DMRS port p is a DMRS port of type I; and r(L*n+k') is a symbol with index L*n+k' in a symbol sequence of r(•).

7. The method of claim 6, wherein if the DMRS port of the category of DMRS ports is of DMRS type I:

the DMRS port occupies REs on two continuous DMRS PRBs; and a number of PRBs of the DMRS ports is an integer multiple of 2.

8. The method of claim 6, wherein:

the wireless communication node determines a sequence of the DMRS port p of a FD-OCC of length L, that is mapped to resource elements $(k, l)_{p,\mu}$, according to:

$$a_{k,l}^{(p,\mu)} = w_f(k')w_t(l')r(L*n+k')$$

wherein:

$$k = 3*L*n + k' \bmod 2 + 6*\left\lfloor \frac{k'}{2} \right\rfloor + \Delta,$$

where k is an index of a subcarrier;

k'=0, 1, . . . , L−1, where k' is an intermediate parameter to determine an index of a sub-carrier k of the DMRS port, and L is a length of one FD-OCC;

l=l̄+l', where l is an OFDM symbol of the DMRS port, l' is index of an OFDM symbol among X continuous DMRS OFDM symbols;

l'=0, 1, . . . X−1, where X is a number of continuous DMRS OFDM symbols;

n comprises non-negative integer values;

$w_f$(k'), $w_t$(l'), and Δ are provided by a defined table which includes a mapping between DMRS ports and the $w_f$(k'), $w_t$(l'), and Δ; and we (k') is a FD-OCC, $w_t$(l') is a TD-OCC, and Δ is a RE offset associated with a CDM group;

μ is a parameter related to subcarrier spacing;

p is an index of the DMRS port, and the DMRS port is a DMRS port of type II; and r(L*n+k') is a symbol with index L*n+k' in a symbol sequence of r(•).

9. A wireless communication node, comprising:

at least one processor configured to:

send, via a transmitter to a wireless communication device, first information, wherein the first information is used by the wireless communication device to determine a category of DMRS ports, the category of DMRS ports having a frequency domain orthogonal cover code (FD-OCC) of length L, where L is 4, wherein a sequence of a DMRS port p with a FD-OCC of length L, is mapped to resource elements $(k, l)_{p,\mu}$, according to:

$$-a_{k,l}^{(p,\mu)} = w_f(k')w_t(l')r(L*n+k')$$

wherein:

k=2*L*n+2*k'+Δ, where k is an index of a subcarrier;

k'=0, 1 . . . , L−1, where k' is an intermediate parameter to determine an index of a sub-carrier k of the DMRS port;

l=l̄+l', where l is an OFDM symbol of the DMRS port, l' is an index of the OFDM symbol among X continuous DMRS OFDM symbols;

l'=0, 1, . . . X−1, where X is a number of continuous DMRS OFDM symbols;

n comprises non-negative integer values;

$w_f$(k'), $w_t$(l') and Δ are provided by a defined table which includes a mapping between DMRS ports and the $w_f$(k'), $w_t$(l'), and Δ; where $w_f$(k') is a FD-OCC, $w_t$(l') is a TD-OCC, and Δ is a RE offset associated with a CDM group;

μ is a parameter related to subcarrier spacing;

p is an index of the DMRS port;

the DMRS port p is a DMRS port of type I; and r(L*n+k') is a symbol with index L*n+k' in a symbol sequence of r(•).

10. The wireless communication node of claim 9, wherein if the DMRS port of the category of DMRS ports is of DMRS type I:

the DMRS port occupies REs on two continuous DMRS PRBs; and a number of PRBs of the DMRS ports is an integer multiple of 2.

11. The wireless communication node of claim 9, wherein:

a sequence of the DMRS port p of a FD-OCC of length L, is mapped to resource elements $(k, l)_{p,\mu}$, according to:

$$a_{k,l}^{(p,\mu)} = w_f(k')w_t(l')r(L*n+k')$$

wherein:

$$k = 3*L*n + k' \bmod 2 + 6*\left\lfloor \frac{k'}{2} \right\rfloor + \Delta,$$

where k is an index of a subcarrier;

k'=0, 1, . . . , L−1, where k' is an intermediate parameter to determine an index of a sub-carrier k of the DMRS port, and L is a length of one FD-OCC;

l=l̄+l', where l is an OFDM symbol of the DMRS port, l' is index of an OFDM symbol among X continuous DMRS OFDM symbols;

l'=0, 1, . . . X−1, where X is a number of continuous DMRS OFDM symbols;

n comprises non-negative integer values;

$w_f$(k'), $w_t$(l'), and Δ are provided by a defined table which includes a mapping between DMRS ports and the $w_f(k')$, $w_t(l')$, and Δ; and $w_f(k')$ is a FD-OCC, $w_t(l')$ is a TD-OCC, and Δ is a RE offset associated with a CDM group;

μ is a parameter related to subcarrier spacing;

p is an index of the DMRS port, and the DMRS port is a DMRS port of type II; and r(L*n+k') is a symbol with index L*n+k' in a symbol sequence of r(•).

12. A wireless communication device, comprising:

at least one processor configured to:

receive, via a receiver, first information from a wireless communication node;

determine that a category of DMRS ports is enabled according to the first information, wherein the category of DMRS ports has a frequency domain orthogonal cover code (FD-OCC) of length L, where L is 4; and determine a sequence of a DMRS port p with a FD-OCC of length L, and mapped to resource elements $(k, l)_{p,\mu}$, according to:

$$-a_{k,l}^{(p,\mu)} = w_f(k')w_t(l')r(L*n+k')$$

wherein:

k=2*L*n+2*k'+Δ, where k is an index of a subcarrier;

k'=0, 1 . . . , L−1, where k' is an intermediate parameter to determine an index of a sub-carrier k of the DMRS port;

l=l̄+l' where/is an OFDM symbol of the DMRS port, l' is an index of the OFDM symbol among X continuous DMRS OFDM symbols;

l'=0, 1, . . . X−1, where X is a number of continuous DMRS OFDM symbols;

n comprises non-negative integer values;

$w_f(k')$, $w_t(l')$, and Δ are provided by a defined table which includes a mapping between DMRS ports and the $w_f(k')$, $w_t(l')$, and Δ; where $w_f(k')$ is a FD-OCC, $w_t(l')$ is a TD-OCC, and Δ is a RE offset associated with a CDM group;

μ is a parameter related to subcarrier spacing;

p is an index of the DMRS port;

the DMRS port p is a DMRS port of type I; and r(L*n+k') is a symbol with index L*n+k' in a symbol sequence of r(•).

13. The wireless communication device of claim 12, wherein if the DMRS port of the category of DMRS ports is of DMRS type I:

the DMRS port occupies REs on two continuous DMRS PRBs; and a number of PRBs of the DMRS ports is an integer multiple of 2.

14. The wireless communication device of claim 12, wherein the at least one processor is configured to:

determine a sequence of the DMRS port p of a FD-OCC of length L, that is mapped to resource elements $(k, l)_{p,\mu}$, according to:

$$-a_{k,l}^{(p,\mu)} = w_f(k')w_t(l')r(L*n+k')$$

wherein:

$$k = 3*L*n + k' \bmod 2 + 6*\left\lfloor \frac{k'}{2} \right\rfloor + \Delta,$$

where k is an index of a subcarrier;

k'=0, 1, . . . , L−1, where k' is an intermediate parameter to determine an index of a sub-carrier k of the DMRS port, and L is a length of one FD-OCC;

l=l̄+l', where l is an OFDM symbol of the DMRS port, l' is index of an OFDM symbol among X continuous DMRS OFDM symbols;

l'=0, 1, . . . X−1, where X is a number of continuous DMRS OFDM symbols;

n comprises non-negative integer values;

$w_f(k')$, $w_t(l')$, and Δ are provided by a defined table which includes a mapping between DMRS ports and the $w_f(K')$, $w_t(l')$, and Δ; and $w_f(k')$ is a FD-OCC, $w_t(l')$; is a TD-OCC, and Δ is a RE offset associated with a CDM group;

μ is a parameter related to subcarrier spacing;

p is an index of the DMRS port, and the DMRS port is a DMRS port of type II; and r(L*n+k') is a symbol with index L*n+k' in a symbol sequence of r(•).

15. The wireless communication device of claim 14, wherein:

if a number of continuous DMRS OFDM symbols is 1, the category of DMRS ports with a FD-OCC of length L includes DMRS ports {0-5,12-17};

if the number of continuous DMRS OFDM symbols is 1, CDM group 0 includes DMRS ports {0,1,12, 13}, CDM group 1 includes DMRS ports {2,3,14,15}, and CDM group 2 includes DMRS ports {4,5,16,17};

if the number of continuous DMRS OFDM symbols is 2, the category of DMRS ports with a FD-OCC of length L include DMRS ports {0-23}; or if the number of continuous DMRS OFDM symbols is 2, CDM group 0 includes DMRS ports {0,1,12,13,6,7,18, 19}, CDM group 1 includes DMRS ports {2,3,14,15, 8,9,20,21}, and CDM group 2 includes DMRS ports {4,5,16,17,10,11,22,23}.

16. The wireless communication device of claim 12, wherein the at least one processor is configured to:

determine DMRS ports of potential co-scheduled wireless communication devices of the wireless communication device according to a rule and a signaling, wherein the rule includes:

in one CDM group without data, DMRS ports of the wireless communication device and DMRS ports of potential co-scheduled wireless communication devices have a same L, wherein the signaling includes the DMRS ports of the wireless communication device.

17. The method of claim 1, wherein the first information is received in a radio resource control (RRC) signaling.

18. The method of claim 6, further comprising:

sending, by the wireless communication node to the wireless device, the first information within a radio resource control (RRC) signaling.

19. The wireless communication node of claim 9, further comprising:

send, to the wireless device, the first information within a radio resource control (RRC) signaling.

20. The wireless communication device of claim 12, wherein the first information is received in a radio resource control (RRC) signaling.

* * * * *